United States Patent [19]

Cowsar et al.

[11] Patent Number: 5,615,400

[45] Date of Patent: Mar. 25, 1997

[54] SYSTEM FOR OBJECT ORIENTED DYNAMIC LINKING BASED UPON A CATALOG OF REGISTERED FUNCTION SET OR CLASS IDENTIFIERS

[75] Inventors: George C. Cowsar, San Jose; Christopher J. Plummer, Milpitas; Michael J. Quinn, Campbell, all of Calif.

[73] Assignee: Apple Computer, Inc., Cupertino, Calif.

[21] Appl. No.: 85,187

[22] Filed: Jun. 30, 1993

[51] Int. Cl.⁶ .................................................. G06F 9/40
[52] U.S. Cl. ................... 395/685; 395/445; 364/DIG. 1
[58] Field of Search ................................... 395/700, 157, 395/156, 164, 650; 364/DIG. 1

[56] References Cited

U.S. PATENT DOCUMENTS

| | | | |
|---|---|---|---|
| 5,136,709 | 8/1992 | Shirakabe et al. | 395/700 |
| 5,204,947 | 4/1993 | Bernstein et al. | 395/157 |
| 5,247,678 | 9/1993 | Littleton | 395/700 |
| 5,247,681 | 9/1993 | Janis et al. | 395/700 |
| 5,261,080 | 11/1993 | Khoyi et al. | 395/500 |
| 5,269,021 | 12/1993 | Denio et al. | 395/700 |
| 5,297,249 | 3/1994 | Bernstein et al. | 395/156 |
| 5,297,279 | 5/1994 | Bannon et al. | 395/600 |
| 5,315,703 | 5/1994 | Matheny et al. | 395/164 |
| 5,317,703 | 5/1994 | Matheny et al. | 395/164 |
| 5,359,721 | 10/1994 | Kempf et al. | 395/425 |
| 5,375,241 | 12/1994 | Walsh | 395/700 |
| 5,418,964 | 5/1995 | Conner et al. | 395/700 |

FOREIGN PATENT DOCUMENTS

| | | |
|---|---|---|
| 2203572 | 10/1988 | United Kingdom . |
| WO88/07718 | 10/1988 | WIPO . |

OTHER PUBLICATIONS

Journal: Data Based Advisor, Aug. 1989 v7 n8 p. 136 (3) clipper developers convene. (1989 clipper Developer Conference), Author: Hawkins, John L.

"Hypertex: An Introduction and Survey", Author Jeff Coklin, Journal: Computer vol. 20, No. 9, pp. 17–41, publication Date: Sep. 1987, Country of publication: USA.

*Primary Examiner*—Alvin E. Oberley
*Assistant Examiner*—Majid A. Banankhah
*Attorney, Agent, or Firm*—Fliesler, Dubb, Meyer & Lovejoy

[57] ABSTRACT

A system is provided for managing code resources for use by client applications in a computer, wherein the computer has internal memory storing at least one client application. The apparatus comprises a resource set catalog stored in the internal memory. The resource set catalog identifies a plurality of function sets of functions by respective function set IDs. Further, the resource set catalog includes set records which characterize the functions within the respective sets. A dispatch engine, in the internal memory, linked with a client application, supplies a particular function set ID in response to a call by the client application of a particular function which is a member of a corresponding function set identified by the particular function set ID. A lookup engine in the internal memory, coupled with the resource set catalog and the dispatch engine, is responsive to the particular function set ID to look up a set record for a corresponding function set in the resource set catalog. Finally, a link engine in the internal memory and coupled with the dispatch engine returns the particular function to the client application in response to the set record. Thus, because the link engine is responsive to the set record, which is not linked with the client, the client need not be aware of changes in the structure of the library in which the particular function set resides. Thus, the function set can be moved into and out of internal memory, revised, placed in different sections of internal memory, and otherwise handled independently of the client, without requiring re-compilation of the client application.

52 Claims, 17 Drawing Sheets

FIG. 4A
```
struct FunctionStubRec
{
        VirtualFunction    fFunction;
        ClientVTableRec*   fClientVTableRec;
        FunctionStubRec*   fNextStubRec;
        unsigned short     fFunctionID;
};
```

FIG. 4B
```
struct ClientVTableRec
{
        TLink*  fClassLinkPtr;
        long    fClassSerialNumber;
        long    fCodeSerialNumber;
        short   fVersion;
        short   fMinVersion;
        char    fClassDStr(2);
};
```

FIG. 4C
```
struct VTable
{
        VTable              fVTablePtr;
        VTable              fExportTable;
        TUseCount           fUseCount;    //"long"in size
        void*               fReserved
        ClientVTableRec*    fParentClientPtr;
        unsigned short      fSize;
        unsigned            fParentIsVirtual:1;
        unsigned            fFiller:1;
        unsigned            fCanNewObject:1;
        unsigned            fIsFunctionSet:1;
        unsigned            fIsRootClass:1;
        unsigned            fLocalCVRIsParent:1;
        unsigned            fIsParentVTable:1;
        unsigned            fIsMasterOrLast:1;
        unsigned char       fDispatcher;
        ClientVTableRec*    fLocalClientPtr;
        union
        {    SetupProc            fSetup;
             TRegisteredObjects*  fRegisteredObjects;
        };
};
```

TO FIG. 9B

SYSTEM FOR OBJECT ORIENTED DYNAMIC LINKING BASED UPON A CATALOG OF REGISTERED FUNCTION SET OR CLASS IDENTIFIERS

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to dynamic linking of client applications with function sets or classes used by the client applications; and, more particularly, to systems for dynamically linking a client application at run time with libraries of function sets or classes registered either before or during execution of the client application.

2. Description of the Related Art

Traditionally, an application's source files are compiled in object modules and then linked together with other object modules, generically called libraries, to form a complete stand-alone application. This is called static linking. A disadvantage of static linking is that each application that links with the same library routine has its own private copy of the routine. Most of the size of the applications comes from the library code linked to each application. Another disadvantage of static linking is that the functionality that the application gets from the library is fixed. If the library has a bug in it, the application has to be re-linked with the new library to get the bug fixed.

Dynamic linking, sometimes called late binding, differs because the application code and library code are not brought together until after the application is launched. If the code in the library is not loaded until it is actually required, then this is called dynamic loading.

If the same copy of library code being used by one application can be used by other applications at the same time, then the library is called a shared library.

Dynamic linking of a class or function set involves binding code ("client application") which uses a class or function set to the code which implements the class or function set at run time. Thus, the term "dynamic" in this context, means "occurring at run time". Linking entails both loading the code and binding imported references to exported implementations of the classes or function sets. Existing dynamic linking systems do not provide class level or function set level dynamic linking. Instead, the linking is done at the level of the individual functions which may be exported by a library and imported by a client. However, each individual function must be exported by the library and each function used by the client must be imported in such prior art systems. To complicate matters, the name of the functions after compilation is not the name of the same in the source code (i.e., C++). Thus, the developer must deal with so-called "mangled" names to satisfy parameters of the dynamic linking systems of the prior art.

Among other limitations, prior individual function level binding systems cause the implementation of a client to be dependent on a particular set of classes known at build time. Thus, new derived classes cannot be added later without having to rebuild the client. Further, prior art dynamic linking systems do not provide for dynamic installation of the linking system itself. In some cases, after a new linking system is installed, the host system must be rebooted or at least the client application has to be restarted.

Existing dynamic linking systems are designed to support procedural programming languages and do not provide object oriented dynamic linking. Since some object oriented languages are derivatives of procedural languages (e.g., C++ is a derivative of C) these systems can sometimes provide dynamic linking of an object oriented language, provided the programmer deals with a class by the awkward approach of explicitly naming all members of the class. Nonetheless, these systems do not directly support object oriented programming languages.

Accordingly, it is desirable to optimize a dynamic linking system to object oriented programming systems involving class level or function set level dynamic binding. Furthermore, such system should be robust, supporting efficient use of internal memory, and versioning of function sets or classes. Finally, it is desirable to provide for dynamic registration of updated or new libraries, so that a client application need not be restarted in order to take advantage of new versions of its libraries.

SUMMARY OF THE INVENTION

The present invention provides explicit support for object oriented languages, such as C++, MCL, and Dylan. This support includes linking by class or class identifier where a library exports a class and a client imports a class. The client has access to all of the public virtual and non-virtual member functions of such dynamically linked classes. Also, the client may instantiate an object of a class which was not known at compile time. In this case, the client can call public virtual member functions using a known interface of one of the parent classes of a class.

The system of the present invention employs a dynamic function set catalog which can be queried directly or indirectly by the client. Since, ultimately, the implementation of a class is a set of functions, it is possible to dynamically link classes. The dynamic function set or class catalog is updated from a catalog resource when a library is registered and when a library is unregistered with the system. Each registered function set or class is given an identifier when registered.

The system is particularly suited to object oriented programming environments, where for a function set which characterizes a class; a direct catalog query by a client can determine for a given identifier, and the corresponding information in the catalog (1) whether the class is available, (2) the class IDs of its parent classes, (3) the class IDs of its derived classes, and (4) whether the class can be dynamically instantiated by a class ID. These functions enable clients to dynamically determine the availability and compatibility of classes, and enable new functionality to be delivered in the form of new shared class libraries and added to a client without recompiling the client. Since all code that implements a class can be dynamically linked, the client is not dependent on the implementation of the library code. A library can be fixed or enhanced without having to rebuild the client or other libraries. This simplifies the development and distribution of fixes and enhancements, and is generally better than existing patching mechanisms. Since other dynamic linking systems are not aware of classes as a distinct entity, the concept of class identification and class catalog management does not exist in these systems.

Accordingly, the present invention can be characterized as a system for managing code resources for use by client applications in a computer, wherein the computer has internal memory storing at least one client application. The apparatus comprises a resource set catalog stored in the internal memory. The resource set catalog identifies a plurality of function sets by respective function set IDs. Further, the resource set catalog includes set records which characterize the implementation of functions within the respective sets.

A dispatch engine, in the internal memory, linked with a client application, supplies a particular function set ID in response to a call by the client application of a particular function which is a member of a function set identified by the particular function set ID. A lookup engine in the internal memory, coupled with the resource set catalog and the dispatch engine, is responsive to the particular function set ID to look up a set record for a corresponding function set in the resource set catalog. Finally, a link engine in the internal memory and coupled with the dispatch engine returns the particular function to the client application in response to the set record. Thus, because the link engine is responsive to the set record, which is not linked with the client, the client need not be aware of changes in the structure of the library in which the particular function set resides. Thus, the function set can be moved into and out of internal memory, revised, placed in different sections of internal memory, and otherwise handled independently of the client, without requiring re-compilation of the client application.

The resource set catalog is characterized as containing set records for function sets, where a class for an object oriented system is a type of function set. Thus, where the term "function set" is used in the claims, it is intended that a species of function set may be a class.

According to one aspect of the invention, the dispatch engine includes a dispatch record which is linked with the client, and stores a particular function set ID corresponding to a function set of which the called function is a member. Also, a dispatch routine is included in the dispatch engine, which is linked to the dispatch record and the lookup engine, and responsive to the call to the particular function to supply the particular function set ID to the lookup engine. In one preferred embodiment, the dispatch routine includes a first level dispatch segment linked to the client and to a global variable in the internal memory, and a second level dispatch segment linked to the global variable and the lookup engine.

According to yet another aspect of the present invention, the dispatch record includes a function link cache and a set link cache. The function link cache stores a link to the particular function which is supplied by the link engine in response to the return of the particular function to the client. The dispatch engine includes a routine which looks at the function link cache for a cached link to the particular function and jumps to the particular function in response to the cached link if present.

The set link cache stores a link to the set record for the set of functions including the particular function which had been previously called by the client. The link engine includes a routine that supplies the link to the set link cache in response to return of a particular function to the client. The dispatch engine includes a routine which looks in the set link cache for a cached link to the set record, and returns the set record to the link engine in response to the cached link upon a call to a function which is a member of the function set.

Thus, a function call can be executed quickly if the function link cache is full, with a medium level of speed if the set link cache is full, and more slowly if a catalog search is needed to bind the function implementation.

The invention further provides for assignment of version numbers to function sets according to a standard protocol. The dispatch record in this aspect includes version information linked with the client indicating a minimum version number supported by the client for the function set of which the particular function is a member. The set record includes a version number for the corresponding function set. The link engine in this aspect includes a routine which is responsive to the version information in the dispatch record and the version number in the set record to insure that the client supports a version of the particular function in the function set.

In addition, the function sets are assigned serial numbers when loaded in internal memory. The dispatch record further includes a serial number linked with the client indicating a serial number of the corresponding function set when the set link cache is filled. The set link cache stores a pointer to a link structure in internal memory and the link structure includes a pointer to the set record having the particular function set ID. The set record stores the assigned serial number for the function set when it is loaded in internal memory. The link engine includes a routine responsive to the serial number in the set record, and the serial number in the dispatch record to insure validity of the set link cache entry, and a routine for clearing the link structure when the corresponding function set is loaded.

The invention further provides for a use count record within the set record. The link engine in this aspect includes a routine to increment the use count when a client application binds with the function set corresponding to the set record, and to decrement the use count when a client application frees the function set corresponding to the set record. When the function set characterizes a class, the use count is incremented when a constructor for the class is called, and decremented when a destructor for the class is called. Thus, using the use count, the memory management system can unload function sets which are not in current use by any active applications.

Since a client can enumerate all derived classes of a given class by class ID, it can determine what classes are available dynamically. The set of available classes can be extended at run time when new libraries are registered and a client can instantiate a class even though it is added to the system after the client was launched. New classes can be copied into a library directory or folder in the file system at any time and are automatically registered, or a new folder or file can be explicitly registered as a library container by a client.

Dynamic registration of libraries of function sets or classes is accomplished using the class catalog. Because the class catalog is not bound with clients, all that needs to be done to register a new library, is to write the appropriate records into the class catalog. Once the appropriate records are written into the class catalog, the new library becomes available to the new client. The procedures outlined above are in place to protect the client from using a version of a class or function set which it does not support, and for finding an unloaded and reloaded version of a particular function which it has already used.

The invention further provides for insuring type safety of the dynamically linked classes and function sets by means of shared library functions specifically designed to take advantage of the class catalog to insure such safety. The particular functions include the new object function, by which a client application may obtain information needed to construct a new object using the shared library manager, with reference to the class ID of the new object. Thus, using a class ID, the library manager looks up the information about the class in the class catalog, and returns a constructor for the class to the client. The client is then able to call the constructor, even if it did not know at the time it was written or compiled about the class.

In addition, the library manager provides a verify class routine, by which a client application may verify the parent of a particular derived class for type safety. Finally, a cast object routine is provided, by which a client may cast an instance of a particular object as a parent class object. This routine utilizes the class catalog to return offsets within the particular object to the elements of the parent, even though the client application may not have been aware of the structure of the parent at the time it was written or compiled.

Accordingly, it can be seen that the present invention provides a dynamic class catalog which given a class ID can be queried to determine whether the class is available, the class IDs of the parent class or classes, the class ID or IDs of the derived class or classes, and whether the class can be dynamically instantiated by class ID. When an object is instantiated, the library or libraries which implement the class and its parent classes are dynamically loaded. An object can be instantiated by a client which had no knowledge at compile time of the class of the object. If such client was compiled with the interface of a parent class of the object, then the object can be used as if it were an instance of the parent class.

The system is particularly suited for object oriented dynamic linking which enables dynamic library registration, dynamic inheritance, and on-demand type-safe dynamic instantiation of objects by class identifier.

Other aspects and advantages of the present invention can be seen upon review of the figures, the detailed description, and the claims which follow.

BRIEF DESCRIPTION OF THE FIGURES

FIGS. 4A–4C provide the "C" language definition of the stub record, client VTable record and class VTable records according to a preferred embodiment.

DESCRIPTION OF THE PREFERRED EMBODIMENTS

A detailed description of preferred embodiments of the present invention is provided with respect to the figures. FIGS. 1–13 provide a high level overview of enabling various aspects of the present invention. A detailed description with references to segments of the source code follows a description of the figures.

Figure 1:
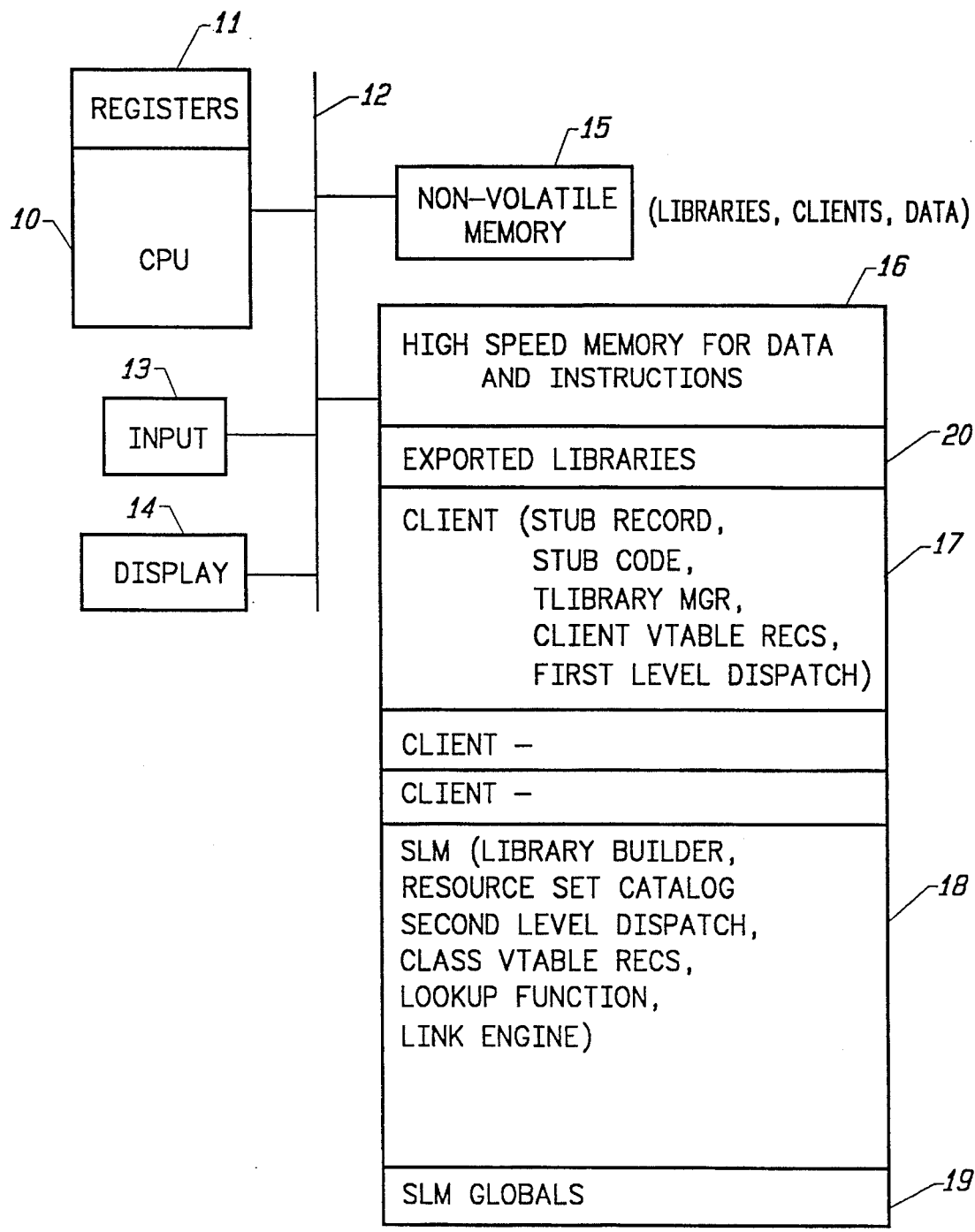
FIG. 1 is a schematic diagram of a computer system implementing the shared library manager of the present invention.

FIG. 1 shows a computer system in which the present invention is loaded. The computer system includes a host CPU 10 which includes a plurality of registers 11 used during execution of programs. The CPU is coupled to a bus 12. The bus communicates with an input device 13 and a display 14 in the typical computer system. Further, non-volatile memory 15 is coupled to the bus 12. The non-volatile memory holds large volumes of data and programs, such as libraries, client applications, and the like. A high speed memory 16 is coupled to the bus 12 for both data and instructions. The high speed memory will store at least one client application 17, a shared library manager 18, shared library manager global variables at a predetermined address space within the memory 16, exported libraries 20, and other information as known in the art.

According to the present invention, when a client application is compiled, a number of items are provided within the application. These items include a stub record, stub code, a library manager interface, a client VTable record, and a first level dispatch routine. The shared library manager will include a library builder routine, a resource set catalog, a second level dispatch routine, class VTable records for registered libraries, a lookup function, and a link function.

As mentioned above, the resource set catalog provides information for function sets or classes which are available to a client. The stub record points to the client VTable record within the client. The first level dispatch routine uses information in the client VTable record to call the second level dispatch routine. The second level dispatch routine calls the lookup function to find information about the called function in the resource set catalog. That information is provided to a link engine in the form of a class VTable record which links the client to the particular function that it has called. A particular protocol for using these features of the client and the shared library manager are described below with reference to FIGS. 5 and 6.

Figure 2:
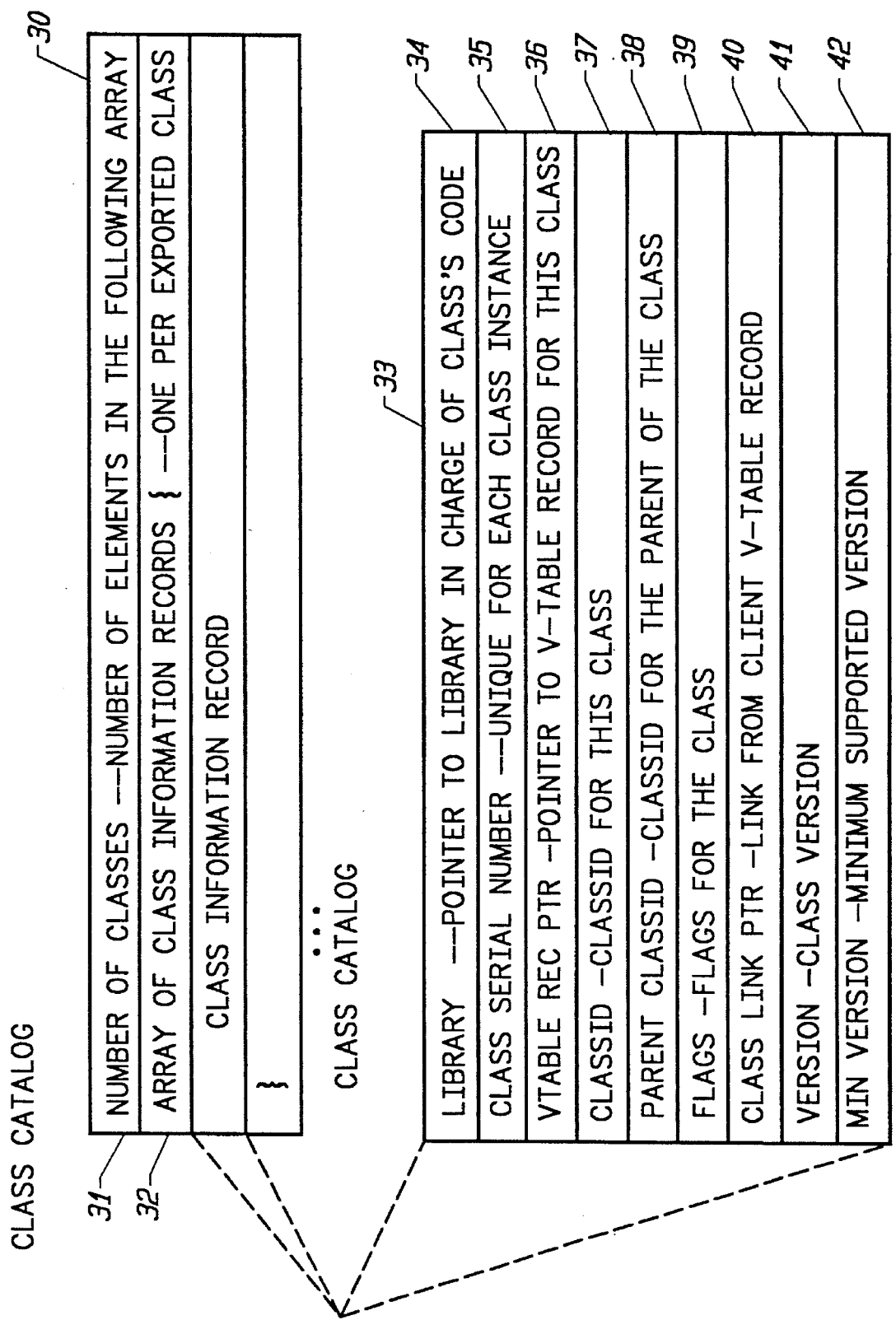
FIG. 2 is a schematic diagram of the resource set catalog used according to the present invention.

The implementation of the resource set catalog, also called a class catalog herein, is shown in FIG. 2. A class catalog is a record 30 which includes a first field 31 which stores a number indicating the number of exported classes in all the library files which have been registered with the catalog 30. Next, the catalog includes an array 32 which stores class information records, one per exported class. The class information record in the array 32 consists of a structure 33 which includes a number of parameters. This structure includes a first field 34 named library which points to the library in charge of the code for the particular class or function set. A second field 35 stores a class serial number which is unique for each instance of the class; that is, it is incremented on registration of the class.

A next field 36 stores a VTable record pointer which is the pointer to the VTable record for this class. A next field 37 stores a class ID, which is a class identifier for the class. A next record 38 stores the parent class ID. This is the class ID for a parent of this class. Next, a plurality of flags are stored in field 39 which are defined in more detail below. A next field 40 is a class link pointer. This points to a link structure for establishing a link with the client VTable record. Field 41 stores a version parameter indicating a version of the class implementation.

The class information record is loaded from a library resource having a structure described below with reference to FIG. 8.

Figure 3:
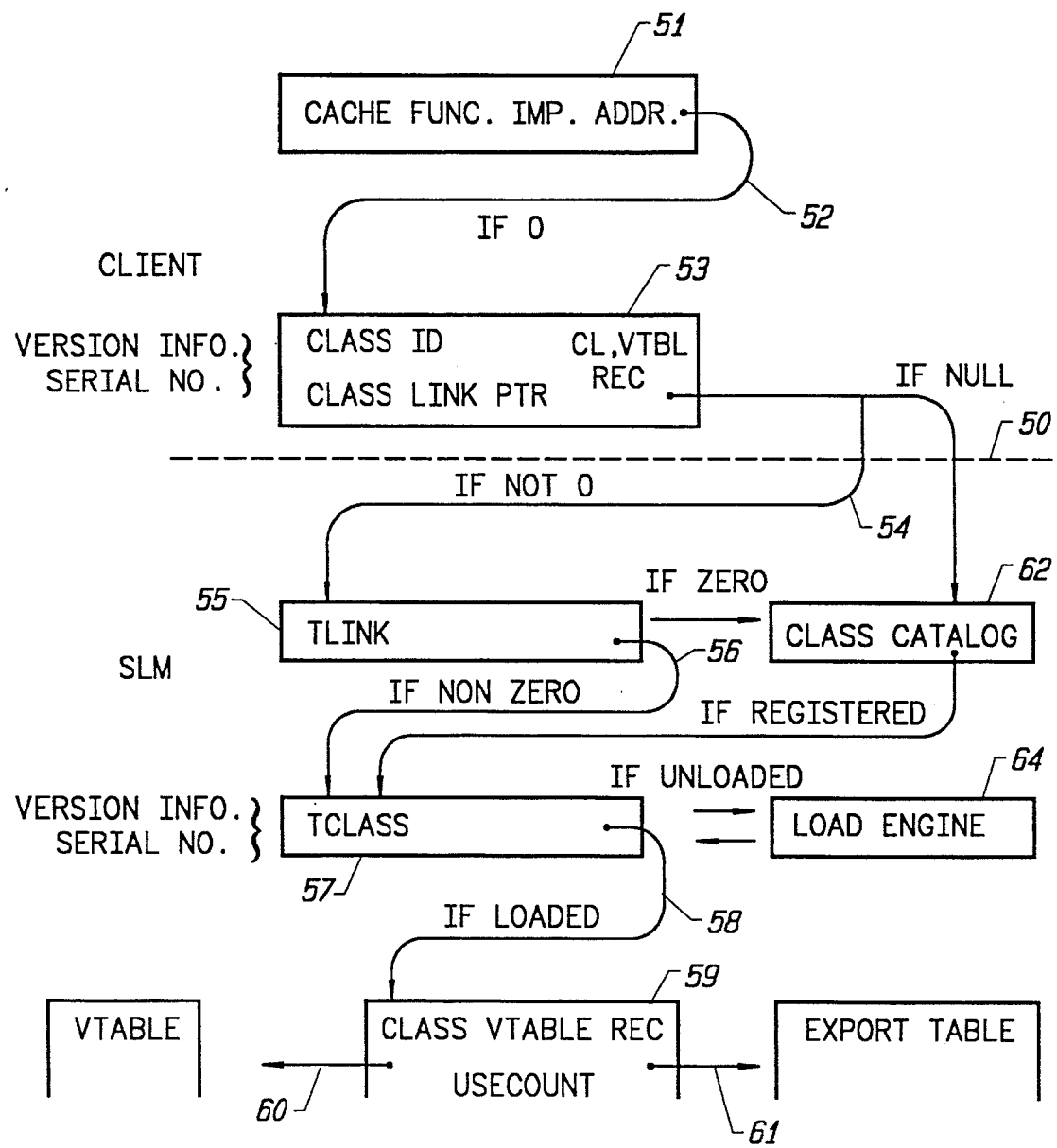
FIG. 3 is a diagram of the data structures involved in the dynamic binding of the present invention.

FIG. 3 schematically illustrates the records used for dynamically linking a function call in a client to a class or function set. The figure is divided generally along line 50. Where elements above line 50 are linked with the client during compile time, and elements below line 50 are linked with the shared library manager. Thus, the client includes a stub record 51 which provides a function link cache for a pointer to the implementation of the called function, and a pointer 52 to a client VTable record 53. The client VTable record stores the class identifier, for the class or function set, and a class link pointer providing a set link cache. The class link pointer 54 points to a link structure 55 which stores a pointer 56 to a class information record 57 in the class catalog. The class information record includes a pointer 58 to the class VTable record 59. The class VTable record includes a pointer 60 to the actual VTable of the class, and a pointer 61 to an export table for non-virtual functions.

If the class link pointer 54 is null, then a lookup function is called which accesses the class catalog 62 to look up the class information record 57 for the corresponding function. If that function is registered, then the class information record 57 is supplied, and the class VTable record 59 may be retrieved.

The figure also includes a schematic representation of a load engine 64. The load engine is coupled with the class information record 57. If the class corresponding to the class information record is not loaded at the time it is called, then the load engine 64 is invoked. When the information is moved out of longterm storage into the high speed internal memory, the class information record 57 and class VTable record 59 are updated with the correct pointers and values.

FIGS. 4A, 4B, and 4C respectively illustrate the actual "C" definitions for the stub record, client VTable record, and class VTable record according to the preferred implementation of the present invention. Details of these structures are provided below in the description of a preferred embodiment. They are placed in these figures for ease of reference, and to illustrate certain features. It can be seen that the client VTable record (FIG. 4B) includes version information (fVersion, fMinVersion) which indicates a current version for the function set or class to which the class link pointer is linked, and the serial number (fClassSerialNumber) for the same. The class information record 57 of FIG. 3 also includes version information for the currently loaded class for a function set, and the serial number for the currently loaded class or function set. These fields are used for insuring version compatibility between the client and the currently loaded library, as well as validity of the link information.

The class VTable record 59 (FIG. 4C) also includes a use count parameter (fUseCount). The use count parameter is incremented each time a class is constructed, and decremented each time a class is destructed. When the use count returns to zero, the class or function set is freed from internal memory.

Figure 5A:
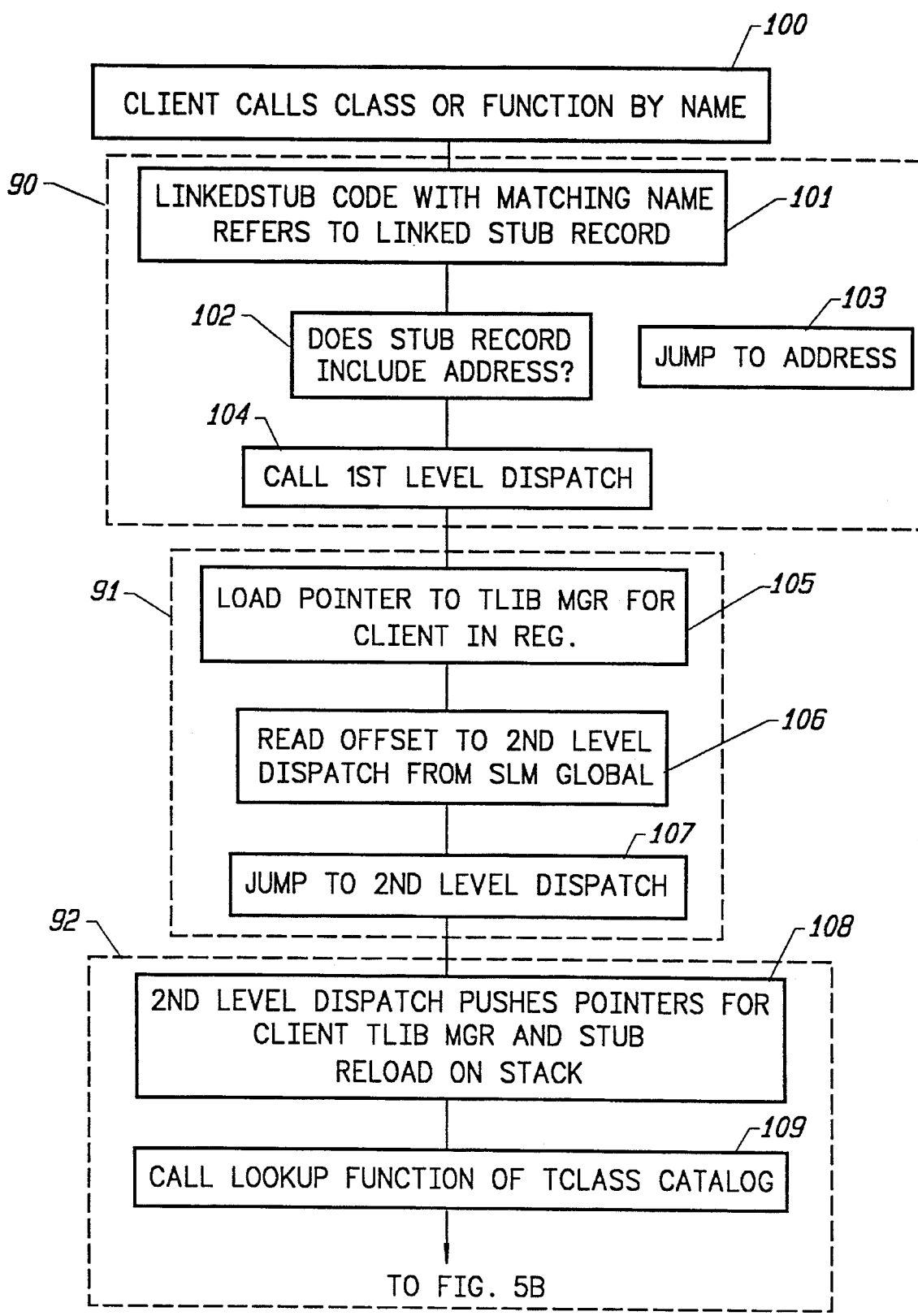
FIGS. 5A and 5B provide a flowchart for the basic dispatching architecture used with the shared library manager of the present invention.
Figure 5B:
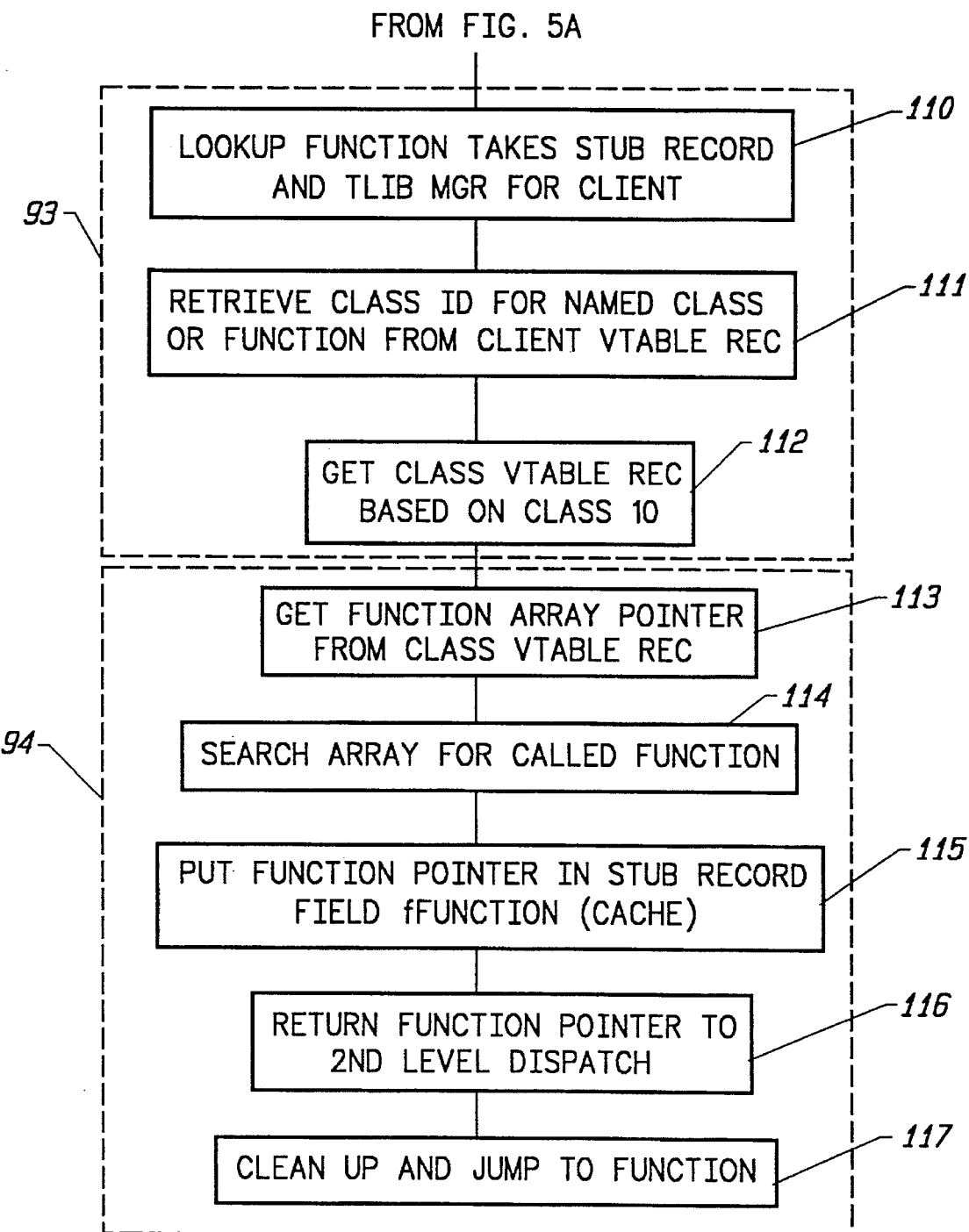

FIGS. 5A and 5B provide a flowchart for the basic implementation of the run time architecture. The algorithm begins by a client application calling a class constructor or a function by name (block 100). The stub code, generally outlined by dotted line 90, in the client with a matching name refers to the linked stub record (block 101). The stub code then tests whether the stub record includes the address for the constructor or function in its function link cache (block 102). If it does, then the stub code jumps to the address (block 103). This is the fastest way in which a function may be executed.

If the stub record did not include a valid cached address for the function, then the stub code calls a first level dispatch routine (block 104).

The first level dispatch routine is generally outlined by dotted line 91. The first step in this routine is to load a pointer to the library manager interface in the client in a host register (block 105). Next, the offset to the second level dispatch routine is read from the SLM global variables in internal memory (block 106). Next, the second level dispatch routine is jumped to based on the offset read in block 106 (block 107).

The second level dispatch routine is generally outlined by dotted line 92. The second level dispatch routine begins by pushing pointers for the client library manager interface and stub record onto the stack (block 108). Next, a lookup function is called for the class catalog (block 109).

The lookup function is generally outlined by dotted line 93. The first step in the lookup function is to take the stub record and library manager interface for the client (block 110). Using the information, the lookup function retrieves the class identifier for the named class or function set from the client VTable record (block 111). Next, the class VTable record (a set record) is retrieved based on the class ID (block 112). This step can be accomplished using the class link pointer for cached classes or function sets, or requires a lookup in the class catalog. Once the class VTable record is found, a link engine, generally outlined by dotted line 94, executes. The first step in the link engine is to get the function array pointer from the class VTable record (block 113). Next, the array is searched for the particular called function (block 114). Next, a pointer to the function is stored in the stub record for the client providing a function link cache value (block 115). Finally, the function pointer is returned to the second level dispatch routine (block 116). The second level dispatch routine then cleans up the process and jumps to the function (block 117).

Figure 6A:
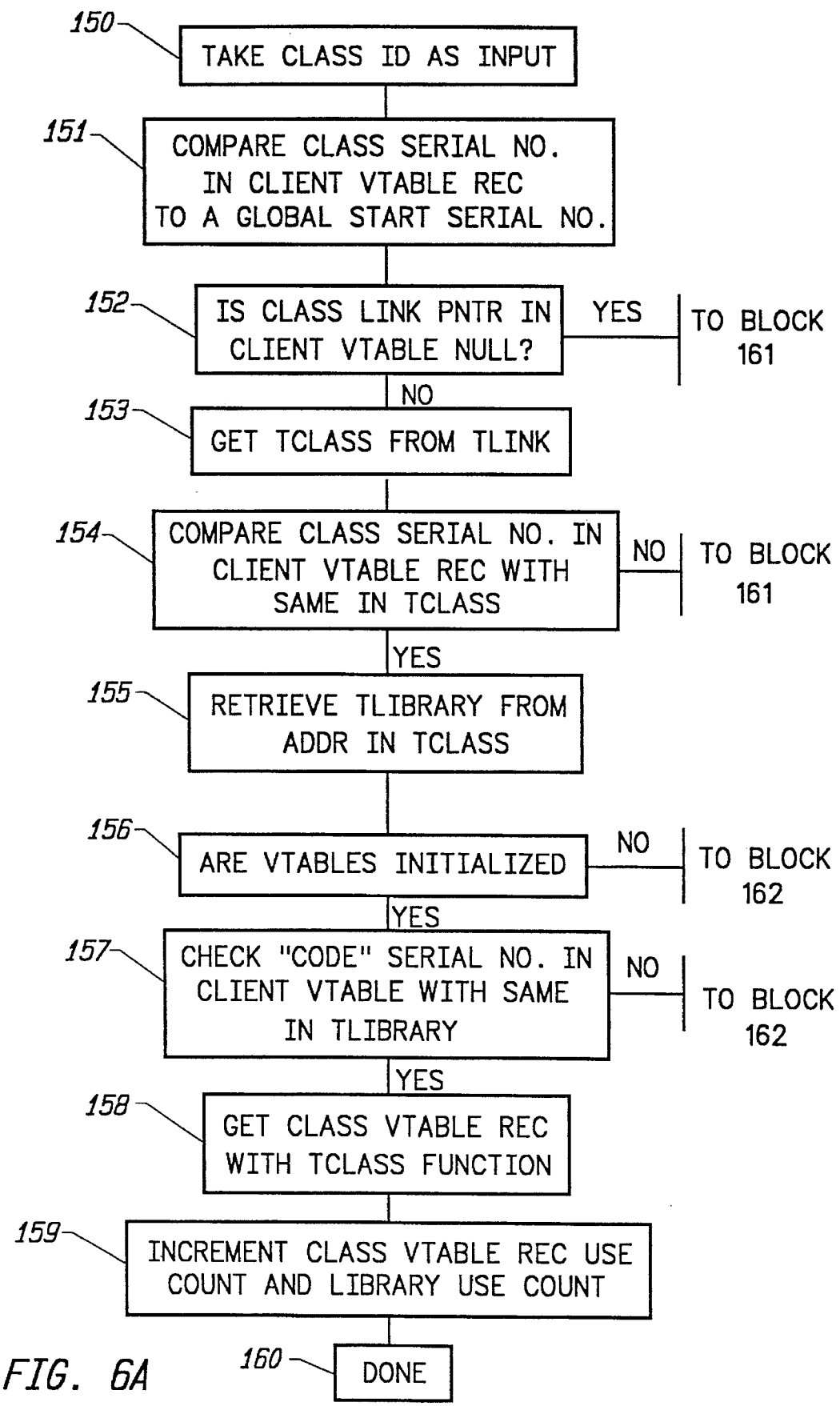
FIGS. 6A, 6B, and 6C provide a flowchart for the GET CLASS VTABLE RECORD step 112 of FIG. 5B.
Figure 6B:
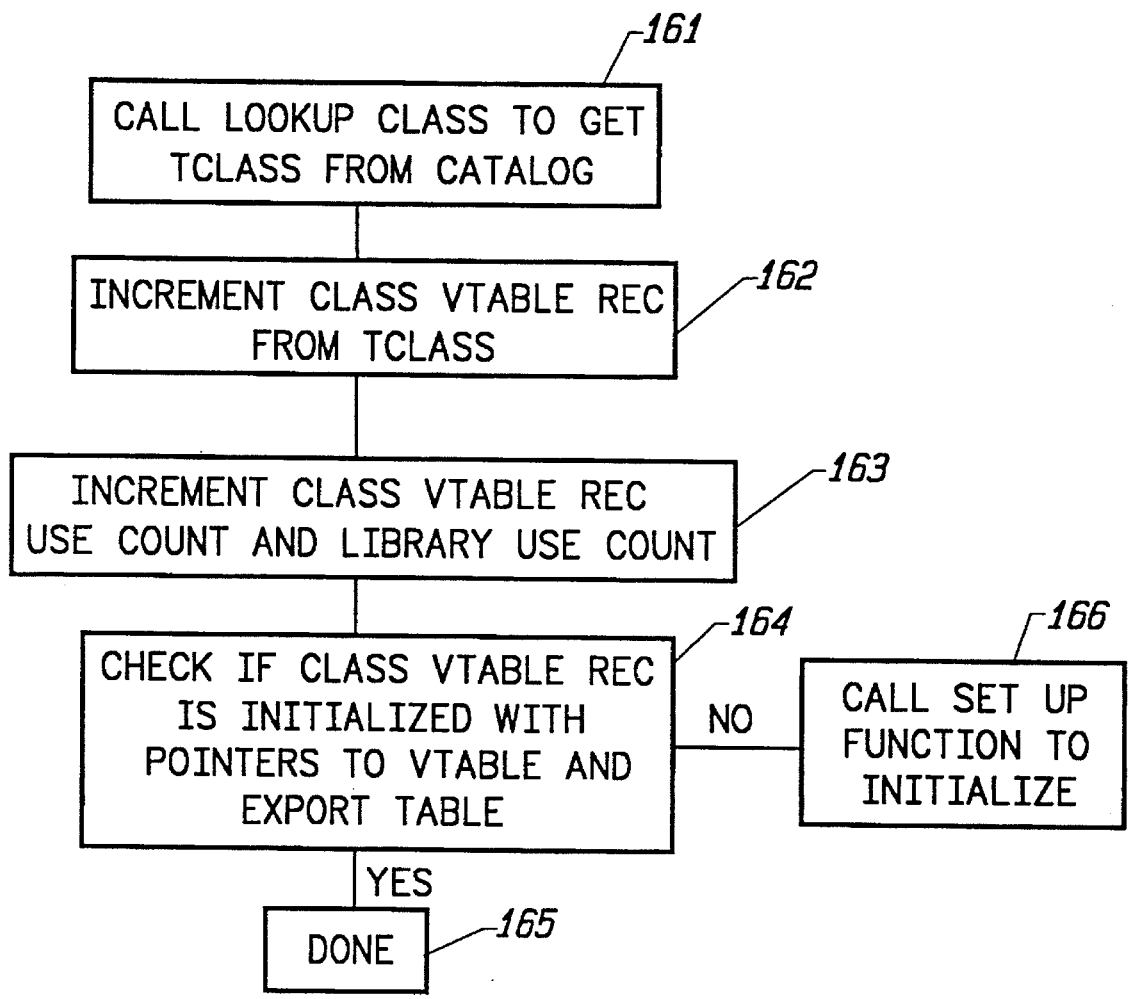
Figure 6C:
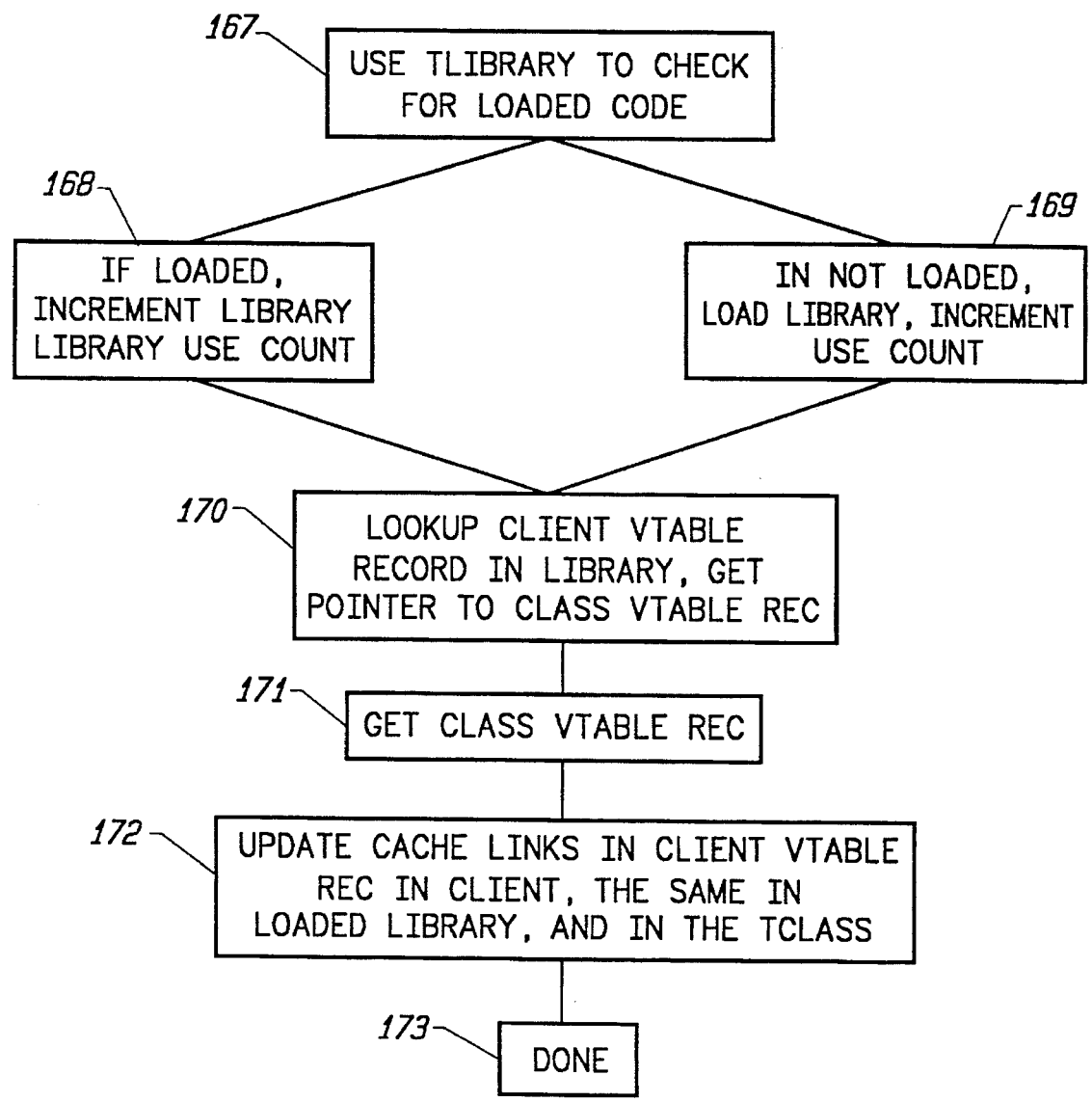

FIGS. 6A, 6B, and 6C provide a flowchart for the step of block 112 in FIG. 5B, which returns a class VTable record in response to the class ID. Thus, the algorithm begins by taking the class ID as input (block 150).

Using the class ID, the class catalog object is called which first compares the class serial number in the client VTable record to a global start serial number maintained by the shared library manager. The shared library manager insures that all serial numbers of valid clients are at least greater than the global start serial number.

If this test succeeds, then the algorithm loops to block 152 where it is determined whether the class link pointer in the client VTable is null. If it is null, then the algorithm branches to block 161 in FIG. 6B. However, if the pointer is not null, then the class record is retrieved based on the information in the link pointer.

After retrieving the TClass record, the class serial number in the client VTable is compared with the same in the TClass record. If they do not match, then the algorithm branches to block 161. If they do match, then the library record TLibrary for the class is retrieved from the information in TClass (block 155). The library record indicates whether the VTables for the class are initialized (block 156). If they are not, then the algorithm branches to block 162. If they are initialized, then the "code" serial number in the client VTable is compared with the same in the library record (block 157). If they do not match, then the algorithm branches to block 162.

If the code serial numbers match, then the class VTable record is returned in response to the information in the TClass record (block 158).

After retrieving the class VTable record, the class VTable record use count is incremented as well as the library use count (block 159). After block 159, the algorithm is done, as indicated in block 160.

FIG. 6B illustrates the routine for handling the branches from blocks 152, 154, 156, and 157. For branches from blocks 152 and 154, this routine begins with block 161 which calls a lookup class function to get the TClass record from the class catalog (block 161). After retrieving the TClass record, the class VTable record is retrieved in response to the information in TClass (block 162). Next, the class VTable record use count and library use count are incremented (block 163). The class VTable record is reviewed to determine whether it includes pointers to the VTable and the export table for the class (block 164). If there are pointers, then the algorithm is done (block 165). If not, then a set up function is called to initialize the class VTable record (block 166). The setup function is described in FIG. 6C. This algorithm begins with an access to the library record to determine whether the code is loaded (block 167). If the code is loaded, then the library use count is incremented (block 168). If the code is not loaded, then the library is loaded, and its use count incremented (block 169).

After either block 168 or 169, the client VTable record is retrieved from the library, and the pointer to the class VTable record is retrieved (block 170). The pointer taken from the client VTable record in the library is used to get the class VTable record (block 171). Next, the cache links in the client VTable record in the client, and the same in the loaded library, and the cache links in the TClass record are updated with information about the class VTable record (block 172). Finally, the algorithm is done (block 173).

Figure 7:
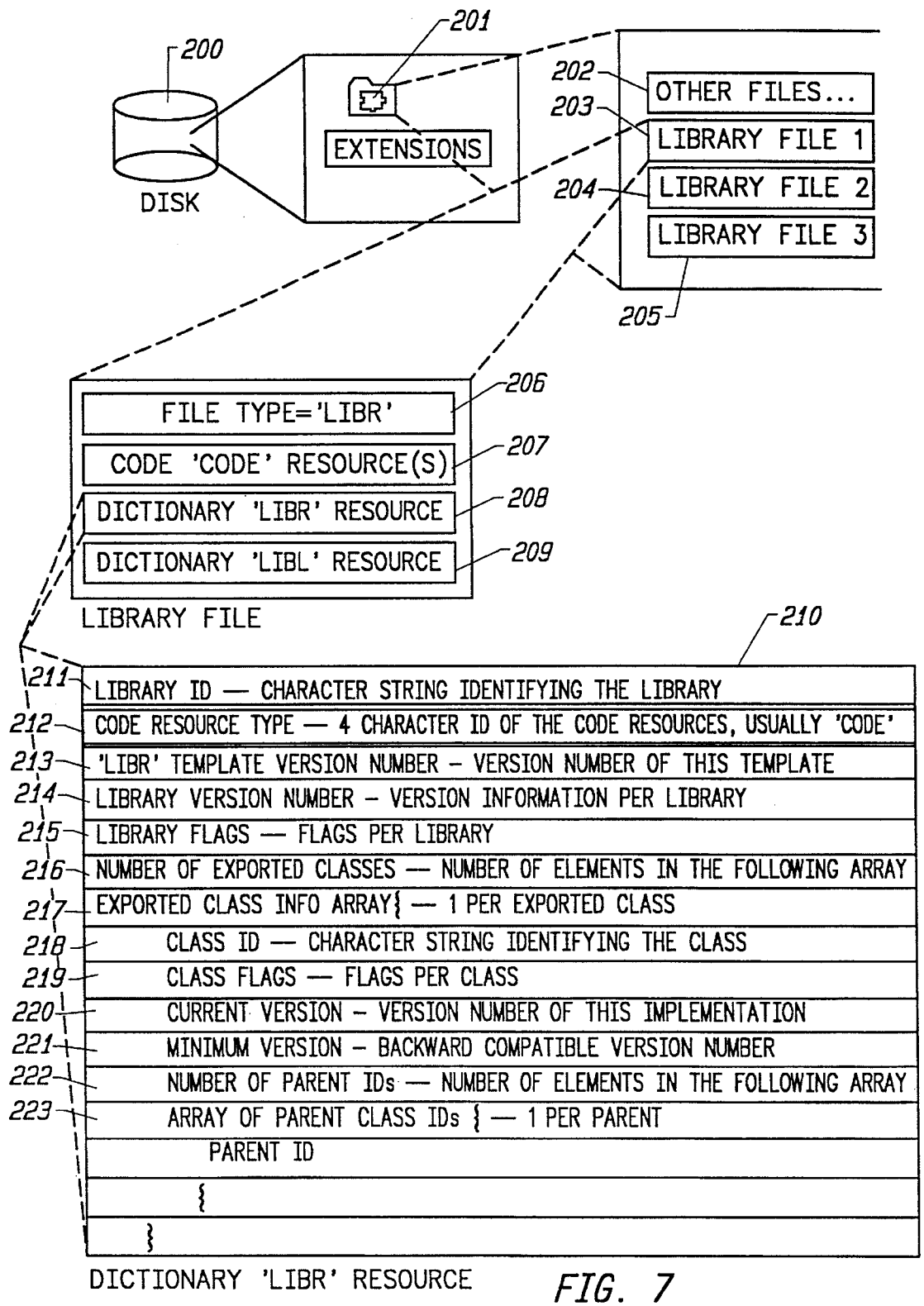
FIG. 7 is a schematic diagram of the library registration function, and organization.

FIG. 7 is a schematic diagram of the structure for the library's files which can be dynamically registered in the class catalog. The library files are normally stored on disk 200. These library files are registered in an extensions folder 201 which is graphically illustrated on the user interface of the device, such as the Macintosh™ computer. The extension folder includes a number of management files 202, and a plurality of library files 203, 204, 205. The library files are all registered in the class catalog. The library files having a file type "libr" 206 include a number of segments, including code resources 207, a dictionary "libr" resource 208, and dictionary "libi" resource 209. The code resources 207 include the library code segments such as classes and generic function sets. The dictionary "libr" resource describes the library. Dictionary "libi" resource fists libraries which this library depends on. The dictionary "libr" resource 208 is shown in more detail at block 210. This resource includes a library ID field 211 which is the character string identifying the library. A second field 212 in the structure 210 identifies the code resource type. A third field 213 identifies the template version number for the library file. A fourth field 214 identifies the version number of the library, which is maintained according to a standard protocol by the developers of the libraries. The next field 215 stores a plurality of library flags. The next field 216 identifies the number of elements in an exported class information array 217. This information array 217 includes one record per exported class in the library. Each record includes a class identifier 218, class flags 219, a version number of the current version of the class 220, a minimum version number for the backward compatible version number for the class 221, a number 222 which indicates the number of elements in the following array 223 of parent class IDs. The army 223 of parent class IDs includes the identifier of each parent of the class. The information in this resource 210 is used to create the class information records for the class catalog upon registration of the library.

Figure 8:
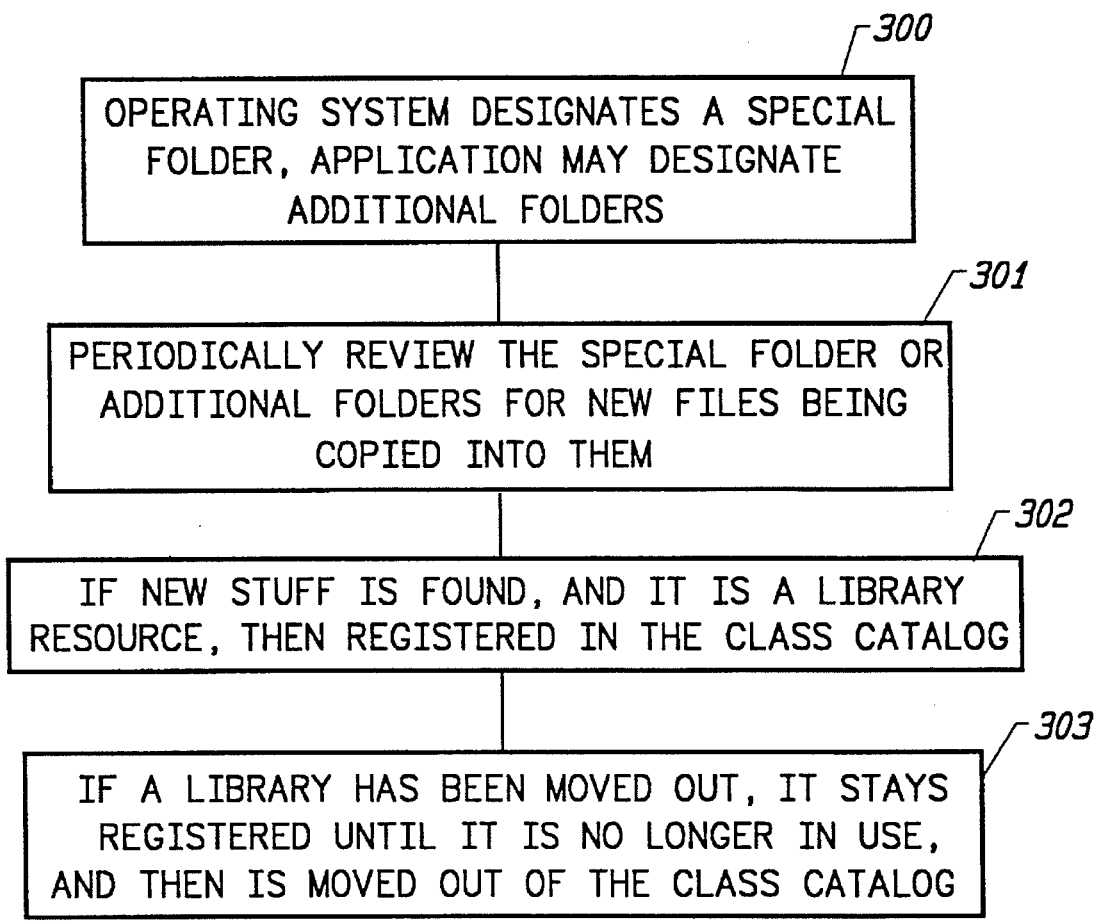
FIG. 8 is a flowchart illustrating the operation of the dynamic registration routine using the structure of FIG. 7.

FIG. 8 illustrates the basic algorithm for dynamically registering libraries using the structure of FIG. 7.

As indicated at block 300, the operating system designates a special folder such as Extensions folder 201 in FIG. 7, and applications may designate additional folders for registered libraries.

The Library Manager intercepts operating system calls which indicate a file has been copied or moved. Then it is determined whether the file subject of the call is in the special folders or one of the additional folders (block 301).

If a new file is found, then it is determined whether the new file is a shared library resource. If it is, then library is registered in the class catalog by providing information to fill the TClass records for the classes in the class catalog (block 302). If a library has been moved out of the folder, then the library manager will leave it registered until it is no longer in use. After it is no longer in use, then it is moved out of the class catalog (block 303).

The shared library manager also provides functions which are linked to the clients, and allow them to take advantage of the class catalog for various functions. Particular routines include a new object routine which is described with reference to FIGS. 9A and 9B, a variant of the new object routine shown in FIG. 10, a verify object routine shown in FIG. 11, a cast object routine shown in FIG. 12, and a GetClassInfo routine shown in FIG. 13.

Figure 9A:
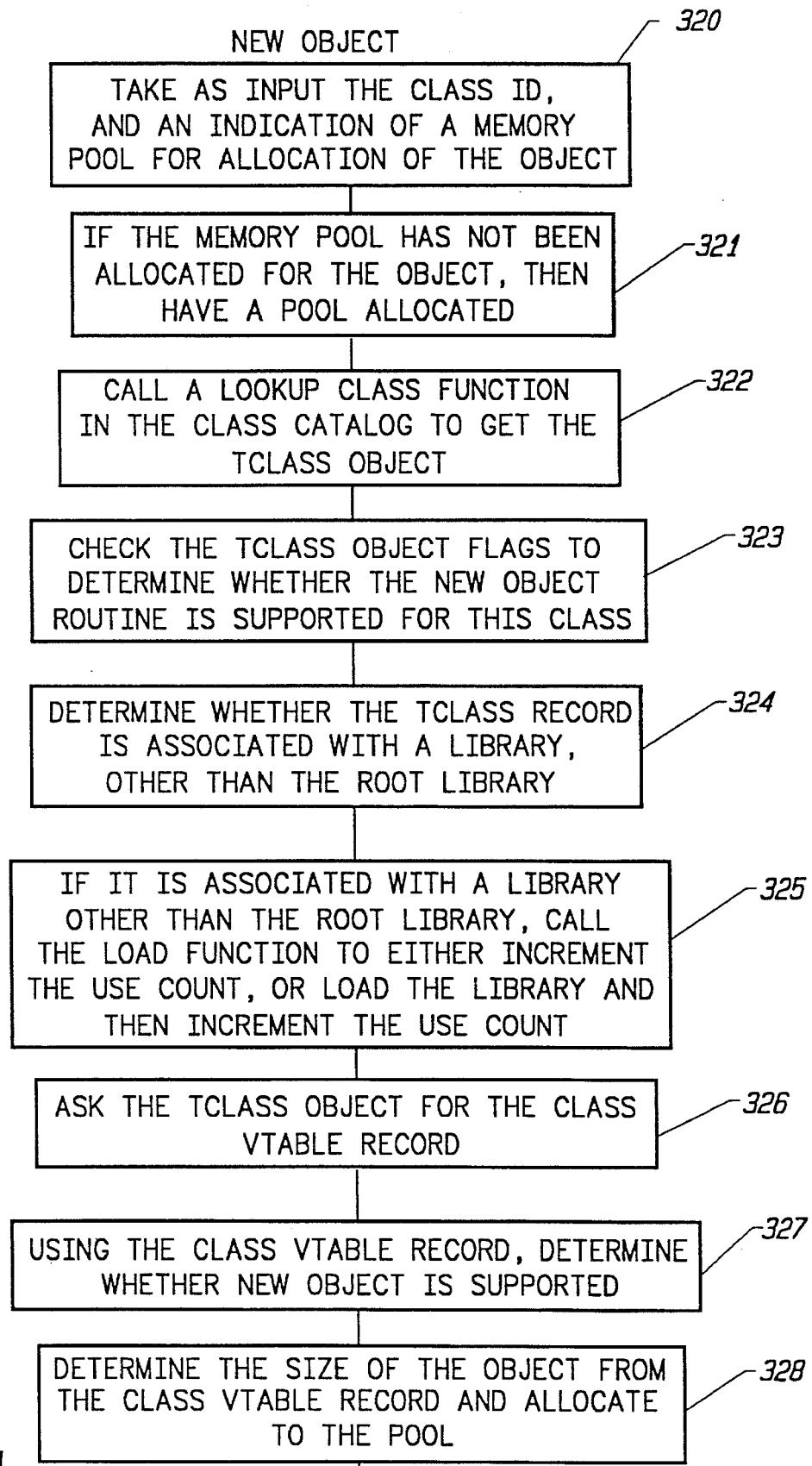
FIGS. 9A and 9B illustrate a new object routine executed by the shared library manager.
Figure 9B:
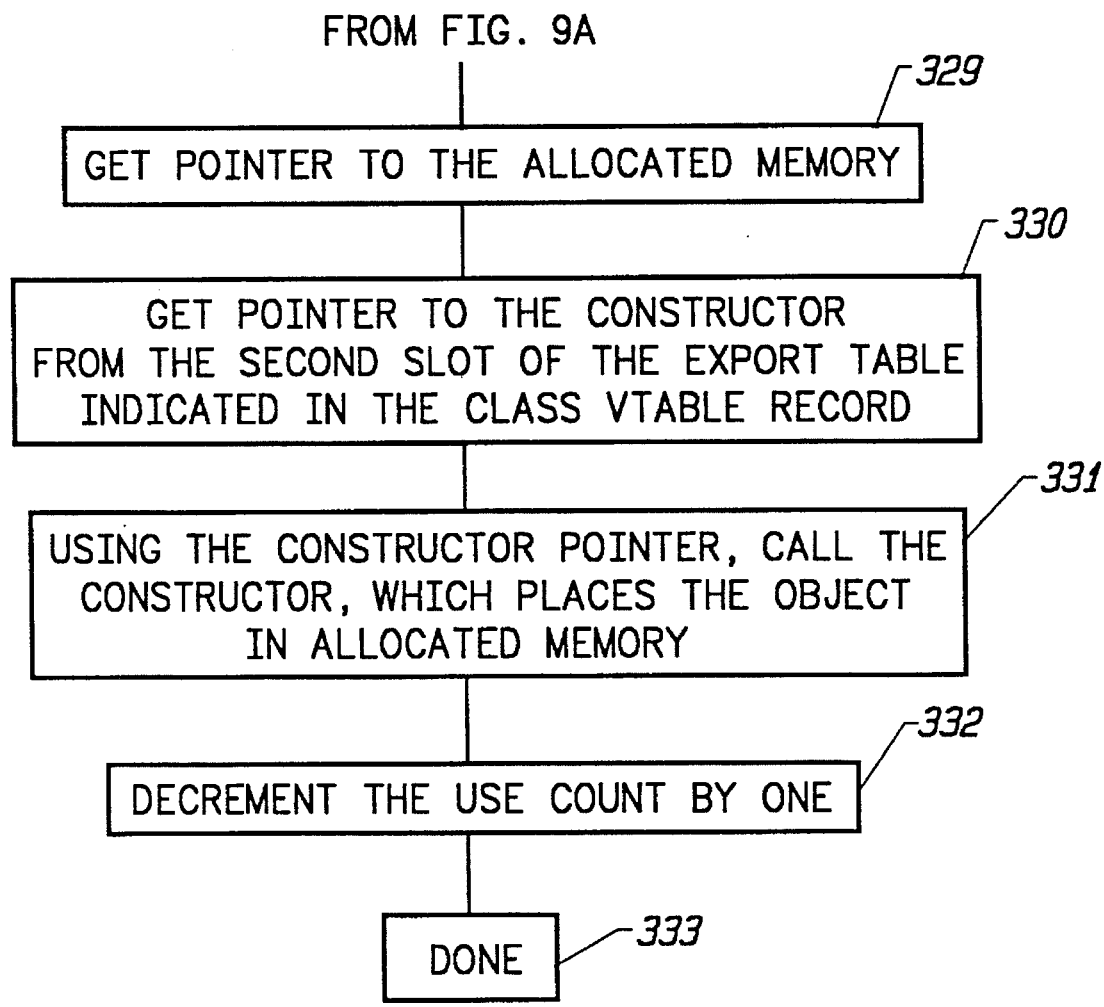

As indicated in FIGS. 9A–9B, the new object routine takes as input the class identifier for the new object and an indication of a memory pool for allocation of the object (block 320). Using this information, it is determined whether the memory pool has actually been allocated for the object. If not, then the pool is allocated (block 321). Next, a lookup class function is called in the class catalog to get the TClass object for the identified class (block 322). Next, flags maintained in the TClass object indicate whether the new object routine is supported for the particular class (block 323). If it is supported, then it is determined whether the TClass record for the class is associated with a library other than the root library. If it is a root library class, then it is guaranteed to be always loaded, and the use content is incremented (block 324).

If the class is associated with a library other than a root library, a load function is called to either load the library and then increment the use count, or if the library is already loaded then just increment the use count (block 325).

Next, the TClass object is used to retrieve the class VTable record (block 326). Using the flags in the class VTable record, it is determined whether the new object routine is supported for the class (once again) (block 327).

Next, the size of the object is determined from the class VTable record, and memory of that size is allocated to the pool (block 328). Next, a pointer to the allocated memory is retrieved (block 329). The library manager requires that the second slot in the export table for classes in the library contain a pointer to a constructor for the class. Thus, the pointer for the constructor is retrieved from the export table location indicated in the class VTable record (block 330). Using the constructor pointer, the constructor is called which places an object in the allocated memory (block 331).

Next, the use count is decremented by one to balance the use count (block 332). This is required because the load function step of block 325 increments the use count, as does the calling of a constructor in block 330. Thus, the decrementing of the use count is required for balancing the use counts. After the decrementing of use count in block 332, then the algorithm is done (block 333). Thus, a client is able to obtain and call a constructor for a class of which it was not aware at compile time.

Figure 10:
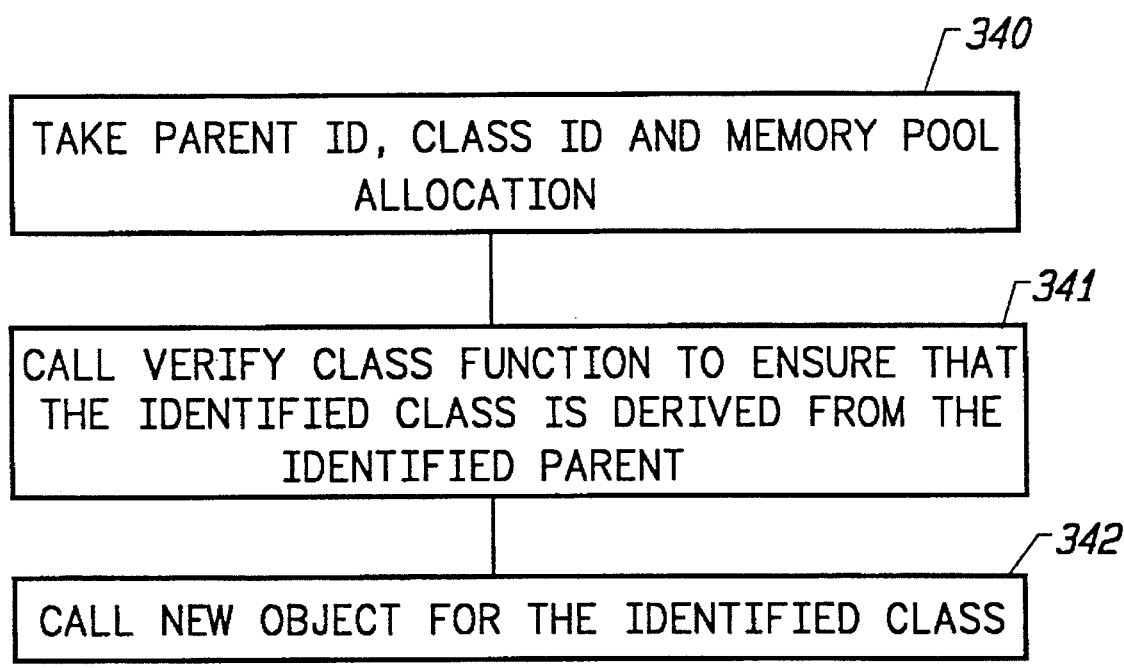
FIG. 10 illustrates a variant of the new object routine used when type safety is desired to be verified.
Figure 11:
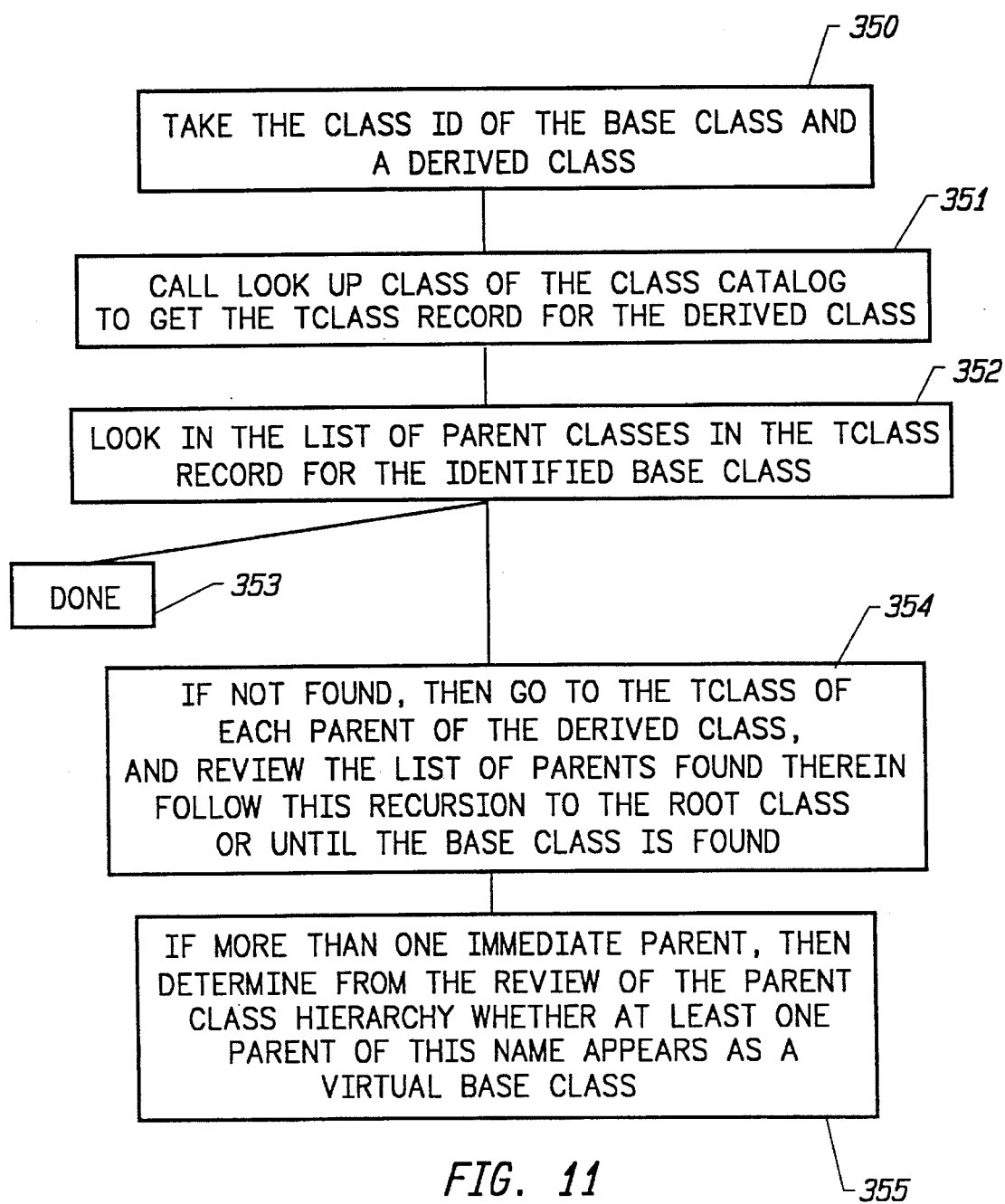
FIG. 11 is a flowchart for a verify class routine executed by the shared library manager.

FIG. 10 illustrates a variant of the new object routine which has better type safety. In particular, if the client is aware of the parent of the new object to be created, then the variant of FIG. 10 can be called. The variant of FIG. 10 takes as input the parent identifier for the parent of the class, the class ID of the new object to be created, and the memory pool allocation parameters (block 340). Next, a verify class function which is described with respect to FIG. 11 is called to insure that the identified class is derived from the identified parent (block 341). If this verification is successful, then the new object routine of FIGS. 9A and 9B is called for the identified class (block 342). (See Appendix, TLibraryManager::NewObject (two variants)).

FIG. 11 illustrates the verify class routine called in block 341 of FIG. 10. Also, this routine is available to the clients directly. The verify class routine begins by taking the class ID of the base class and of a derived class (block 350). Next, the lookup class function of the class catalog is called to get the TClass record for the derived class (block 351). The TClass record for the derived class will include a list of parent classes. This list is reviewed to determine whether the identified parent class is included (block 352). If the parent class is found, then the algorithm is done (block 353). If the parent class is not found, then go to the TClass record of each parent of the derived class in order. The list of parents for each parent is reviewed to find the identified parent class, following this recursion to the root class. The algorithm ends when the parent is found, or the root class is reached. (See Appendix TLibraryManager::VerifyClass and :: internal VerifyClass).

If there is more than one immediate parent in the list of parents for the TClass record, then a case of multiple inherency is found. In this case, the parent class hierarchy must be reviewed to insure that at least one parent appears as a virtual base class (block 355). If the identified parent in the call of verify class is not found as a virtual base class, then it is determined not related to the derived class for the purposes of this function.

Figure 12:
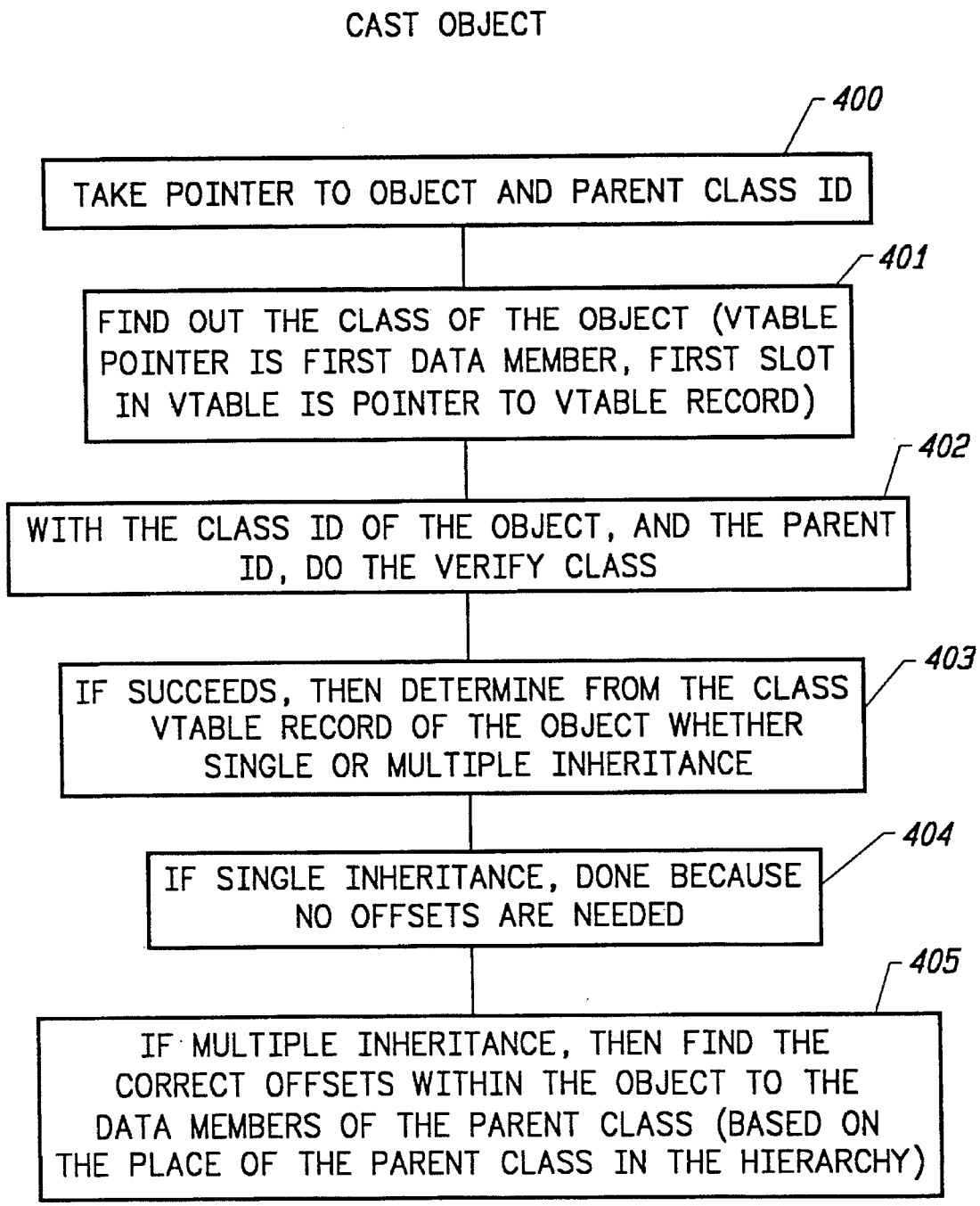
FIG. 12 is a flowchart for a cast object routine executed by the shared library manager.

FIG. 12 is a flowchart for a cast object routine executed by the shared library manager and linked to the clients by the required structure of the objects of the shared library manager environment. Using this function, a client can cast an object of a derived class as a parent class object, even though it may not have been aware of the structure of the parent at the time it was compiled. This algorithm takes as input a pointer to the object and an identifier of the parent class (block 400). Next, the class of the object is determined based on the required structure of the object (block 401). This structure involves placing the pointer to the VTable as the first dam member in the object. Also, the first slot in the VTable is a pointer to the VTable record of the shared library manager.

Using the class ID of the object determined from the class VTable record, and the parent ID provided when cast object was called, the verify class routine is then called (block 402). If the verify class succeeds, then it is determined from the class VTable record of the object, whether single or multiple inheritance is the case is found (block 403).

If a case of single inheritance, then the algorithm is done because the offsets are determinate in that case (block 404). If a case of multiple inheritance is encountered, then the correct offsets are found within the object to the data of the parent class (block 405). This can be determined based on the place of the parent class in the hierarchy of parent classes found in the TClass records. (See Appendix TLibraryManager::CastObject and ::interact CastObject).

GetClassInfo is a member function of TLibraryManager, or a non-member function is provided which calls gLibraryManager->GetClassInfo for you. Given a class id which specifies a given base class and an error code pointer it returns a TClassInfo for the given class if the class is registered in the class catalog. The TClassInfo can then be used to iterate over all of the derived classes of the given base class. If the class is not registered or an error occurs GetClassInfo returns NULL. (See Appendix, TLibraryManager::The GetClassInfo).

Figure 13:
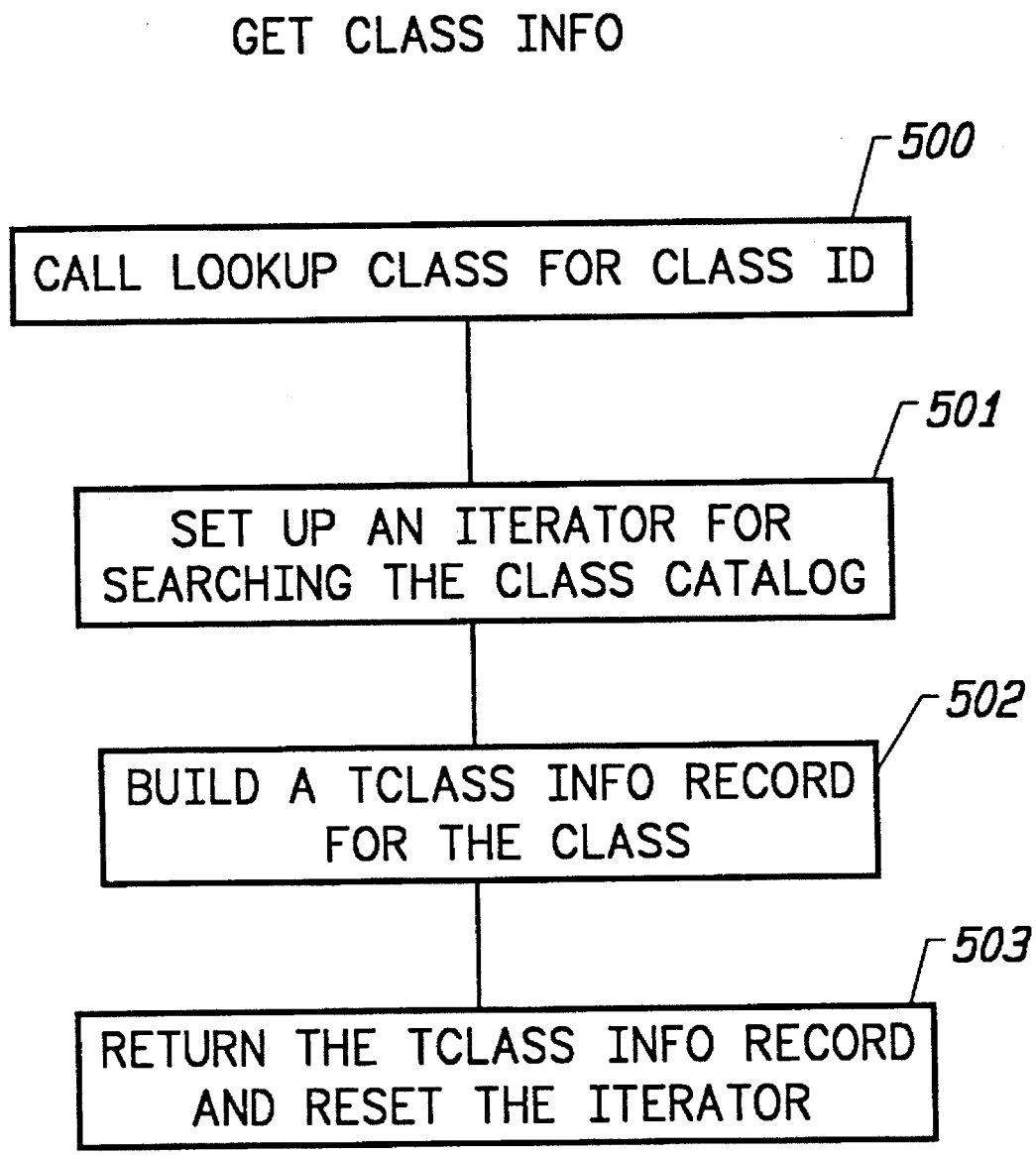
FIG. 13 is a flowchart for a GetClassInfo routine executed by the shared library manager.

The GetClassInfo algorithm is shown in FIG. 13. It involves the following: Steps:

1. Call the LookupClass function with the class id. If this returns a pointer that is not NULL then we know that the class is registered with the class catalog. If it returns NULL then set the error code to kNotFound and return NULL for the function return value (block 500).

2. Using the fClasses field of fClassCatalog, which is a TCollection class instance, call the CreateIterator function. If the iterator cannot be created then return NULL for the function return value and set the error code to kOutOfMemory (block 501).

3. Create a TClassInfo instance and set the fIterator field to the iterator returned in step 2. Set the fBaseClassID field to the given class id. If the TClassInfo cannot be created then return NULL as the function return value and set the error code to kOutOfMemory (block 502).

4. Call the Reset function of the iterator to re-start the iteration. Return the TClassInfo as the function return value and set the error code to kNoError (block 503).

The functions of TClassInfo which include using the TClassInfo instance returned by GetClassInfo::

| | |
|---|---|
| virtual void | Reset( ); |
| virtual void* | Next( ); // safe to cast to TClassID* or char* |
| virtual Boolean | IterationComplete( ) const; |
| // TClassInfo methods | |
| TClassID* | GetClassID( ); |
| Boolean | GetClassNewObjectFlag( ) const; |
| Boolean | GetClassPreloadFlag( ) const; |
| size_t | GetClassSize( ) const; |
| TLibrary* | GetLibrary( ) const; |
| TLibraryFile* | GetLibraryFile( ) const; |
| unsigned short | GetVersion( ) const; |
| unsigned short | GetMinVersion( ) const; |

Copyright Apple Computer 1991–1993

Data members of TClassInfo include:

| | |
|---|---|
| TClassID | fBaseClassID; |
| TClassID | fClassID; |
| TLibrary* | fLibrary; |
| TLibraryFile* | fLibraryFile; |
| unsigned short | fVersion; |
| unsigned short | fMinVersion; |
| Boolean | fNewObjectFlag; |
| Boolean | fPreloadFlag; |
| Boolean | fFunctionSetFlag; |
| Boolean | fFiller; |
| size_t | fSize; |
| TIterator* | fIterator; |
| TClass* | fClass; |

Copyright Apple Computer 1991–1993

Reset—starts the iteration over from the beginning.
Next—gets the next derived class in the list.
IterationComplete—returns true if Next has been called for all derived classes of the given base class.
GetClassID—returns the class id of a derived class (fClassID).
GetClassNewObjectFlag—returns true if the class id returned by GetClassID can be used to create an object using the NewObject function.
GetClassPreloadFlag—returns true if the class is preload flag is set to preload the class implementation at boot time.
GetClassSize—returns the size of the data structure for an instance of the class.
GetLibrary—returns the TLibrary for the class.
GetLibraryFile—returns the TLibraryFile for the class.
GetVersion—returns the current version of the class.
GetMinVersion—returns the minimum compatible version of the class.

The algorithm for TClassInfo includes the following steps.

1. When the TClassInfo is created the fBaseClassID field is set to the class id passed to GetClassInfo, the fIterator field is set to a class catalog iterator which iterates the TClass records registered in the class catalog, and fClass is set to the TClass for the class corresponding to fBaseClassID.

2. The function Next sets the data members fClassID, fLibrary, fLibraryFile, fVersion, fMinVersion, fNewObjectFlag, fFunctionSetFlag and fSize. It gets this information from the next TClass record, using the fIterator, which has the desired "is derived from" relationship of the class given by fBaseClassID.

3. The "getter" functions listed above return the information in the corresponding data member of TIterator.

4. The first time the getter functions are called, or after Reset is called, the information returned is for the fBaseClassID class itself.

Source code for the cast object, verify class, new object and get class info routines is provided in the Appendix. Also, the Appendix provides selected class interfaces and functions which may be helpful in understanding a particular implementation of the present invention, when considered with the detailed description of the run-time architecture which follows.

A more detailed description of a particular implementation of the shared library manager is provided below with reference to a code written for the Macintosh™ computer.

Overview

The Shared Library Manager (SLM) described herein provides dynamic linking and loading facilities for the 68K Macintosh. The system can be adapted to any platform desired by the user. SLM provides dynamic loading, a.k.a. on-demand loading, both for procedural programs and for C++ programs. This is different from the traditional approach of launch-time loading, also referred to as "full transitive closure", which means that all required libraries are loaded and relocated at once when an application is launched.

SLM provides procedural programming support for exporting and importing functions from C, Pascal, Assembler, or any language with compatible calling conventions. In addition, SLM provides extensive support for exporting and importing C++ classes, with an emphasis on providing the dynamic features which are fundamental to building extensible applications and system components for Macintosh.

Shared libraries can be installed at any time and called in a transparent fashion. There is no dependency when building a client on where the libraries that it uses are, what the filename(s) are, or how many of them may eventually be used during a session. The libraries are loaded and unloaded dynamically based on use counts. The SLM takes care of all of the details of binding and loading, and the client only has to know the interfaces to the classes and functions that it wants to use.

SLM provides facilities for instantiating objects by class name, for enumerating a class hierarchy, and for verifying the class of an object or the class of a class.

Basis of the Architecture

The architecture for SLM is based on the 68K run-time architecture and the MPW tools architecture. A build tool, for the SLM takes an exports file (.exp) and an MPW object file (.o) as input and generates a library file. It does this by processing these files and then calling the MPW linker to finish the job.

For C++ libraries, SLM is based on the MPW/AT&T 2.1 CFront v-table dispatching model. Development tools must generate v-tables compatible with this model. In particular, we assume that the first entry in the v-table is not used—SLM uses it to point to class "meta-data".

SLM also requires the v-table pointer to be the first data member in an object in order for certain functions to work. Since these functions do not know the class of the object (their job is to find out the class) they can only find the class meta-data via the v-table pointer if it is in a known place in the object.

It is theoretically possible for SLM to support more than one dispatching model, however for interoperability it would not be desirable to have more than one model. A dispatching agent could arbitrate between different dispatching models or even different calling conventions which would introduce considerable run-time overhead. It would be possible for different dispatching models to co-exist and yet not interoperate.

SLM and 68K libraries support both single (SI, Single-Object rooted) and multiple inheritance (non-SingleObject rooted) classes.

A development tool wishing to support the SLM in a non-MPW environment will need to generate a 'libr' resource, a set of code resources, and optionally, a 'libi' resource, a shown in FIG. 7. The jump table resource is not modified at build time—it is a normal model far jump table. It is modified by SLM at load time but the build tools don't need to be aware of this. The glue that does 32-bit relocation and the data initialization glue are code libraries statically linked into the library initialization segment.

Shared libraries have a jump table resource ('code' 0) plus an initialization code segment ('code' 1) plus at least one implementation segment ('code' 2 and up). If more than one library is in a library file then the resource type for each set of code resources must be unique (usually 'cd01', 'cd02' etc.).

Library resource—Specifies the type of the 'code' resources, and the classes and function sets exported by this library. Of course, the resource ID for each 'libr' resource in a file must be unique.

Jump Table resource—Always present in the file, present in memory only if -SegUnload option is used to SLMBuilder. Note that NoSegUnload is the default.

Initialization code segment resource—Only contains code linked to %A5Init or A5Init segment and used at initialization time, must not contain any other code unless -SegUnload option is used to SLMBuilder.

Implementation code segment(s)—Contains any implementation code for the library, including the CleanupProc if any. Often libraries will have only one implementation segment although there is no harm in having more. Implementation segments are numbered 2 and up.

When the SLM loads a library, the jump table resource is loaded, plus the initialization segment. After initialization this segment is released—it will not be needed again unless the library is unloaded and then reloaded.

If the "NoSegUnload" option is used (NoSegUnload option to LibraryBuilder is the default) then all code segments are loaded. The jump table plus the relocation information generated for each segment is used to relocate the jump table based addresses in the code to absolute addresses pointing to the target function in the target code resource. The jump table resource is then released. When using this option the library should normally have only one implementation segment but this is not a requirement.

If the "SegUnload" option is used (SegUnload option to LibraryBuilder) then the implementation segment is loaded, plus any segments designated preload (preload resource bit can be set on a per-segment basis from a statement in the .r file), or all segments are loaded if a library itself is designated preload (preload flag in the Library descriptor). Each jump table based reference in the code is relocated to point to the absolute address of the jump table entry. The jump table is modified to contain pc-relative jsr instructions instead of segment loader traps. The jsr goes to the SLM segment loader entry point just before the jump table (in the 32 byte gap). This limits the size of the jump table to 32K, which should not be a problem since libraries should not be huge bodies of code—library files can easily have multiple libraries in them if packaging is an issue. It is a jsr and not a jmp since the segment loader uses the return address, which now points to the last two bytes of the jump table entry, to compute which segment is to be loaded. At load time the SLM moves the segment number information out of the jump table entry to an array following the jump table. This is due to the fact that the jsr pc relative takes 2 more bytes than the original segment loader trap. Note that all the machinations on the jump table are transparent to a tool developer.

A segment is loaded when a jump table (jt) entry is called and the jump table is then modified to contain an absolute jump for all jt entries for that segment. When segments are unloaded, the pc relative jsr is put back in the jump table for each entry for that segment.

The data segment based addresses (the "global world", i.e. what would have been A5 based) are relocated to the absolute address of the data.

Building a Shared Library

Any application, extension, driver, or other stand-alone code resource on the Macintosh can use shared libraries. Of course, a client can also be another shared library. A shared library can import and export functions or classes. A non-library client (for brevity, an "application") can only import functions or classes. An application can sub-class an imported class, but it cannot export a class. This is a minor limitation since an application can contain shared libraries as resources in the application itself, or register a special folder containing shared libraries that are effectively part of the application.

The Shared Library Manager accomplishes it's sharing by examining and modifying the object file destined to become a shared library. It generates several source and resource files that are then used to create the shared library and to provide clients with linkable "stubs" to gain access to the functions and classes in the shared library. In the sections which follow, we will examine each of these files.

Dispatching Architecture

First and foremost of the files generated by the SLM LibraryBuilder tool is the file SharedLibTemp.stubs.a. This is an assembly language file that contains the stubs for all of the functions that are exported. Exported functions fall into five categories. They are: 1) function set function; 2) class constructor; 3) class destructor; 4) class virtual functions; and 5) class non-virtual functions. There is a separate dispatching function for each of these classifications, and the stubs are generated slightly different for each. Each one will be examined in detail shortly. For the purposes of explaining the architecture, an exported function in a function set will be used.

For each dispatching function, there are 5 parts. The first two parts are supplied by the build tool, and are unique for each function. The other 3 parts are supplied by the SLM.

The first part is a structure called a stub record (see FIG. 6).

```
_stbSample  RECORD      EXPORT
            IMPORT      _CVRExampleFSet:Data
            DC.L        0
            DC.L        _CVRExampleFSet
            DC.L        0
            DC.W        3
            ENDR
```

Copyright Apple Computer 1991–1993

The stub record contains 2 fields used internally by the Shared Library Manager (the first and third fields in the example shown above). The second field is a pointer to the ClientVTableRec. The ClientVTableRec is a structure (see FIG. 6) that is linked with the application that has all of the information that the SLM needs to dynamically find and load the function set or class referenced by the stub.

This is the "C" definition of the ClientVTableRec:

```
{
    TLink*   fClassLinkPtr;
    long     fClassSerialNumber;
    long     fCodeSerialNumber;
    short    fVersion;
    short    fMinVersion;
    char     fClassIDStr[2];
};
```

Copyright Apple Computer 1991–1993

The fClassLinkPtr field contains information used by the SLM to cache the link to the internal TClass object which contains all of the information known about the class or function set. The two serial number fields are used to insure that the cached information is still valid (if the library unloaded and a new version of a class or function set in the library was dragged into a registered folder, any cached information is invalid). The version number fields contain information about the version number of the class or function set that your application (code resource, extension, etc.) linked with, and the fClassIDStr field contains the actual ClassID of the class or function set so that it can be found in the SLM catalog.

The last field in the stub record is an index. It tells the SLM which entry in the function set VTable contains a pointer to the desired function.

Most stub dispatching comes in 3 speeds—very fast, fast, and slow. Very fast dispatching occurs when you have already used the function before. In this case, the first field of the stub record contains the address of the actual function, and can be called immediately. If you have never called this function before, then a dispatching stub is called which causes the SLM to examine the ClientVTableRec. If you have already used another function in this same class or function set, then the ClientVTableRec already contains cached information as to the location of the tables containing the function addresses. In this case, your stub is updated so that the address of the function is cached for next time, and the function is then called. If the ClientVTableRec does not contain cached information, then the SLM must look up the class or function set by the ClassID stored in the ClientVTableRec, load the library containing the class or function set if it is not already loaded, update the cached information in the ClientVTableRec, update the cached information in the stub, and then finally call the function.

The second part of the dispatching mechanism is the actual stub code that a client links with:

calls a first level dispatching function called _SLM11FuncDispatch (or one of the other 4 variations of this function).

This function is the third part of the dispatching code:

```
_SLM 1 1 FuncDispatch    PROC    Export
        move.l    $2B6,a1
        move.l    $10C(a1),a1
        move.l    SLMGlobal.fStubHelp + 16(a1),a1
    IF  MODEL = 0 THEN
        move.l    _gLibraryManager,d0
    ELSE
        move.l    (_gLibraryManager).L,d0
    ENDIF
        jmp       (a1)
        ENDP
```

Copyright Apple Computer 1991–1993

The first two instructions fetch the SLM globals. The SLM stores it's global information in a low-memory structure known as the ExpandMemRec (location $2B6 in the Macintosh contains a pointer to this structure). The SLM global information is stores as a pointer at offset $10C in this structure. One of the fields in this structure contains a vector of dispatch functions. This dispatcher uses the 5th element in the vector to dispatch through (this is the vector to dispatch functions in function sets).

The code for this dispatching function (and the other four variations) are supplied in LibraryManager.o and LibraryManager.n.o, so clients can link with it.

```
Sample    PROC EXPORT
          IMPORT      _stbSample:Data
    IF MODEL = 0 THEN
          lea         _stbSample,a0      ;Get the stub record into a0
    ELSE
          lea         (_stbSample).L,a0
    ENDIF
          move.l      (a0),d0            ; Get the cached function address
          beq.s       @1                 ; Not cached - do it the hard way
          move.l      d0,a0              ; Get address into a0
          jmp         (a0)               ; and jump to it
          IMPORT      _SLM 1 1 FuncDispatch
@1
    IF MODEL = 0 THEN
          jmp         _SLM 1 1 FuncDispatch    ; More extensive dispatching needed
    ELSE
          jmp         (_SLM 1 1 FuncDispatch).L
    END
    IF MACSBUG = 1 THEN
          rts
          DC.B        $80, $06
          DC.B        Sample
          DC.W        0
    ENDIF
          ENDP
```

Copyright Apple Computer 1991–1993

Normally two (or maybe four) versions of the stub are assembled—one in model near (MODEL=0), and one in model far (MODEL=1). There may also be debugging versions generated with Macsbug symbols for each (MACSBUG=1).

Notice that the first thing that the stub does is to check whether the first field of the stub record is non-zero. If it is, it just jumps through the pointer stored there. Otherwise, it The fourth part of stub dispatch is the second level dispatching function that is stored in this vector:

```
SLMFuncDispatch    PROC    Export
    move.l    d0,-(sp)      ; Push the library manager
    move.l    a0,-(sp)      ; Push the stub record
    move.l    d0,a0         ; Put TLibraryManager into a0
    move.l    20(a0),a0     ; Get the class catalog
```

-continued

```
move.l   a0,-(sp)
move.l   (a0),a0
move.l   CatVTable.LookupFunction(a0),a0
jsr      (a0)         ; Call the LookupFunction method
lea      12(sp),sp    ; Drop parameters
move.l   d0,a0        ; Get the function
jmp      (a0)         ; Call it
```

Copyright Apple Computer 1991–1993

This dispatcher calls a function in the TClassCatalog object, which is the fifth and final part of stub dispatch. A partial declaration for TClassCatalog follows.

```
#define kTClassCatalogID        "!$ccat, 1.1"
typedef ClientVTableRec         CVR;
typedef FunctionStubRec         FSR;
typedef void                    (*VF)(void);
typedef VTable                  VF[ ];
class TClassCatalog : public TDynamic
{
                                TClassCatalog( );
virtual                         ~TClassCatalog( );
//
// These first functions are here for backward compatibility with
// SLM 1.0
//
if COMPAT10
        virtual VR              ExecDestructor(CVR*) const;
        virtual VR              ExecConstructor(CVR*, size_t idx) const;
        virtual VR              ExecVTableEntry(CVR*, size_t idx) const;
        virtual VR              ExecExportEntry(CVR*, size_t idx) const;
        virtual void            ExecFunction(FSR*, TLibrary Manager*) const;
        virtual VR              ExecRootDestructor(CVR*) const;
        virtual VR              ExecRootConstructor(CVR*, size_t idx) const;
        virtual VR              ExecRootVTableEntry(CVR*, size_t idx) const;
        virtual VR              ExecRootExportEntry(CVR*, size_t idx) const;
#endif
        virtual VF              LookupFunction(FSR*, TLibraryManager*);
        virtual VTableRec*      GetVTableRecMemory(size_t num) const;
        virtual VTableRec*      Init1VTableRec(VTableRec*, ProcPtr setupProc,
                                    CVR* client) const;
        virtual VTableRec*      InitVTableRec(VTableRec*, VTable vTable,
                                    VTable exportTable, CVR* parent,
                                    long size, char*) const;
        virtual VTableRec*      InitVTableRec(VTableRec*, VTable exportTable,
                                    char*) const;
#if COMPAT10
        virtual VTableRec*      GetGenVTableRec(CVR*) const;
#endif
        virtual VTableRec*      LookupVTableRec(CVR* theClient) const;
        virtual VTableRec*      GetVTableRec(CVR*, Boolean isSub) const;
        virtual VTableRec*      ReleaseVTableRec(CVR*) const;
        virtual OSErr           InitLibraryManager(TLibraryManager**, long*,
                                    size_t poolsize,
                                    ZoneType theZone,
                                    MemoryType theMemType);
        virtual Boolean         CleanupLibraryManager(TLibraryManager**);
        virtual VF              GetDestructor(FSR*, TLibraryManager*) const;
        virtual VF              GetConstructor(FSR*, TLibraryManager*,
                                    Boolean isSub) const;
        virtual VF              GetVTableEntry(FSR*, TLibraryManager*) const;
        virtual VF              GetExportEntry(FSR*, TLibraryManager*) const;
        virtual VTableRec*      GetParentVTableRec(CVR*) const;
};
```

Copyright Apple Computer 1991–1993

There are five routines in the TClassCatalog, corresponding to each of the five dispatch methods. They are: 1) LookupFunction; 2) GetConstructor; 3) GetDestructor; 4) GetVTableEntry; and 5) GetExportEntry.

It is not necessary that any generated code know vtable offsets into the class catalog. These offsets are known by the vectorized dispatch code. In fact, the dispatch code was vectorized specifically so that offsets in the TClassCatalog could change without causing recompilation of clients.

This fifth and final dispatch routine does the actual finding of the class, and storing of any cached values.

In the code examples that follow, code and structures that have a bold header and trailer is code that must be generated by a build tool in order to create a shared library. Code that is not in bold is shown only for reference.

Generating Function Set Code

To import a function a client has to include the interface file when compiling (in C, the .h file), and link with client object file (.cl.o or .cl.n.o) provided by the library developer. The client object file contains the client stubs for the functions that the client calls.

Consider the following example function set which is exported by the ExampleLibrary.

This is the FunctionSet declaration in the exports file (ExampleLibrary.exp):

```
FunctionSet ExampleFSet
{
    id = kExampleFunctionSet;
//
//We could use the following export line, but we want all exported
//functions from the library to be exported, so we say nothing!
//
// exports = Hello, extern HelloC, pascal extern HelloPascal, Goodbye,
//           pascal GoodbyePascal, TExampleClass::Test;
};
```

Copyright Apple Computer 1991–1993

These are the prototypes from the interface file (ExampleLibrary.h):

```
        char* Hello(ulong&);
        char* Hello(ulong*);
        extern "C" char* HelloC(ulong*);
        ulong Goodbye( );
        pascal Ptr HelloPascal(ulong& theHelloTicks);
        pascal ulong GoodbyePascal( );
```

Copyright Apple Computer 1991–1993

Function Set Function Dispatching (Stubs)

The build tool, LibraryBuilder, generates stubs to be linked with the client for each FunctionSet function exported by a given library.

A stub is generated for each function. Here is the stub record and the stub that is generated for the "HelloC" function (in SharedLibTemp.stubs.a):

```
    _stbHelloC  RECORD      EXPORT
                IMPORT      _CVRExampleFSet:Data
                DC.L        0
                DC.L        _CVRExampleFSet
                DC.L        0
                DC.W        3
                ENDR
HelloC          PROC        EXPORT
                IMPORT      _stbHelloC:Data
        IF MODEL = 0 THEN
                lea         _stbHelloC,a0
        ELSE
                lea         (_stbHelloC).L,a0
        ENDIF
                move.l      (a0),d0
                beq.s       @1
                move.l      d0,a0
                jmp         (a0)
                IMPORT      _SLM 1 1 FuncDispatch
@1
        IF MODEL = 0 THEN
                jmp         _SLM 1 1 FuncDispatch
        ELSE
                jmp         (_SLM 1 1 FuncDispatch).L
        END
        IF MACSBUG = 1 THEN
                rts
                DC.B        $80, $0B
                DC.B        'stub_HelloC'
                DC.W        0
        ENDIF
                ENDP
```

Copyright Apple Computer 1991–1993

This is the structure of the stub record in C:

```
struct FunctionStubRec
{
    VirtualFunction      fFunction;
    ClientVTableRec*     fClientVTableRec;
    FunctionStubRec*     fNextStubRec;
    unsigned short       fFunctionID;
};
```

Copyright Apple Computer 1991–1993

When the stub is called, it first checks to see if the address of the function is already cached. If so, it jumps immediately to the function. Otherwise, it jumps to the function dispatcher (_SLM11FuncDispatch) with the stub record as a parameter in register A0. The stub dispatcher then obtains the address of the actual dispatching code from a low-memory global set up when SLM was originally loaded, and it jumps to that code. This extra indirection allows SLM the flexibility to modify the function loading and dispatching mechanism without affecting client code (since clients are linked with the _SLM11FuncDispatch code).

This is the function dispatcher that is linked with the client.

```
_SLM 1 1 FuncDispatch   PROC    Export
        move.l      $2B6,a1
        move.l      $10C(a1),a1
        move.l      SLMGlobal.fStubHelp + 16(a1),a1
    IF  MODEL = 0 THEN
        move.l      _gLibraryManager,d0
    ELSE
        move.l      _gLibraryManager).L,d0
    ENDIF
        jmp         (a1)
        ENDP
```

Copyright Apple Computer 1991–1993

This is the actual function dispatcher that is linked with the Shared Library Manager for reference:

```
_SLMFuncDispatch    PROC    Export
    move.l   d0,-(sp)                ; Push the library manager
    move.l   a0,-(sp)                ; Push the stub record
    move.l   d0,a0                   ; Put TLibraryManager into a0
    GetClassCatalog a0               ; Get the class catalog into a0
    move.l   a0,-(sp)                ; Push it
    move.l   (a0),a0                 ; Get the VTable
    move.l   CatVTable.LookupFunction(a0),a0    ; Get the
                                                 function
    jsr      (a0)                    ; Call it
    lea      12(sp),sp               ; Pop the parameters
    move.l   d0,a0                   ; Get the function address
    jmp      (a0)                    ; jump to it
    ENDP
```

Copyright Apple Computer 1991–1993

The CatVTable.LookupFunction is a call to the TClassCatalog::LookupFunction method.

A ClientVTableRec is generated per function set (to be linked with the client in SharedLibTemp.stubs.a):

```
_CVRExampleFSet   RECORD   EXPORT
    DC.L    0, 0, 0
    DC.W    $0100
    DC.W    $0000
    DC.B    'appl:exam$ExampleFSet', 0
    ENDR
```

Copyright Apple Computer 1991–1993

Function Set Function Dispatching (Initialization)

The initialization code is generated in two files: SharedLibTemp.init.a and SharedLibTemp.init.c. Most of the generated code is in "C", but for each class or function set, a ClientVTableRec is generated which is put into the assembly file. It is possible to put the ClientVTableRec definition in "C" (the inline "C"-string makes it a little more challenging, but it can be done), but we chose to leave it in assembly. Strictly speaking, if your initialization code is going to link with your stub library, a ClientVTableRec does not need to be generated for initialization, but it makes things easier just to generate one as a matter of course.

The vector table is generated into SharedLibTemp.Init.c (to be linked with the library):

```
typedef void (*ProcPtr)(void);
ProcPtr _vtbl_ExampleFSet[ ] =
{
    0,                                  // First entry is normally 0
    (ProcPtr)Hello_FRUI,
    (ProcPtr)Hello_FPUI,
    (ProcPtr)HelloC,
    (ProcPtr)HELLOPASCAL,
    (ProcPtr)Goodbye_Fv,
    (ProcPtr)GOODBYEPASCAL,
    (ProcPtr)Test_13TExampleClassSFUI,
    (ProcPtr)Test_13TExampleClassSFPc,
    0,
};
```

Copyright Apple Computer 1991–1993

The SLM allows functions to be exported by name, as well. If any functions are exported by name, one more structure is created. Assuming that the HelloC routine and the GOODBYEPASCAL routine were to be exported by name, the following extra code would be generated:

```
static char _Str_Sample_2[ ] = "HelloC";
static char _Str_Sample_2[ ] = "GOODBYPASCAL";
char* SampleNameStruc[ ] =
{
    (char*)-1L,
    (char*)-1L,
    _Str_Sample_1,
    (char*)-1L,
    _Str_Sample_2,
    0
};
```

Copyright Apple Computer 1991–1993

Any slot corresponding to a function that is not exported by name is filled with a (char*)-1L. A slot with a NULL (0) pointer terminates the list of names. A pointer to this list of names is stored in the first entry of the vector table:

```
ProcPtr _vtbl_ExampleFSet[ ] =
{
    (ProcPtr)SampleNameStruc,
    (ProcPtr)Hello_FRUI,
```

```
    (ProcPtr)Hello_FPUI,
    (ProcPtr)HelloC,
    (ProcPtr)HELLOPASCAL,
    (ProcPtr)Goodbye_Fv,
    (ProcPtr)GOODBYEPASCAL,
    (ProcPtr)Test_13TExampleClassSFUI,
    (ProcPtr)Test_13TExampleClassSFPc,
    0,
};
```

Copyright Apple Computer 1991–1993

An initialization function is generated for each function set.

First, let's show you the header generated for the initialization file (generated in SharedLibTemp.init.c):

```
typedef struct ClientVTableRec
{
    long    l1;
    long    l2;
    long    l3;
    short   v1;
    short   v2;
    char    name[ ];
} ClientVTableRec;
void Fail(long err, const char* msg);
extern void** _gLibraryManager;    //A convenient lie?
extern void_pure_virtual_called(void);
typedef void (*ProcPtr)(void);
typedef struct_mptr { short o; short i; ProcPtr func; } _mptr;
typedef ProcPtr* VTable;
typedef void      (*SetupProc)(void*, unsigned int);
typedef void*     (*Init1VTableRec)(void*, void*, SetupProc,
                                    ClientVTableRec*);
typedef void*     (*InitVTableRec)(void*, void*, VTable, VTable,
                                    ClientVTableRec*, unsigned int, char*);
typedef void*     (*GetVTableRec)(void*, ClientVTableRec*,
                                    unsigned char);
typedef void*     (*ReleaseVTableRec)(void*, ClientVTableRec*);
typedef void*     (*InitExportSet)(void*, void*, VTable, char*);
typedef void*     (*GetVTableMemory)(void*, unsigned int);
#define GetClassCatalog (_gLibraryManager[5])
```

Copyright Apple Computer 1991–1993

Now the SVR (SVR stands for Setup VTableRec) function (generated in SharedLibTemp.init.c):

```
#pragma segment A5Init
void_SVRExampleFSet(void* vtRec, unsigned int vtRecSize)
{
    register ProcPtr toCall;
    void** catalog = GetClassCatalog;   // Get Class Catalog
    void** ctVTable = *catalog;         // Get it's VTable
    //
    // Get pointer to 22nd entry, which is InitExportSet
    // function
    //
    toCall = (ProcPtr)ctVTable[22];
    //
    // Call it with the following parameters:
    // 1)   The pointer to the class catalog
    // 2)   The vtable record pointer passed in to your function
    // 3)   A pointer to the vtable we created for the
    //      function set.
    // 4)   A zero for future expansion
    //
    (*(InitExportSet)toCall)(catalog,
        vtRec, _vtbl_ExampleFSet, 0);
}
```

Copyright Apple Computer 1991–1993

The first parameter to the SVR function is known as the VTableRec.

This is the definition of the VTableRec structure. This information is for reference only.

```
struct VTableRec
{
    VTable              fVTablePtr;
    VTable              fExportTable;
    TUseCount           fUseCount;    // "long" in size
    void*               fReserved;
    ClientVTableRec*    fParentClientPtr;
    unsigned short      fSize;
    unsigned            fParentIsVirtual:1;
    unsigned            fFiller:1;
    unsigned            fCanNewObject:1;
    unsigned            fIsFunctionSet:1;
    unsigned            fIsRootClass:1;
    unsigned            fLocalCVRIsParent:1;
    unsigned            fIsParentVTable:1;
    unsigned            fIsMasterOrLast:1;
    unsigned char       fDispatcher;
    ClientVTableRec*    fLocalClientPtr;
    union
    {
        SetupProc           fSetup;
        TRegisteredObjects* fRegisteredObjects;
    };
};
```

Copyright Apple Computer 1991–1993

The VTableRec is used internally by the SLM to keep track of information about each function set or class. Library initialization code supplies all of the information the SLM needs to fill in the VTableRec.

One initialization function per library is generated which calls the SLM to register all of the ClientVTableRecs and SVR functions. This example shows initialization for the example library, which has the function set ExampleFSet and the class TExampleClass. Those parts of this code that you would change depending on what you are initializing are underlined.

```
#pragma segment A5Init
void*_InitVTableRecords(void)
{
    register ProcPtr toCall;
    void* vtRec;
    void* savedRec;
    void** catalog = GetClassCata-    // Get Class Catalog
    log;
    void** ctVTable = *catalog;       // Get it's VTable
    //
    //  Get the pointer to GetVTableMemory, and call it, asking
    //  for memory for 2 VTableRecs (Of course, you would ask
    //  for the number of VTableRecs that you need).
    //
    toCall = (ProcPtr)ctVTable[19];
    savedRec = (*(GetVTableMemory)toCall)(catalog,2);
    //
    //  Get the pointer to the Init1VTableRec method
    //
    toCall = (ProcPtr)ctVTable[20];
    //
    //  Start 'vtRec' pointing to the memory that we got.
    //
    vtRec = savedRec;
    //
    //  Call Init1VTableRec for our first export (a Class,
        in this
    //  case). Parameters are:
    // 1) The class catalog
    // 2) The VTableRec Memory
    // 3) A pointer to the "SetupVTableRec" procedure
    // 4) A pointer to the local "ClientVTableRec"
    //  The method will return a pointer to the next
    //  VTableRec for use with additional initialization.
    //  Using this method, it is not required for you to
```

"know" the size of a VTableRec
```
    //
    vtRec = (*(Init1VTableRec)toCall)(catalog, vtRec,
                                     _SVRTExampleClass,
                                     &_CVRTExampleClass);
    //
    //  Do it for the next export (a function set, in this example)
    //
    vtRec = (*(Init1VTableRec)toCall)(catalog,
                                     vtRec,_SVRExampleFSet,
                                     &_CVRExampleFSet);
    //
    // Return a pointer to the original VTableRec
    //
    return savedRec;
}
```

Copyright Apple Computer 1991–1993

Singly-Inherited Classes (Stubs)

This section will examine the stub creation for a C++ class which is singly-inherited. This includes both forms of vtables—SingleObject derived, and standard AT&T v2.1 classes. Classes which are multiply-inherited (derive from more than 1 parent class) are handled in a separate section.

Here is the definition of the TExampleClass (from ExampleClass.h)

```
#define kTExampleClassID   "appl:examSTExampleClass,1.1"
class TExampleClass : public TDynamic
{
    public:
                           TExampleClass( );
        virtual            ~TExampleClass( );
        // New Methods
        virtual char*      GetObjectName( ) const;
        virtual void       SetObjectName(char *theName);
        virtual void       DoThisAndThat( );
        virtual void       DoThat( );
        virtual void       SetGlobalInt(long theValue);
        virtual long       GetGlobalInt( );
        // Public non-virtual function
        // Dynamically exported by using ExportFunction
        void               GetGlobalRef(long*&);
        // Public static function
        // Dynamically exported by the ExportFunction
        static Boolean     Test(ulong test);
        static Boolean     Test(char* test);
    private:
        char *fName;
        //    static gExampleClassCount counts the
              number of instances
        static long        gExampleClassCount;
};
```

Copyright Apple Computer 1991–1993

Constructor Stubs

Constructor stubs are generated for each constructor of a class. If the export file specifies that no constructor stubs are to be exported (using the noMethodStubs or noStubs flag), then the constructor stubs must be created in the assembly language portion (SharedLibTemp.Init.a) of the initialization file. This is so that use counts can be properly maintained for every class.

A stub record is generated to be linked with both the client and the library (in SharedLibTemp.stubs.a or SharedLibTemp.init.a, as appropriate). This record is used much like the record for a function set—It contains cached information that is used to speed up the dispatching. In addition, it contains the index into the "structor table" for the actual address of the constructor (see the class initialization section for information on creating this table).

```
_stb_ct_13TExampleClassFv  RECORD  EXPORT
    IMPORT    _CVRTExampleClass:Data
    DC.L      0
    DC.L      _CVRTExampleClass        ; ClientVTableRec
    DC.L      0
    DC.W      3                        ; Index into table
    ENDR
```

Copyright Apple Computer 1991–1993

A constructor stub is generated to be linked with both the client and the library (in SharedLibTemp.stubs.a or SharedLibTemp.init.a, as appropriate):

```
_ct_13TExampleClassFv  PROC  EXPORT
    IMPORT       _stb_ct_13TExampleClassFv:Data
    IF MODEL = 0
    LEA          _stb_ct_13TExampleClassFv,a0
    ELSE
    LEA          (_stb_ct_13TExampleClassFv).L,a0
    ENDIF
    IMPORT       _SLM11ConstructorDispatch
    IF MODEL = 0
    JMP          _SLM11ConstructorDispatch
    ELSE
    JMP          (_SLM11ConstructorDispatch).L
    ENDIF
    IF MACSBUG = 1 THEN
    rts
    DC.B         $80, $1C
    DC.B         'stub_ct_13TExampleClassFv'
    DC.B         0
    DC.W         0
    ENDIF
    ENDP
```

Copyright Apple Computer 1991–1993

Notice that the constructor does not use any cached information to jump to the constructor directly. This is so that use counts may be updated (see the next bullet point).

This is the constructor function dispatcher that is linked with the client. This is for reference only—the client should link with the version supplied by SLM.

```
_SLM11ConstructorDispatch  PROC  Export
    WITH    FunctionStubRec
    tst.l   (a0)                        ; Constructor pointer cached?
    beq.s   @2                          ; No - do it the hard way
    move.l  clientCVR(a0),a1            ; Get the ClientVTableRec
    move.l  (a1),a1                     ; Get the ClassLinkPtr
    move.l  4(a1),a1                    ; Get the TClass
    move.l  TClass.vtRec(a1),a1         ; Get the VTableRec pointer
    addq.l  #1,VTRec.useCount(a1)       ; Increment the use count
    beq.s   @1                          ; Have to do the library count?
    move.l  (a0),a0                     ; No - go on
    jmp     (a0)                        ; Jump to the constructor
;
; Here, we have to bump the libraries use count - so we
; call the SLMConstructorDispatch function - but first, we
; have to back off the VTableRec use count we just incremented
;
@1  subq.l  #1,VTRec.useCount(a1)       ; Back off the VTableRec use count
@2
    move.l  $2B6,a1
    move.l  $10C(a1),a1
    move.l  SLMGlobal.fStubHelp + 4(a1),a1
    IF MODEL = 0 THEN
    move.l  _gLibraryManager,d0
    ELSE
    move.l  (_gLibraryManager).L,d0
    ENDIF
    jmp     (a1)
    ENDP
```

Copyright Apple Computer 1991–1993

Under normal circumstances, the bumping the use count of the VTableRec is all that is required, so dispatching is moderately fast. The only time that the more general dispatching mechanism needs to be invoked is if the constructor has never been invoked by the current client before, and there are no outstanding instances of this class among all clients of the SLM.

Of course, if your compiler has a different naming convention for constructors, you must generate stubs that have the same name as the ones generated (See the initialization section for more information).

This is the actual constructor function dispatcher that is linked with the Shared Library Manager. This is for reference only:

```
SLMConstructorDispatch  PROC  Export
    move.l   d0,a1       ; Save the library manager in a1
    moveq    #1,d0
;
; We test the "this" pointer to see if it's NULL. If it is, then
; the object is being "newed", so we set d0 to 0, to tell the SLM
; that we are fetching a primary object, and not a subclass. This
; allows the SLM a little more latitude in version matching.
;
    tst.l    4(sp)                         ; Check the "this" pointer
    bne.s    @1
    moveq    #0,d0
@1  move.l   d0,-(sp)                      ; Push the "isSubClass" flag
    move.l   a1,-(sp)                      ; Push the library manager
    move.l   a0,-(sp)                      ; Push the stub record
    move.l   20(a1),a0                     ; Get class catalog from lib mgr
    move.l   a0,-(sp)                      ; Push it
    move.l   (a0),a0                       ; Get it's vtable
    move.l   CatVTable.GetConstructor(a0),a0
    jsr      (a0)                          ; Call the GetConstructor entry
    lea      16(sp),sp                     ; Drop parameters
    move.l   d0,a0                         ; Fetch constructor address
    jmp      (a0)                          ; Jump to it
    ENDP
```

Copyright Apple Computer 1991–1993

The CatVTable.GetConstructor is a call to the TClassCatalog::GetConstructor method.

Destructor Stubs

Destructor stubs are generated for the destructor of an exported class. If the export file specifies that the destructor stub are not to be exported (using the noMethodStubs or noStubs flag), then the destructor stub must be created in the assembly language portion (SharedLibTemp.Init.a) of the initialization file. This is so that use counts can be properly maintained for every class.

The destructor stub is generated to be linked with both client and library (in SharedLibTemp.stubs.a or SharedLibTemp.init.a, as appropriate). Note that the stub record for a destructor is slightly smaller than one for a constructor or a normal function. This is because we do not need to store the index to the destructor in that table—it is always two (see the class initialization section for more information).

```
_stb_dt_13TExampleClassFv  RECORD  EXPORT
        IMPORT      _CVRTExampleClass:Data
        DC.L        0
        DC.L        _CVRTExampleClass
                    ; Client VTable Rec
        DC.L        0
        ENDR
_dt_13TExampleClassFv  PROC  EXPORT
        IMPORT      _stb_dt_13TExampleClassFv:Data
    IF MODEL = 0
        LEA         _stb_dt_13TExampleClassFv,a0
    ELSE
        LEA         (_stb_dt_13TExampleClassFv).L,a0
    ENDIF
        IMPORT      _SLM11DestructorDispatch
    IF MODEL = 0
        JMP         _SLM11DestructorDispatch
    ELSE
        JMP         (_SLM11DestructorDispatch).L
    ENDIF
    IF MACSBUG = 1 THEN
        rts
        DC.B        $80, $1C
        DC.B        'stub_dt_13TExampleClassFv'
        DC.B        0
        DC.W        0
    ENDIF
        ENDP
```

Copyright Apple Computer 1991–1993

Notice that the destructor does not use any cached information to jump to the destructor directly. This is so that use counts may be updated (see the next bullet point).

This is the destructor function dispatcher that is linked with the client. This is for reference only—the client should link with the version supplied by SLM. The DestStub record looks just like a function stub record, except that it is one short shorter (it does not need the funcID field, it is known to be two (2)).

```
DestStub    Record 0
function        DS.L    1
clientCVR       DS.L    1
nextPtr         DS.L    1
                ENDR
_SLM11DestructorDispatch PROC Export
        WITH    DestStub
        tst.l   (a0)                        ; Destructor pointer cached?
        beq.s   @2                          ; No - do it the hard way
        move.l  clientCVR(a0),a1            ; Get the ClientVTableRec
        move.l  (a1),a1                     ; Get the ClassLinkPtr
        move.l  4(a1),a1                    ; Get the TClass
        move.l  TClass.vtRec(a1),a1         ; Get the VTableRec pointer
        subq.l  #1,VTRec.useCount(a1)       ; Decrement the use count
        bmi.s   @1                          ; Have to do the library count?
        move.l  (a0),a0                     ; No - go on
        jmp     (a0)                        ; Jump to the destructor
;
; Here, we have to bump the libraries use count - so we
; call the SLMDestructorDispatch function - but first, we
; have to back off the VTableRec use count we just incremented
;
@1      addq.l  #1,VTRec.useCount(a1)       ; Back off the VTableRec use count
@2
        move.l  $2B6,a1
        move.l  $10C(a1),a1
        move.l  SLMGlobal.fStubHelp(a1),a1
    IF MODEL = 0 THEN
        move.l  _gLibraryManager,d0
    ELSE
        move.l  (_gLibraryManager).L,d0
    ENDIF
        jmp     (a1)
        ENDP
```

Copyright Apple Computer 1991–1993

Under normal circumstances, the decrementing of the use count of the VTableRec is all that is required, so dispatching is moderately fast. The only time that the more general dispatching mechanism needs to be invoked is if the destructor has never been invoked by the current client before, and we are destroying the last outstanding instance of this class among all clients of the SLM.

This is the actual destructor function dispatcher that is linked with the Shared Library Manager. This function is the most complex of the dispatching functions. This is because calling the destructor of an object can cause a library to unload. Unloading only occurs when SystemTask is called. However, if the destructor were to call SystemTask, this might be highly embarrassing, so we go to some lengths to insure that the library cannot be unloaded until we return from the destructor. This is for reference only:

```
SLMDestructorDispatch  PROC   Export
     WITH    SLMGlobal
        move.l   d0,-(sp)                      ; Push the library
                                                  manager
        move.l   a0,-(sp)                      ; Push the stub record
        move.l   d0,a0                         ; Put TLibraryManager
                                                  into a0
        move.l   20(a0),a0                     ; Get the class catalog
        move.l   a0,-(sp)                      ; Push it
        move.l   (a0),a0                       ; Get the destructor
        move.l   CatVTable.GetDestructor(a0),a0
        jsr      (a0)                          ; Call class catalog
        lea      12(sp),sp                     ; Drop parameters
;
; Here, we're being possibly being unloaded at the next
; System Task. Just in case the destructor calls SystemTask,
; we disable code unloading until the destructor is finished
; running. We shift the stack down by 4 bytes so that we can
; save a return address, and get returned to ourselves by
; the destructor
;
GetSLMGlobal
        addq.l   #1,fNoSystemTask(a0)          ; Keep system task
                                                  from unloading
        move.l   (sp),d1                       ; Save return address
        move.l   4(sp),(sp)                    ; Shift Parm 1
        move.l   8(sp),4(sp)                   ; Shift Parm 2
        move.l   d1,8(sp)                      ; Save original return
                                                  address
        move.l   d0,a0
        jsr      (a0)                          ; Call the destructor
GetSLMGlobal
        subq.l   #1,fNoSystemTask(a0)          ; Let system task
                                                  unload now
        move.l   8(sp),a0                      ; Recover return address
        move.l   4(sp),8(sp)                   ; Put parms back where
                                                  they belong
        move.l   (sp),4(sp)
        addq.l   #4,sp                         ; Drop return address
                                                  slot
        jmp      (a0)                          ; And return to caller
        ENDP
```

Copyright Apple Computer 1991–1993

The CatVTable.GetDestructor is a call to the TClassCatalog::GetDestructor method.

Virtual Method Stubs

A virtual method stub is generated for each virtual function which may be linked with the client (in SharedLibTemp.stubs.a), unless the client specified NoStubs or NoVirtualStubs in the export declaration for the class. These stubs are only used by a client that creates stack objects since the compiler generates a direct call when the dot syntax is used. The compiler is "smart" and "knows" the class of the object so it does not generate a v-table indirect call. It would be better for SLM if the compiler had an option to generate v-table calls anyway.

```
__stbGetObjectName__13TExampleClassCFv  RECORD  EXPORT
             IMPORT      __CVRTExampleClass:Data
             DC.L        0
             DC.L        __CVRTExampleClass
             DC.L        0
             DC.W        9           ; Index in VTable
             ENDR
GetObjectName__13TExampleClassCFv  PROC  EXPORT
             IMPORT      __stbGetObjectName__13TExampleClassCFv:Data
     IF MODEL = 0
             LEA         __stbGetObjectName__13TExampleClassCFv,a0
     ELSE
             LEA         (__stbGetObjectName__13TExampleClassCFv).L,a0
     ENDIF
             move.l      (a0),d0    ; Is function address cached!
             beq.s       @1         ; No - do it the hard way
             move.l      d0,a0      ; Yes - get address into a0
             jmp         (a0)       ; and jump
     IF MODEL = 0
             LEA         __CVRTExampleClass,a0
     ELSE
             LEA         (__CVRTExampleClass).L,a0
     ENDIF
             IMPORT      __SLM11VTableDispatch
@1
     IF MODEL = 0
             JMP         __SLM11VTableDispatch
     ELSE
             JMP         (__SLM11VTableDispatch).L
     ENDIF
     IF MACSBUG = 1 THEN
             rts
             DC.B        $80, $26
             DC.B        'stub__GetObjectName__13TExampleClassCFv'
             DC.B        0
```

```
        DC.W         0
ENDIF
        ENDP
```

Copyright Apple Computer 1991–1993

Notice that for virtual method stubs, we can once again cache the actual address of the function and call it directly.

This is the virtual function dispatcher that is linked with the client.

```
_SLM11VTableDispatch  PROC  Export
        move.l    $2B6,a1
        move.l    $10C(a1),a1
        move.l    SLMGlobal.fStubHelp + 8(a1),a1
        IF MODEL = 0 THEN
            move.l   _gLibraryManager,d0
        ELSE
            move.l   (_gLibraryManager).L,d0
        ENDIF
        jmp       (a1)
        ENDP
```

Copyright Apple Computer 1991–1993

This is the actual virtual function dispatcher that is linked with the Shared Library Manager.

```
SLMVTableDispatch  PROC  Export
        move.l    d0,-(sp)        ; Push the library manager
        move.l    a0,-(sp)        ; Push the stub record
```

-continued

```
        move.l    d0,a0              ; Get lib mgr into a0
        move.l    20(a0),a0          ; Get class catalog from lib mgr
        move.l    a0,-(sp)           ; Push it
        move.l    (a0),a0            ; Get it's vtable
        move.l    CatVTable.GetVTableEntry(a0),a0
        jsr       (a0)               ; Call the GetVTableEntry entry
        lea       12(sp),sp          ; Drop parameters
        move.l    d0,a0              ; Fetch function address
        jmp       (a0)               ; Jump to it
        ENDP
```

Copyright Apple Computer 1991–1993

Non-Virtual Method Stubs

Many classes use both virtual and non-virtual functions. Virtual functions allow subclasses to override the behavior of a class, while non-virtual functions do not. SLM supports stubs for the non-virtual methods to be generated (generated automatically unless noStubs or noMethodStubs is specified in the export declaration for the class). Note that SLM does not export static methods automatically in this manner. Static methods should normally be exported in a function set, since they do not require an instance of the class to be in existence in order for calling the method to be valid.

A non-virtual member function stub is generated for each non-virtual member function (to be linked with the client in SharedLibTemp.stubs.a)

```
_stbGetGlobalRef__13TExampleClassFRPI  RECORD  EXPORT
        IMPORT          _CVRTExampleClass:Data
        DC.L            0
        DC.L            _CVRTExampleClass
        DC.L            0
        DC.W            0         ; Index into _exptbl array
        ENDR
GetGlobalRef__13TExampleClassFRPI  PROC  EXPORT
        IMPORT          _stbGetGlobalRef__13TExampleClassFRPI:Data
        IF MODEL = 0
            LEA         _stbGetGlobalRef__13TExampleClassFRPI,a0
        ELSE
            LEA         (_stbGetGlobalRef__13TExampleClassFRPI).L,a0
        ENDIF
        move.l      (a0),d0    ; Is Address cached?
        beq.s       @1         ; No - do it the hard way
        move.l      d0,a0      ; Yes - get address into a0
        jmp         (a0)       ; and jump
        IMPORT      _SLM11ExtblDispatch
@1
        IF MODEL = 0
            JMP         _SLM11ExtblDispatch
        ELSE
            JMP         (_SLM11ExtblDispatch).L
        ENDIF
        IF MACSBUG = 1 THEN
            rts
            DC.B       $80, $26
            DC.B       'stub_GetGlobalRef__13TExampleClassFRPI'
            DC.B       0
            DC.W       0
        ENDIF
        ENDP
```

Copyright Apple Computer 1991–1993

This is the non-virtual function dispatcher that is linked with the client.

```
_SLM11ExtblDispatch  PROC  Export
        move.l    $2B6,a1
        move.l    $10C(a1),a1
        move.l    SLMGlobal.fStubHelp + 12(a1),a1
    IF MODEL = 0 THEN
        move.l    _gLibraryManager,d0
    ELSE
        move.l    (_gLibraryManager).L,d0
    ENDIF
        jmp       (a1)
        ENDP
```

Copyright Apple Computer 1991–1993

This is the actual non-virtual function dispatcher that is linked with the Shared Library Manager.

```
SLMExtblDispatch   PROC    Export
    move.l    d0,-(sp)            ; Push the library manager
    move.l    a0,-(sp)            ; Push the stub record
    move.l    d0,a0               ; Get lib mgr into a0
    move.l    20(a0),a0           ; Get class catalog from lib mgr
    move.l    a0,-(sp)            ; Push it
    move.l    (a0),a0             ; Get it's vtable
    move.l    CatVTable.GetExportEntry(a0),a0
    jsr       (a0)                ; Call the GetExportEntry entry
    lea       12(sp),sp           ; Drop parameters
    move.l    d0,a0               ; Fetch function address
    jmp       (a0)                ; Jump to it
    ENDP
```

Copyright Apple Computer 1991–1993

Static Method Stubs

Static methods should normally be exported by function sets, since they are not associated with an instance of an object. You can export a specific static method by specifying "exports=<ClassName>::<StaticMethod>" in your function set declaration, or you can export all static methods of a class by specifying "exports=static<ClassName>" in the declaration.

Singly-Inherited Classes (Initialization)

This section will examine the initialization code for a C++ class which is singly-inherited. This includes both forms of vtables—SingleObject derived, and standard AT&T v2.1 classes. Classes which are multiply-inherited (derive from more than 1 parent class) are handled in a separate section.

ClientVTableRecord for TExampleClass:

```
_CVRTExampleClass          RECORD  EXPORT
    DC.L    0, 0, 0
    DC.W    $0110
    DC.W    $0110
    DC.B    'appl:exam$TExampleClass', 0
    ENDR
```

Copyright Apple Computer 1991–1993

Of course the vtable for TExampleClass is generated by the compiler. The symbol for it is imported (SharedLibTemp.init.c):

```
        extern ProcPtr_vtbl_13TExampleClass[];
```

Copyright Apple Computer 1991–1993

The symbols for the non-virtual member functions (in this case GetGlobalRef) and the constructor and destructor are imported. The names of the constructor and destructor have been mangled with a 'q' to distinguish them from the stubs.

SLM modifies the object file that contains the constructor and destructor so that their names are different. This forces any reference to the constructor or destructor from within the library to also go through the stub. This is so that use counts can be maintained. If a library were to create an object, give it to the client, and have the client destroy the object, it would be possible for the library to unload even though there are outstanding references to it, since construction did not increment the use count, but destruction did.

The stub for the constructor (the one without the 'q') is called by NewObject. The real constructors and destructors (the ones with the q mangling) are in the export table so they can be called from the stubs. The original symbols for the constructors and destructors in the object file (.o file) for the library are "q mangled" by the LibraryBuilder tool.

```
extern void _ct_13TExampleClassFv(void);
extern void _dtq_13TExampleClassFv(void);
extern void _ctq_13TExampleClassFv(void);
extern void GetGlobalRef_13TExampleClassFRPI(void);
```

Copyright Apple Computer 1991–1993

Two export tables are generated. One for the constructors and destructors (_extbl_<ClassName>) and one for non-virtual functions (_exptbl_<ClassName>).

```
ProcPtr_exptbl_TExampleClass[ ] =
{
        (ProcPtr)GetGlobalRef_13TExampleClassFRPI
};
ProcPtr_extbl_TExampleClass[ ] =
{
        (ProcPtr)_exptbl_TExampleClass,
        (ProcPtr)_ct_13TExampleClassFv,
        (ProcPtr)_dtq_13TExampleClassFv,
        (ProcPtr)_ctq_13TExampleClassFv
};
```

Copyright Apple Computer 1991–1993

Note that the first entry in the "extbl" points to the "exptbl". This allows a later version of the library to have new non-virtual method exports and new constructors. The first 4 entries of the _extbl_ are always fixed. They may be zero if the corresponding table or function does not exist. The second entry always points to the stub for the default constructor (the constructor with no arguments). The third entry always points to the "real" destructor, and the fourth entry always points to the "real" default constructor. Any entries after the fourth are for other versions of the constructors, and they always contain pointers to the "real" version (_ctq_) of those constructors.

The actual initialization code then needs to be generated.

```
#pragma segment A5Init
void_SVRTExampleClass(void* vtRec, unsigned int VtRecSize)
{
    register ProcPtr toCall;
    void** cat = GetClassCatalog;
    void** ctVTable = *cat;
    void* parentVtRec;
    //
    //Initialize the VTableRec for TExampleClass
    //
    {
        extern ProcPtr_vtbl_13TExampleClass[ ];
        extern ClientVTableRec_CVRTDynamic;
        toCall = (ProcPtr)ctVTable[21];
        //
        //Call InitVTableRec.
        //
        vtRec = (*(InitVTableRec)toCall)
            (cat, vtRec, _vtbl_13TExampleClass,
            _extbl_TExampleClass, &_CVRTDynamic, 8, 0);
```

```
}
//
//If there is a shared parent, Get it's VTableRec
//
toCall = (ProcPtr)ctVTable[25];
parentVtRec = (*(GetVTableRec)toCall)(cat,
    &_CVRTDynamic, 1);
/*************************
/* This code is OPTIONAL
*************************/
//
//If there are functions inherited from the parent, let's
//copy them. For a standard AT&T V2.1 vtable format, the
//copy code would be modified appropriately.
//
    {
        unsigned int idx;
        register VTable vtbl = *(VTable*)parentVtRec;
        register VTable myVTable = _vtbl_13TExampleClass;
        myVTable + = 2;
        vtbl + = 2;
        for (idx = 0; idx < 7; ++idx)
        {
            *myVTable++ = *vtbl++;
        }
    }
}
```

Copyright Apple Computer 1991–1993

This code does several things. The first is to initialize the VTableRec. The parameters to the InitVTableRec call are as follows:
1) A pointer to the class catalog, obtained from the GetClassCatalog macros.
2) A pointer to the VTableRec that was originally passed in to your initialization function.
3) A pointer to the vtable for the class
4) A pointer to the export table for the class
5) A pointer to the ClientVTableRec of the first "shared" parent class, looking backwards up the hierarchy. Normally, it is the ClientVTableRec of your parent class. However, if the parent class is not a shared class, then look at it's parent, and so on until you find a parent class that is shared. Leave this parameter NULL (zero) if no parent class is shared.
6) The size of the object, in bytes. This parameter is optional, and may be set to zero unless you want your class to be able to be instantiated with the NewObject function. If this is the case, you must supply the size as a negative number whose absolute value is the size of the object in bytes.
7) The last parameter is a flag to tell the SLM about the VTableRec. For singly-inherited classes, only two values are used. NULL (or 0) indicates that the class inherits from SingleObject or HandleObject and has a vtable format that is just an array of function pointers. A value of (char*)-1L indicates that the vtable has the format of an AT&T V2.1 vtable, which looks like:

```
typedef struct_mptr
{
    short o;
    short i;
    ProcPtr func;
}_mptr;
```

Copyright Apple Computer 1991–1993

Multiply-Inherited Classes (Stubs)

This section will examine the stub creation for a C++ class which is multiply-inherited. What follows is a set of declarations for several classes, culminating in the definition of the class TMixedClass2. These are the classes that will be used to demonstrate the generation of code for multiply-inherited classes.

```
#define kMMixin1ID "quin:test$MMixin1,1.1"
class MMixin1 : public MDynamic
{
    protected:
                            MMixin1(int a);
                            MMixinl( );
        virtual             ~MMixin1( );
    public:
        virtual int         Add1(int a);
        virtual int         Sub1(int a);
        int     fFieldm;
};
#define kMMixin2ID "quin:test$MMixin2,1.1"
class MMixin2 : public MDynamic
{
    protected:
                            MMixin2( );
                            MMixin2(int a);
        virtual             ~MMixin2( );
    public:
        virtual int         Add2(int a);
        virtual int         Sub2(int a);
        int     fFieldm;
};
#define kMMixin3ID "quin:test$MMixin3, 1.1"
class MMixin3 : public MDynamic
{
    protected:
                            MMixin3(int a);
                            MMixin3( );
        virtual             ~MMixin3( );
    public:
        virtual int         Add3(int a);
        virtual int         Sub3(int a);
        int     fFieldm;
};
//
//Non-shared class
//
class TMainClass : public TStdDynamic
{
    public:
                            TMainClass(int a);
        virtual             ~TMainClass( );
        virtual int         Mul(int a);
        virtual int         Div(int a);
        int     fFieldt;
};
#define kTMixedClassID "quin:test$TMixedClass,1.1"
class TMixedClass :     public TMainClass, virtual public
                        MMixin1,
                        public MMixin2
{
    public:
                            TMixedClass(int a);
                            TMixedClass( );
        virtual             ~TMixedClass( );
        virtual int         Sub1(int a);
        virtual int         Div(int a);
        virtual int         Add2(int a);
};
#define kTMixedClass2ID     "quin:test$TMixedClass2, 1.1"
class TMixedClass2 :    public TMixedClass, virtual public
                        MMixin1,
                        public MMixin3
{
    public:
                            TMixedClass2(int a);
                            TMixedClass2( );
        virtual             ~TMixedClass2( );
        virtual int         Sub2(int a);
        virtual int         Mul(int a);
        virtual int         Add1(int a);
        virtual int         Add3(int a);
};
```

Copyright Apple Computer 1991–1993

All stubs for multiply-inherited classes are generated in exactly the same way as for singly-inherited classes. This works because all inherited virtual functions are present in the primary vtable of the class.

If you encounter a case where this is not true, SLM provides a way to deal with it. Set the high bit (0x8000) of the index value (for whichever vtable the virtual function is present in), and add a second short (two bytes) immediately after it in the stub record which is the index number of the VTableRec (0=primary, 1=next one, etc.).

Multiply-Inherited Classes (Initialization)

This section will examine the initialization code for a C++ class which is multiply-inherited. The situation here is much different than for singly-inherited classes. Consider: using the hierarchy above, if one has an MMixin1 object in hand, is it a true MMixin1 object, or is it a TMixedClass2 object cast to an MMixin1, or even a TMixedClass object cast to an MMixin1? Information needs to be made available about the offset back to the "main" object. This allows the SLM function CastObject to work properly with objects which are instances of multiply-inherited classes.

This information is stored in the MMixin1 VTableRec, which is stored in the MMixin1 vtable. However, a different VTableRec is needed for an MMixin1 object which is "stand-alone", than for an MMixin1 object that is part of a TMixedClass2 object. This is because the offset to the "main" object is zero for a "stand-alone" object, and probably non-zero for one of many parents of a "main" object.

This leads us to the conclusion that in order to initialize a multiply-inherited class, multiple VTableRecs will need to be initialized in order to keep things running smoothly.

The initialization for classes MMixin1, MMixin2, and MMixin3 are exactly what you would expect for singly-inherited classes:

```
extern ClientVTableRec__CVRMMixin1;
extern void__ct__7MMixin1Fv(void);
extern void__dtq__7MMixin1Fv(void);
extern void__ctq__7MMixin1Fv(void);
extern void__ctq__7MMixin1Fi(void);
ProcPtr__extbl__MMixin1[ ] =
{
    0,
    (ProcPtr)__ct__7MMixin1Fv,
    (ProcPtr)__dtq__7MMixin1Fv,
    (ProcPtr)__ctq__7MMixin1Fv,
    (ProcPtr)__ctq__7MMixin1Fi
};
#pragma segment A5Init
void __SVRMMixin1(void* vtRec, unsigned int vtRecSize)
{
    register ProcPtr toCall;
    void** catalog = GetClassCatalog;
    void** ctVTable = *catalog;
    void* parentVtRec;
    extern ProcPtr__vtbl__7MMixin1[ ];
    toCall = (ProcPtr)ctVTable[21];
    vtRec = (*(InitVTableRec)toCall)(catalog, vtRec,
        __vtbl__7MMixin1, __extbl__MMixin1, 0, 8, (char*)0x0001);
}
extern ClientVTableRec__CVRMMixin2;
extern void__ct__7MMixin2Fv(void);
extern void__dtq__7MMixin2Fv(void);
extern void__ctq__7MMixin2Fv(void);
extern void__ctq__7MMixin2Fi(void);
ProcPtr__extbl__MMixin2[ ] =
{
    0,
    (ProcPtr)__ct__7MMixin2Fv,
    (ProcPtr)__dtq__7MMixin2Fv,
    (ProcPtr)__ctq__7MMixin2Fv,
    (ProcPtr)__ctq__7MMixin2Fi
};
#pragma segment A5Init
void __SVRMMixin2(void* vtRec, unsigned int VtRecSize)
{
    register ProcPtr toCall;
    void** catalog = GetClassCatalog;
    void** ctVTable = *catalog;
    void* parentVtRec;
    extern ProcPtr__vtbl__7MMixin2[ ];
    toCall = (ProcPtr)ctVTable[21];
    vtRec = (*(InitVTableRec)toCall)(catalog, vtRec,
        __vtbl__7MMixin2, __extbl__MMixin2, 0, 8, (char*)0x0001);
}
extern ClientVTableRec__CVRMMixin3;
extern void__ct__7MMixin3Fv(void);
extern void__dtq__7MMixin3Fv(void);
extern void__ctq__7MMixin3Fv(void);
extern void__ctq__7MMixin3Fi(void);
ProcPtr__extbl__MMixin3[ ] =
{
    0,
    (ProcPtr)__ct__7MMixin3Fv,
    (ProcPtr)__dtq__7MMixin3Fv,
    (ProcPtr)__ctq__7MMixin3Fv,
    (ProcPtr)__ctq__7MMixin3Fi
};
#pragma segment A5Init
void __SVRMMixin3(void* vtRec, unsigned int vtRecSize)
{
    register ProcPtr toCall;
    void** catalog = GetClassCatalog;
    void** ctVTable = *catalog;
    void* parentVtRec;
    extern ProcPtr__vtbl__7MMixin3[ ];
    toCall = (ProcPtr)ctVTable[21];
    vtRec = (*(InitVTableRec)toCall)(catalog, vtRec,
        __vtbl__7MMixin3, __extbl__MMixin3, 0, 8, (char*)0x0001);
}
```

Copyright Apple Computer 1991–1993

For all of these classes, the pointer to the parent ClientVTableRec is NULL, the sizes are 8 bytes long and are positive (indicating that they cannot be instantiated with NewObject), and the final parameter is a (char*)0x0001, indicating that the vtable format is the standard AT&T v2.1 format (remember that a 0 as this final parameter indicated that the vtable format was that of a class inherited from SingleObject) and that this is a primary vtable. Basically, the first byte of the pointer is a "dispatch code"—0 implies SingleObject dispatching, 1 implies AT&T v2.1 dispatching, and 2 implies SingleObject-type dispatching, but not in a SingleObject or HandleObject subclass.

The next byte tells what kind of VTableRecord this is. Zero (0) means the primary vtable. One (1) indicates that it is a "parent" vtable. A "parent" vtable holds the ClientVTableRec of the parent class which the vtable inherits from. Note that this is not the same as the class of objects which we derive from. Two (2) indicates that it is a "virtual parent" vtable. A "virtual" parent inherits the vtable from a "parent" class exactly like a "parent" vtable, but the class from which we derive is a "virtual" base class.

SLM assumes that for the secondary vtables that are generated, the first 8 bytes of the vtable are unused.

TMainClass is a non-shared class, so no initialization (or stubs) are generated for it. The next class to generate initialization for is TMixed Class. As you look over the generated code, you will notice that you need to be able to figure out the names of all of the extra vtables that a multiply-inherited class generates, as well as which entries in the vtable belong to the class itself, and which are inherited.

SLM also, dynamically copies function pointers from inherited vtables to avoid being linked with stubs. In order to keep the stubs from getting linked anyway, as the Library- Builder tool scans the vtables in the object file, it replaces calls to inherited functions with a call to _pure_virtual_ called. This keeps the linker from linking all of the stubs into the code.

```
extern ClientVTableRec__CVRTMixedClass;
extern void__ct__11TMixedClassFv(void);
extern void__dtq__11TMixedClassFv(void);
extern void__ctq__11TMixedClassFv(void);
extern void__ctq__11TMixedClassFi(void);
ProcPtr__extbl__TMixedClass[ ] =
{
    0,
    (ProcPtr)__ct__11TMixedClassFv,
    (ProcPtr)__dtq__11TMixedClassFv,
    (ProcPtr)__ctq__11TMixedClassFv,
    (ProcPtr)__ctq__11TMixedClassFi
};
#pragma segment A5Init
void__SVRTMixedClass(void* vtRec, unsigned int vtRecSize)
{
    register ProcPtr toCall;
    void** cat = GetClassCatalog;
    void** ctVTable = *cat;
    void* parentVtRec;
    //
    //Keep track of whether we got an error or not
    //
    int isOK = 0;
    //
    //Keep track of where we are in initialization.
    //
    unsigned int index = 0;
    //
    //Declare the needed viables and ClientVTableRecs
    //
    extern ProcPtr__vtbl__11TMixedClass[ ];
    extern ClientVTableRec__CVRTStdDynamic;
    extern ProcPtr__vtbl__7MMixin2__11TMixedClass[ ];
    extern ClientVTableRec__CVRMMixin2;
    extern ClientVTableRec__CVRMMixin2;
    extern ProcPtr__vtbl__7MMixin1__11TMixedClass[ ];
    extern ClientVTableRec__CVRMMixin1;
    extern ClientVTableRec__CVRMMixin1;
    //
    //Initialization is done in a do { } while (false) loop
    //so that we can break out of the loop. "index" will
    //tell us how far we got if we break out with an error
    //
    do
    {
        //
        //Start off with the primary vtable (_vtbl__11TMixedClass)
        //and initialize it. The primary vtable is initialized with
        //the last parameter to InitVTableRec as (char*)0x0001, indicating
        //that this is an AT&T V2.1-format vtable, and that this is a
        //primary vtable.
        //Like it's singly-inherited counterpart, if the size parameter
        //is negative, it indicates that the class can be instantiated with
        //a "NewObject" call.
        //
        toCall = (ProcPtr)ctVTable[21];
        vtRec = (*(InitVTableRec)toCall)
                (cat, vtRec, __vtbl__11TMixedClass,
                 __extbl__TMixedClass, &__CVRTStdDynamic, 28,
                    (char*)0x0001);
        //
        //Now, let's get the parent. The parent vtable to
        //__vtbl__11TMixedClass is the vtable for TMainClass. However,
        //TMainClass is a non-shared class. Since TMainClass is not
        //multiply-inherited, we just consider it's parent (TStdDynamic)
        //to be our parent and we get the parent VTableRec (this
        //forces TStdDynamic to stay loaded!)
        //
        toCall = (ProcPtr)ctVTable[33];
        parentVtRec = (*(GetVTableRec)toCall)(cat, &__CVRTStdDynamic, 1);
        if (parentVtRec = = 0) break;
        //
        //We increment index to indicate that, if something goes wrong,
        //we need to call ReleaseVTableRec on __CVRTStdDynamic
        //
        index + = 1;
```

```
/*
**Ordinarily, here we would copy all of our parent's methods that
**we inherit. However, since our immediate parent is not shared,
**copying methods from TStdDynamic would get us into trouble, since
**any methods overridden by TMainClass would be lost. We content
**ourselves with linking directly with any methods that TMainClass
**overrides, and with stubs to any that it does not.
*/
//
//Now, let's initialize the VTableRec for one of the other
//vtables. This VTable has the class MMixin2 as it's parent.
//A (char*)0x0101 is passed as the last parameter to indicate that
//this is a VTable for one of the non-primary "parents", but that
//it is not a "virtual" parent class.
//
toCall = (ProcPtr)ctVTable[21];
vtRec = (*(InitVTableRec)toCall)
        (cat, vtRec, __vtbl__7MMixin2__11TMixedClass,
         __extbl__TMixedClass, &__CVRMMixin2, 28,
             (char*)0x0101);
toCall = (ProcPtr)ctVTable[33];
//
//Fetch the parent VTableRec to force the parent's code to load
//
parentVtRec = (*(GetVTableRec)toCall)(cat, &__CVRMMixin2, 1);
if (parentVtRec = = 0) break;
//
//We increment "index" to indicate that, if something goes wrong
//we need to call ReleaseVTableRec on __CVRMMixin2 (and, of course,
//also __CVRTStdDynamic)
//
index + = 1;
/***********************
/* This code is OPTIONAL
***********************/
//
//Now, since we are inheriting from the class MMixin2, and it is
//a shared class, we copy the pointers from the vtable for MMixin2
//into our own vtable. The LibraryBuilder tool replaced all of
//these entries that were inherited with a reference to
//__pure__virtual__called so that the linker did not try to link with
//the stubs from the MMixin2 class.
{
    unsigned int idx;
    //
    //Get the VTable of MMixin2
    //
    register __mptr* vtbl = *(__mptr**)parentVtRec;
    //
    //Get my own VTable
    //
    register __mptr*myVTable=(__mptr*)__vtbl__7MMixin2__11TMixedClass;
    //
    //Save a pointer to the start of my VTable
    //
    __mptr* base = myVTable;
    //
    //Now, we skip the first entry, because it's blank
    //
    myVTable + = 1;
    vtbl + = 1;
    //
    //The second entry (which happens to be the destructor) is a
    //pointer to one of the routine of TMixedClass, and not an
    //inherited routine. The __mptr .o field of any method that
    //belongs to "this" class will have a negative number
    //indicating the offset that must be added to the parent class
    //pointer (in this case MMixin2) in order to get to the "real"
    //object. We save that value off in the second long of the
    //first __mptr entry (which is always unused in the AT&T v2.1
    //format)
    //
    base->func = (ProcPtr)(long)myVTable->o;
    //
    //Then, we skip entries that are our own, and copy any entries
    //that are inherited.
    //
    myVTable + = 2;
    vtbl + = 2;
    (*myVTable++).func = (*vtbl++).func;
```

```
    }
    /***************************
    /* This code is NOT Optional
    ***************************/
    //
    //Now, we initialize the last VTableRec. We pass (char*)0x0201 to
    //indicate to the SLM that this is a VTable corresponding to a
    //"virtual" parent class. One of the side effects of this is that
    //SLM will not allow you to cast a TMixedClass to an MMixin1
    //class (neither will C + +).
    //
    toCall = (ProcPtr)ctVTable[21];
    vtRec = (*(InitVTableRec)toCall)
            (cat, vtRec, __vtbl__7MMixin1__11TMixedClass,
             __extbl__TMixedClass, &__CVRMMixin1, 28, (char*)0x0201);
    toCall = (ProcPtr)ctVTable[33];
    parentVtRec = (*(GetVTableRec)toCall)(cat, &__CVRMMixin1, 1);
    if (parentVtRec = = 0) break;
    index + = 1;
    /***********************
    /*This code is OPTIONAL
    ***********************/
    //
    //Do all of the copying voodoo again
    /
    {
        unsigned int idx;
        register __mptr* vtbl = *(__mptr**)parentVtRec;
        register __mptr* myVTable =
                    (__mptr*)__vtbl__7MMixin1__11TMixedClass;
        __mptr* base = myVTable;
        myVTable + = 1;
        vtbl + = 1;
        base->func = (ProcPtr)(long)myVTable->o;
        myVTable + = 1;
        vtbl + = 1;
        (*myVTable + +).func = (*vtbl + +).func;
    }
    /***************************
    /* This code is NOT Optional
    ***************************/
    //
    //Flag success
    //
        isOK = 1;
    } while (0);
    //
    //If something went wrong, we have to call ReleaseVTableRec on any
    //parents where we already called GetVTableRec on. "index" tells us
    //how far we got, so we can back out.
    //Then we throw an exception.
    //
    if(isOK = = 0)
    {
        toCall = (ProcPtr)ctVTable[26];
        switch(index)
        {
            case 2: (*(ReleaseVTableRec)toCall)(catalog, &__CVRMMixin2);
            case 1: (*(ReleaseVTableRec)toCall)(catalog, &__CVRTStdDynamic);
            default: break;
        }
        Fail(-3120, 0);
    }
}
```

Copyright Apple Computer 1991–1993

A couple of key points to realize about the code on the previous pages. The first is that it is not strictly necessary to dynamically copy methods that are inherited. If you do not, then the vtable will link with stubs to the inherited methods, which will work just fine, and be only slightly slower.

It is also not strictly necessary to modify the object file to make inherited reference in the vtable point to __pure__ virtual__called. You could also still copy the pointers from your parent's vtable at runtime, and all that would happen is that the stubs become orphaned because no one uses them, so your library is a little bigger than it should be.

However, what is important is that you somehow determine the offset of the subclass from the main class and store that in the .func field of the first vtable entry for each VTableRec (i.e. the 4 bytes starting at offset 4 in the vtable). SLM chose to determine this at runtime, using the knowledge that the .o field of any vtable method that has been overridden by the main class has this offset already stored in it. This was easier than trying to fully parse the class declarations (with all the attendant knowledge of padding rules, etc) to determine them—but whatever method works for a given environment can be used. The offset is always a negative number.

Now, we get to the initialization code for the class TMixedClass2.

```
extern ClientVTableRec__CVRTMixedClass2;
extern void __ct__12TMixedClass2Fv(void);
extern void __dtq__12TMixedClass2Fv(void);
extern void __ctq__12TMixedClass2Fv(void);
extern void __ctq__12TMixedClass2Fi(void);
ProcPtr __extbl_TMixedClass2[ ] =
{
    0,
    (ProcPtr)__ct__12TMixedClass2Fv,
    (ProcPtr)__dtq__12TMixedClass2Fv,
    (ProcPtr)__ctq__12TMixedClass2Fv,
    (ProcPtr)__ctq__12TMixedClass2Fi
};
#pragma segment A5Init
void __SVRTMixedClass2(void* vtRec, unsigned int vtRecSize)
{
    register ProcPtr toCall;
    void** cat = GetClassCatalog;
    void** ctVTable = *cat;
    void* parentVtRec;
    int isOK = 0;
    unsigned int index = 0;
    extern ProcPtr __vtbl__12TMixedClass2[ ];
    extern ClientVTableRec__CVRTMixedClass;
    extern ClientVTableRec__CVRTMixedClass;
    extern ProcPtr __vtbl__20MMixin2__TMixedClass__12T-
MixedClass2[ ];
    extern ClientVTableRec__CVRTMixedClass;
    extern ClientVTableRec__CVRMMixin2;
    extern ProcPtr __vtbl__7MMixin1__12TMixedClass2[ ];
    extern ClientVTableRec__CVRTMixedClass;
    extern ClientVTableRec__CVRMMixin1;
    extern ProcPtr __vtbl__7MMixin3__12TMixedClass2[ ];
    extern ClientVTableRec__CVRMMixin3;
    extern ClientVTableRec__CVRMMixin3;
    do
    {
        //
        // Initialize the primary vtable which has TMixedClass
        // as a parent.
        //
        toCall = (ProcPtr)ctVTable[21];
        vtRec = (*(InitVTableRec)toCall)
                (cat, vtRec,__vtbl__12TMixedClass2,
                __extbl_TMixedClass2, &__CVRTMixedClass,
                36, (char*)0x0001);
        toCall = (ProcPtr)ctVTable[33];
        parentVtRec = (*(GetVTableRec)toCall)(cat,
        &__CVRTMixedClass, 1);
        if (parentVtRec == 0) break;
        index += 1;
        /************************
        /* This code is OPTIONAL
        ************************/
        //
        // Do the copying stuff
        //
        {
            unsigned int idx;
            register __mptr* vtbl = *(__mptr**)parentVtRec;
            register __mptr* myVTable =
                (__mptr*)__vtbl__12TMixedClass2;
            __mptr* base = myVTable;
            myVTable += 1;
            vtbl += 1;
            base->func = (ProcPtr)(long)myVTable->o;
            myVTable += 1;
            vtbl += 1;
            for (idx = 0; idx < 7; ++idx)
            {
                (*myVTable++).func = (*vtbl++).func;
            }
            myVTable += 1;
            vtbl += 1;
            (*myVTable++).func = (*vtbl++).func;
            (*myVTable++).func = (*vtbl++).func;
            (*myVTable++).func = (*vtbl++).func;
        }
        /****************************
        /* This code is NOT Optional
        ****************************/
        //
        // Initialize a secondary vtable, which corresponds to the
        // methods from the MMixin2 class, but is inherited from
        // TMixedClass
        //
        toCall = (ProcPtr)ctVTable[21];
        vtRec = (*(InitVTableRec)toCall)
                (cat, vtRec,__vtbl__20MMixin2__TMixedClass__12T-
                MixedClass2,__extbl_TMixedClass2, &__CVRTMixed-
                Class, 36, (char*)0x0101);
        toCall = (ProcPtr)ctVTable[33];
        //
        // Get the Parent vtable rec
        //
        parentVtRec = (*(GetVTableRec)toCall)(cat,
        &__CVRTMixedClass, 1);
        if (parentVtRec == 0) break;
        index += 1;
        /************************
        /* This code is OPTIONAL
        ************************/
        //
        // This vtable inherits from the vtable named
        // __vtbl__7MMinx2__11TMixedClass, which was the
        // 2nd VTable that was stored for TMixedClass, so we
        // skip the parentVtRec pointer ahead to the 2nd Vtable
        // so that we can properly inherit the methods.
        //
        parentVtRec = (char*)parentVtRec + 1*vtRecSize;
        //
        // Do the copying stuff
        //
        {
            unsigned int idx;
            register __mptr* vtbl = *(__mptr**)parentVtRec;
            register __mptr* myVTable =
                (__mptr*)__vtbl__20MMixin2__TMixed-
                Class____12TMixedClass2;
            __mptr* base = myVTable;
            myVTable += 1;
            vtbl += 1;
            base->func = (ProcPtr)(long)myVTable->o;
            myVTable += 1;
            vtbl += 1;
            (*myVTable++).func = (*vtbl++).func;
        }
        /****************************
        /* This code is NOT Optional
        ****************************/
        //
        // Initialize another secondary vtable. This one
        // corresponds to methods from MMixin1, but also
        // inherits from TMixedClass. It is flagged as a
        // virtual parent, since MMixin1 is declared as a
        // virtual parent in the "C++" header file.
        //
        toCall = (ProcPtr)ctVTable[21];
        vtRec = (*(InitVTableRec)toCall)
                (cat, vtRec,__vtbl__7MMixin1__12TMixedClass2,
                __extbl_TMixedClass2, &__CVRTMixedClass,
                36, (char*)0x0201);
        toCall = (ProcPtr)ctVTable[33];
        parentVtRec = (*(GetVTableRec)toCall)(cat,
        &__CVRTMixedClass, 1);
        if (parentVtRec == 0) break;
        index += 1;
        /************************
        /* This code is OPTIONAL
        ************************/
        //
        // This vtable inherits from the vtable named
        // __vtbl__7MMixin1__11TMixedClass, which was the
        // 3rd VTable that was stored for TMixedClass, so we
        // skip the parentVtRec pointer ahead to the 3rd Vtable
```

Column 49 (continued)

```
        // so that we can properly inherit the methods.
        //
        parentVtRec = (char*)parentVtRec + 2*vtRecSize;
        {
            unsigned int idx;
            register _mptr* vtbl = *(_mptr**)parentVtRec;
            register _mptr* myVTable =
                (_mptr*)_vtbl_7MMixin1_12TMixedClass2;
            _mptr* base = myVTable;
            myVTable += 1;
            vtbl += 1;
            base->func = (ProcPtr)(long)myVTable->o;
            myVTable += 2;
            vtbl += 2;
            (*myVTable++).func = (vtbl++).func;
        }
        /***************************
        /* This code is NOT Optional
        ***************************/
        toCall = (ProcPtr)ctVTable[21];
        vtRec = (*(InitVTableRec)toCall)
                (cat, vtRec,_vtbl_7MMixin3_12TMixedClass2,
                _extbl_TMixedClass2, &_CVRMMixin3, 36,
                (char*)0x0101);
        toCall = (ProcPtr)ctVTable[33];
        parentVtRec = (*(GetVTableRec)toCall)(cat,
            &_CVRMMixin3, 1);
        if (parentVtRec == 0) break;
        index += 1;
        /***********************
        /* This code is OPTIONAL
        ***********************/
        {
            unsigned int idx;
            register _mptr* vtbl = *(_mptr**)parentVtRec;
            register _mptr* myVTable =
                (_mptr*)_vtbl_7MMixin3_12TMixed-
                Class2;
            _mptr* base = myVTable;
            myVTable += 1;
            vtbl += 1;
            base->func = (ProcPtr)(long)myVTable->o;
            myVTable += 2;
            vtbl += 2;
            (*myVTable++).func = (*vtbl++).func;
        }
        /***************************
        /* This code is NOT Optional
        ***************************/
        isOK = 1;
    } while (0);
    if (isOK == 0)
{
    toCall = (ProcPtr)ctVTable[26];
    switch(index)
    {
        case 3: (*(ReleaseVTableRec)toCall)(catalog
            &_CVRTMixedClass);
        case 2: (*(ReleaseVTableRec)toCall)(catalog
            &_CVRTMixedClass);
        case 1: (*(ReleaseVTableRec)toCall)(catalog,
            &_CVRTMixedClass);
        default: break;
    }
    Fail(-3120, 0);
}
```

Copyright Apple Computer 1991–1993}

In order for the optional method copying to work, it is vital that the ordering of the vtables be the same no matter which C++ compiler generated the vtables. In the example above, we know that we must inherit from the 2nd and 3rd vtables in the list of vtables generated for TMixedClass (by the way, notice that you are passed the size of the VTableRec so that you can do the necessary calculations, and still allow us to change the size of a VTableRec later). If TMixedClass were generated in another library, it would be fatal for us to copy methods from those vtables if they were not generated in the same order that the SLM thinks they were generated in.

The SLM uses the order that is generated by AT&T's CFront. The algorithm looks like this:

1) Create a list of all of the parent classes in the order they were declared.
2) For each parent that was not declared "virtual", examine all of your parents and their parents, etc. If anywhere in the hierarchy, you find this parent declared "virtual", remove this class from this list of your parents.
3) Now, create two lists of parents, a "hasA" list for virtual parents, and an "isA" list for non-virtual parents. Starting at the beginning of your original parent list, if the parent is "virtual", put it at the front of the "hasA" list, and if it is not, put it at the back of the "isA" list.
4) Now, take the "hasA" list and move each parent on the list to the end of the "isA" list. You now have a list of the parent classes in the proper order.

Now, we can generate the names of the vtables from this list.

1) Create a new list for vtable names.
2) Create a vtable called _vtbl_##ClassName, where ## is the length of the class name. It's parent class is the first class in your parent list, unless that first class is flagged "virtual", in which case, there is no parent. Add this vtable to the end of the vtable list.
3) If the first thing in your parent list is a virtual parent, then another vtable must be generated with the following name:

_vtbl_##<ParentName>_##<MyName> where <ParentName> is the name of this first parent in the list. Add this vtable to the end of the vtable list.
4) Get the list of vtables belonging to the parent class that is first in your list. Skip the first vtable in this parent's list.
5) For each remaining vtable in this parent's list, create a new vtable name:

_vtbl_##<ParentSubName>_##<MyName>, where the <ParentSubName> is derived from the name of the parent VTable as follows:
1) Strip the _vtbl_ from the front of the vtable name
2) Remove the numbers from the end part of the vtable name
3) Change the numbers at the front of the vtable name so that they correspond to the length of the new string. For example, _vtbl_7MMixin1_11TMixedClass becomes _20MMixin1_TMixedClass.
6) If this new vtable name is not already in your list, append it to the end of the list.
7) For each remaining parent in your parent list, do steps 5 and 6 (do not skip the first vtable for the remaining parents).

At this point, you have a list of vtables for your class that is exactly the same list that the SLM LibraryBuilder tool will generate. Of course, this algorithm must be suitably modified for compilers that generate vtables with different naming conventions.

The following is the initialization code for the library that is created.

```
#pragma segment A5Init
void* _InitVTableRecords(void)
```

-continued

```
{
    register ProcPtr toCall;
    void* vtRec;
    void* savedRec;
    void** catalog = GetClassCatalog;
    void** ctVTable = *catalog;
    toCall = (ProcPtr)ctVTable[19];
    savedRec = (*(GetVTableMemory)toCall)(catalog, 10);
    toCall = (ProcPtr)ctVTable[20];
    VtRec = savedRec;
    //
    // Initialize the MMixin1 class
    //
    vtRec = (*(Init1VTableRec)toCall)
                    (catalog, vtRec,__SVRMMixin1,
                        &__CVRMMixin1);
    //
    // Initialize the MMixin2 class
    //
    vtRec = (*(Init1VTableRec)toCall)
                    (catalog, vtRec,__SVRMMixin2,
                        &__CVRMMixin2);
    //
    // Initialize the MMixin3 class
    //
    vtRec = (*(Init1VTableRec)toCall)
                    (catalog, vtRec,__SVRMMixin3,
                        &__CVRMMixin3);
    //
    // Initialize the TMixedClass class - primary vtable
    //
    vtRec = (*(Init1VTableRec)toCall)
                    (catalog, vtRec,__SVRTMixedClass,
                        &__CVRTMixedClass);
    //
    // Initialize the TMixedClass class - secondary vtable
    // corresponding to a parent class of MMixin2
    //
    vtRec = (*(Init1VTableRec)toCall)
                    (catalog, vtRec, 0, &__CVRMMixin2);
    //
    // Initialize the TMixedClass class - secondary vtable
    // corresponding to a parent class of MMixin1
    //
    vtRec = (*(Init1VTableRec)toCall)
                    (catalog, vtRec, 0, &__CVRMMixin1);
    //
    // Initialize the TMixedClass2 class - primary vtable
    //
    vtRec = (*(Init1VTableRec)toCall)
                    (catalog, vtRec,__SVRTMixedClass2,
                        &__CVRTMixedClass2);
    //
    // Initialize the TMixedClass2 class - secondary vtable
    // corresponding to a parent class of MMixin2
    //
    vtRec = (*(Init1VTableRec)toCall)
                    (catalog, vtRec, 0, &__CVRMMixin2);
    //
    // Initialize the TMixedClass2 class - secondary vtable
    // corresponding to a parent class of MMixin1
    //
    vtRec = (*(Init1VTableRec)toCall)
                    (catalog, vtRec, 0, &__CVRMMixin1);
    //
    // Initialize the TMixedClass2 class - secondary vtable
    // corresponding to a parent class of MMixin3
    //
    vtRec = (*(Init1VTableRec)toCall)
                    (catalog, vtRec, 0, &__CVRMMixin3);
    return savedRec;
}
```

Copyright Apple Computer 1991-1993

Notice that all of the secondary vtables have a 0 for the pointer to the initialization function. The SLM will assume that the initialization function for the first prior VTableRec which has one will take care of initialization for these VTableRecs. In addition, for all of the secondary vtables, the ClientVTableRec is not the ClientVTableRec of the class itself, but for the parent class which corresponds to the vtable which will be stored in the VTableRec, which is the class that we can cast the object to. For instance, if we look at the second call to Init1VTableRec for TMixedClass2, &__CVRMMixin2 is passed to the SLM. If we look at the SVR function for TMixedClass2, we find that __vtbl__ 20MMixin2__TMixedClass__12TMixedClass2 is the vtable that is stored into this VTableRec. This vtable is the vtable that will be used if a TMixedClass2 is cast to an MMixin2 object. However, notice that we passed &__CVRTMixedClass as the ClientVTableRec of the parent. This is because this vtable, while it belongs to the part of TMixedClass2 that is an MMixin2 object, actually is inherited from the __vtbl__ 7MMixin2__11TMixedClass vtable from TMixedClass.

The Shared Library

An SLM Shared Library consists of a number of resources, bound together by a resource id and a code resource type (see FIG. 8). Any number of these libraries can be placed in a single file, as long as the resource ids and code resource types used are unique.

All libraries have a 'libr' resource with a resource id. SLM will scan for all 'libr' resources within a library file in order to catalog all of the libraries within the file. Within the 'libr' resource, the code resource type that belongs to that library is defined. For library files with multiple libraries, these types are commonly 'cd01', 'cd02', etc.

In addition, each library may have a 'libi' resource which has the same resource id as the corresponding 'libr' resource. This 'libi' resource contains information about all of the shared classes and function sets which are needed by the library. The tool CreateLibraryLoadRsrc creates 'libi' resources.

The 'libr' resource

A library is installed when the SLM is initialized (normally at boot time) or when it is drag-installed into a library folder. This is normally the "Extensions" folder, but additional folders may be registered by applications as library folders.

When a library is installed, its 'libr' resource is read in by the library manager. The library manager keeps a catalog of Class IDs and FunctionSet IDs and the data for each which it gets from the 'libr' resource. Note that a library file may have more than one library in it, in which case it has multiple 'libr' resources.

The 'libr' resource format (note: the array LibrLine will not have more than one entry, multiple 'libr' resources will be present instead):

```
type 'libr' {
    array LibrLine {          /* information for a library */
        cstring;              /* Library id */
        align word;
        string[4];            /* code resource type */
        hex byte;             /* libr template major version */
        hex byte;             /* libr template minor version */
        hex byte;             /* Major version */
        hex byte;             /* Minor revision */
        hex byte;             /* Development stage */
        hex byte;             /* Release within stage */
        integer;              /* reserved in v1 (0) */
        integer;              /* PerClientDataSize in v1 (0 = */
                              /* default) */
        longint;              /* HeapSize in v1 (0 = default) */
        longint
            preload = 0x01,
            clientPool = 0x02,
            nosegunload = 0x04,
            loaddeps = 0x08,
            forcedeps = 0x10,
```

```
        loadself = 0x20,
        defaultHeap = 0x0000,
        tempHeap = 0x0100,
        sysHeap = 0x0200,
        appHeap = 0x0300,
        holdMemory = 0x0400,
        notSystem7 = 0x10000,
        notSystem6 = 0x20000,
        notVMOn = 0x40000,
        notVMOff = 0x80000,
        has FPU = 0x100000,
        hasNoFPU = 0x200000,
        not68000 = 0x400000,
        not68020 = 0x800000,
        not68030 = 0x1000000,
        not68040 = 0x2000000;    /* flags for the code */
                                 /* resource */
        integer = $$Countof(ClassIDs);       /* # class IDs */
        array ClassIDs  /* array of classids the library */
                        /* implements */
        {
            longint
                preload = 0x01,
                newobject = 0x02,
                isFunctionSet = 0x04;   /* flags for the class */
            integer;                    /* current version */
            integer;                    /* minimum version */
            cstring;                    /* the class id */
                                        /* string */
            align WORD;
            integer = $$CountOf(ParentIDs);
            array ParentIDs {
                cstring;
            };                          /* the parent class id */
                                        /* string */
            align WORD;
        };
    };
};
```

Copyright Apple Computer 1991–1993

ExampleLibrary 'libr' resource

```
#define SLMType 'code'
#define SLMID 0
resource 'libr' (SLMID) {
    {
        "appl$ExampleLibrary,1.1","code",
        0x01, 0x10, 0x01, 0x10, 0x60, 0x04, 0, 0, 2,
        {
            10, 0x0110, 0x0110, "appl:exam$TExampleClass",
            {
                "!$dyna"
            };
            4, 0x0110, 0x0110, "appl:exam$ExampleFSet", { };
        }
    }
};
```

Copyright Apple Computer 1991–1993

Multiple-inheritance example 'libr' resource

```
#define SLMType cod8
#define SLMID 8
resource 'libr' (SLMID) {
    {
        "quin:test$MITest1,1.1","cod8",
        0x01, 0x10, 0x01, 0x10, 0x20, 0x01, 0, 0, 6,
        {
            26, 0x0110, 0x0110, "quin:test$MMixin1",
            { };
            26, 0x0110, 0x0110, "quin:test$MMixin2",
            { };
            26, 0x0110, 0x0110, "quin:test$MMixin3",
            { };
            26, 0x0110, 0x0110, "quin:test$TMixedClass",
            {
                "*quin:test$MMixin1",
                "quin:test$MMixin2",
                "!$sdyn"
            };
            26, 0x0110, 0x0110, "quin:test$TMixedClass2",
            {
                "*quin:test$MMixin1",
                "quin:test$MMixin3",
                "quin:test$TMixedClass"
            };
        }
    }
};
```

Copyright Apple Computer 1991–1993

Notice that a star character '*' is put in front of the ClassID of any parent class which was defined as virtual in the class declaration.

There are several fields in the 'libr' resource which should be called to your attention.

1) The flags for the code resource. This field is a bitmap that defines the attributes of the library, as well as bits that can limit when the library will load. See the later section on the LibraryBuilder tool for the meaning of each of the bits.

2) The "heap" type is encoded in the lower 2 bits of the second byte of the flags. The next bit indicates whether the memory for the library should be "held" when Virtual Memory is in use.

3) The longint specifying heapsize. This allows you to specify the size of the heap you want the library to load in. Normally, SLM creates a heap big enough to hold all of the code in the library. If you are planning on loading and unloading segments manually, you might want to create a smaller heap.

4) The integer specify the per-client data size. If your library requires per-client data, SLM will manage it for you, but it needs to know the size of data required. You can then use the GetClientData function to retrieve a structure of this size for each client that you have.

5) The 'libr' template major and minor version numbers. These should always be set to 0×01 for the major version and 0×10 for the minor version. This corresponds to the 'libr' template definition for SLM.

6) The version number of the library is encoded in the library id.

The 'libi' Resource

Libraries and clients may have 'libi' resources. As has been previously indicated, the resource id of the 'libi' resource for a library must match the resource id of the 'libr' resource. For applications and clients, the 'libi' resource must have an id of 0.

The format of the 'libi' resource is:

```
type 'libi'
{
    longint = 0;    // version number
    longint = 0;    // reserved
    integer = $$CountOf(A5Offsets);
    array A5Offsets {
        integer;
    };
};
```

Copyright Apple Computer 1991–1993

Currently the 'libi' resource is nothing more than A5 offsets to the ClientVTableRecs that are used by the library or client. This allows us to create the 'libi' resource by scanning the map file created by linking the shared library or client for references to symbols that look like __CVRxxxxxxxx, and simply storing the A5 offset indicated into the resource.

Library Initialization

When a library is loaded the jump table ('code' 0) and initialization ('code' 1) resources are loaded and the entry point is called. The entry point routine initializes the static data for the library and then calls the init v-table function. The __InitVTableRecords function sets up the v-tables, vtable records (VTableRec), and binds them to the library manager internal catalog entry (TClass) for each function set and class in the library.

This is the entry point routine in the library. The Library-Builder link command (generated in SharedLibtemp.bat) uses the option "-m DynamicCodeEntry" which makes this the third jump table entry (in model far the first two entries are "dummy" entries).

```
extern "C" void__InitProc( );
extern "C" void__CleanupProc( );
extern TLibraryManager* __gLibraryManager;
#pragma segment A5Init
/***************************************************** ********
** DynamicCodeEntry
***************************************************** *******/
extern "C" long DynamicCodeEntry(
    CodeEntrySelector selector, long param1, long param2)
{
    VTableRecPtr    myVTableRecArray;
    switch (selector)
    {
        case kInitWorld:
            // Our own modified__DataInit routine relocates and
            // unpacks initialized data and relocates A5 relative
            // addresses.
            __InitData((Ptr) param1, (Ptr) param2);
            return 0;
        case kSetLibraryManager:
            __gLibraryManager = (TLibraryManager*) param1;
            return 0;
        case kInitLibraryProc:
            __InitProc( );
            return (long)__CleanupProc;
        case kSetupVTables:
            myVTableRecArray = __InitVTableRecords( );
            return (long) myVTableRecArray;
    }
}
```

Copyright Apple Computer 1991–1993

The Export Definition File

The "export" file defines the classes and functions to be exported. This file has 3 major components: A Library declaration, Class declarations and FunctionSet declarations. The full syntax for these declarations is described in the next section. In addition, "C" or "C++" style comments are allowed, as well as #include statements. The Library-Builder application is able to scan these include files to learn the definitions of #defined symbols that may make up parts of the export definitions.

A .exp file consists of comments, #include directives, #define directives, a Library declaration, plus Class and/or FunctionSet declarations.

The Library Declaration

The library declaration defines the ID of the shared library and the version. Additional parameters are available to configure the library.

```
Library
{
    initproc = <ProcName>;          optional
    cleanupProc = <ProcName>;       optional
    flags = <FlagOptions>;          optional
    id = <LibraryIDString>;         required
    version = <LibraryVersion>;     required
    memory = <MemoryOption>;        optional
    heap = <HeapType>;              optional
    clientdata = <ClientData Option>; optional
};
```

Copyright Apple Computer 1991–1993

Element Descriptions initproc

This declaration allows you to specify the name of a "C" routine (which takes no parameters and returns no value) which will be called immediately after loading and configuring the library. This routine may be in the A5Init segment, so that it is unloaded from memory after the library is fully loaded.

cleanupProc

This declaration allows you to specify the name of a "C" routine (which takes no parameters and returns no value) which will be called just before a library is unloaded from memory. This routine must not be in the A5Init segment since it cannot be reloaded.

flags=noSegUnload || !segUnload

This flag indicates that the segments of the shared library will not be unloaded by the client. The SLM resolves all jump table references to code addresses at library load time and removes the jump table from memory. This is the default setting.

flags=segUnload || !NoSegUnload

This flag indicates that the segments of the shared library may be unloaded by the client. The SLM will allow segments to be loaded and unloaded in the shared library, and will keep the jump table in memory.

flags=preload

This flag indicates that all segments of the shared library should be loaded at library load time. It does not guarantee that the segments will not be unloaded so the jump table must be kept in memory and intersegment references are left pointing to the jump table. "flags=!preload" is also supported, but is the default case.

flags=loaddeps

This flag indicates that the SLM should load all dependent classes whenever this library is loaded(based on the information in the 'libr' resource created during the build process). Using this flag will guarantee that all libraries that your library depends on exist. It does not guarantee that there is enough memory available to load them.

flags=forcedeps

This flag acts just like the "loaddeps" flag, but it forces the dependent libraries to be loaded into memory.

flags=stayloaded

This flag forces your library to stay loaded. It requires a call to UnloadLibraries from within your library to allow your library to unload. It is equivalent to calling LoadLibraries(true, true) within your InitProc. It also causes all of your dependencies to be loaded into memory (like the "forcedeps" flags).

flags=system6 || !system7

This indicates that your library should not be registered if it is installed on a system 7.x-based Macintosh. No clients will be able to see any of the classes or function sets in your library. This flag is useful if you have 2 different versions of your library—one for System 6.x and one for System 7.x.

flags=system7 || !system6

This indicates that your library should not be registered if it is installed on a system 6.x-based Macintosh. No clients will be able to see any of the classes or function sets in your library. This flag is useful if you have 2 different versions of your library—one for System 6.x and one for System 7.x.
flags=vmOn || !vmOff This indicates that your library should not be registered if it is installed on a Macintosh which is running with Virtual Memory (VM) turned on. No clients will be able to see any of the classes or function sets in your library. This flag is useful if you have 2 different versions of your library—one for Virtual Memory on and one for Virtual Memory off.
flags=vmOff || !vmOn This indicates that your library should not be registered if it is installed on a Macintosh with Virtual Memory (VM) turned off. No clients will be able to see any of the classes or function sets in your library. This flag is useful if you have 2 different versions of your library—one for Virtual Memory on and one for Virtual Memory off.
flags=fpuPresent || !fpuNotPresent This indicates that your library should not be registered if it is installed on a Macintosh without a Floating Point Unit (FPU). No clients will be able to see any of the classes or function sets in your library. This flag is useful if you have 2 different versions of your library—one for an FPU being present, and one for it being absent.
flags=fpuNotPresent || !fpuPresent This indicates that your library should not be registered if it is installed on a Macintosh with a Floating Point Unit (FPU). No clients will be able to see any of the classes or function sets in your library. This flag is useful if you have 2 different versions of your library—one for an FPU being present, and one for it being absent.
flags=mc68000 || mc68020 || mc68030 || mc68040

This indicates that your library should only be registered if it is installed on a Macintosh with the specified processors. You may specify more than one processor. For example, "flags=mc68000, mc68020" will cause your library to be registered only on 68000 or 68020 processors.
flags=!mc68000 || !mc68020 || !mc68030 || !mc68040

This indicates that your library should not be registered if it is installed on a Macintosh that is not one of the specified processors. You may specify more than one processor. For example, "flags=!mc68000, !mc68020" will cause your library to be registered only on Macintoshes with a 68030 or higher processor. It is an error to mix not ("!") terms with non-not terms (i.e. flags=mc68000, !mc68020).
id=

This declaration defines the ID of the library. A library ID is normally in the form "xxxx:yyyy$Name". This ID string is a quoted string, but it may include #defined constants as part of it's definition as long as you #include the files that contain the #define declarations that resolve the constants.
version=

This declaration defines the version of the library. The version number is in the standard Apple version number form: #.#[.#] followed by either nothing or [dabf]# to indicate the release status. For example 1.0b2 or 1.1.2d5. This may be a #defined symbol.
memory=client This declaration indicates that any "new" operations done in the library should use the client's pool. This is the default if it is not specified. It is equivalent to the useclientpool options in earlier versions of SLM.
memory=local This declaration indicates that any "new" operations done in the library should use the local pool.
heap=default || temp || system || application [,hold][,#]

This tells the SLM where you want your library to be loaded into memory. Normally, you should not specify this attribute unless you have a very good reason. However, if your library must run under virtual memory and cannot move in memory (for instance, a networking driver), you can specify the ",hold" attribute to inform the SLM that you require the memory that your library is loaded into to be "held" under Virtual Memory. You can also optionally specify the size of the heap that you want your library to load into (this option only makes sense for default or temp).
clientData=<StructureName> || #

This tells the SLM that you require per-client static data. You can specify either a number of bytes or the name of a structure. Whenever you call GetClientData, you will then be returned a structure of the specified size. The first time the structure is created for a given client, it will be zeroed. After the first time, you will get back the structure corresponding to your current client. If you specify a structure name, the object file must have the type information available to determine the size of the structure, or an error will be generated.

The Class Declaration

A full class declarations is:

```
Class <ClassName>
{
    version = <ClassVersion>;
    flags = preload, newobject, noVirtualExports,
            noMethodExports, noExports;
    exports = <ListOfFunctionNames>;
    dontExport = <ListOfFunctionNames>
    private = * | <ListOfFunctionNames>
};
```

Copyright Apple Computer 1991–1993

All fields except the <ClassName> are optional.
The minimalist class declaration is just:
Class <ClassName>;

The id of the class must be #defined as a constant of the form k<ClassName>ID. It is optional (but a very good idea) for your class ID to terminate with a "," followed by the version number of the class, especially if your class can be instantiated using the SLM NewObject function. This will keep your clients from inadvertently getting a wrong version of your class.

Element Descriptions
<ClassName>

This is the name of the class that you want to export.
version=

This declaration defines the version of the class. The version number is in the standard Apple version number form: #.#[.#]. The version number may not have the extra release information (like b2) on it. However, the version number may be 2 version numbers separated either by 3 dots (...) or an ellipsis (option-;) character. This indicates the minimum version number of the class that this class is backwards-compatible with, and the current version number of the class. If you do not specify a version number, if the ClassID of the class has a version number in it, that will be used. Otherwise, the version number specified in the "Library" declaration will be assumed. This may be a #defined symbol.
flags=newobject This flag specifies that clients are allowed to create the class by ClassID using the NewObject routine. A fatal error will occur at build time if this flag is set, but you do not have a default constructor for your class (a default constructor is one which takes no arguments), your class is abstract (has a "pure-virtual" method), or the class size cannot be determined from symbol information in the object file.
flags=preload This flag specifies that an instance of the class should be created whenever the system boots up. A fatal error will occur at build time if this flag is set, but you do not have a default constructor for your class (a default constructor is one which takes no arguments), or your class is abstract (has a "pure-virtual" method). If this flag is set, the newobject flag is automatically set.

flags=noExports

This flag specifies that no methods of this class are to be exported. NewObject is the only way that a client can use your class if this flag is set and you do not export constructors in the exports=section, and they can only call virtual functions in the class, unless you explicitly export methods (see exports=below).

flags=noVirtualExports

This flag specifies that no virtual methods of this class are to be exported. For the purposes of consistency in the SLM, the destructor of a class is NOT considered a virtual method, even if it was defined that way. You can explicitly export some virtual functions using the exports=clause below.

flags=noMethodExports

This flag specifies that no non-virtual methods of this class are to be exported. This includes constructors and the destructor for the class. NewObject is the only way that a client can use your class if this flag is set and you do not export constructors in the exports=section exports=

This declares a comma-separated list of methods that you want to export from the class. It is normally used to override the "noExports" "noMethodExports", or "noVirtualExports" flags for individual methods. You only need to specify the function name, but if it is a pascal function, you need to put the keyword "pascal" in front of the function name. Like C++, the SLM considers ALL variants of a member function as the same function, and will export them all. To export operators, use the C++ syntax (e.g. operator+=). To export constructors, use the name of the class, and to export destructors, use ~<Name of Class>.

dontexport=

This declares a comma-separated list of functions that you do not want to export from the class. You only need to specify the function name, but if it is a pascal function, you need to put the keyword "pascal" in front of the function name. Like C++, the SLM considers ALL variants of a member function as the same function, and will not export any of them. You may not use both exports=and dontexport= for the same class.

private=

This declares a comma-separated list of methods that you want to export from the class privately. Any methods specified in this list will be exported, but will go into a separate client object file (defined by the -privateNear and/or -privateFar command-line switches to LibraryBuilder).

private=*

This declares that all methods that can be exported should be exported privately. If you have set noMethodExports, then all virtual methods will be exported privately that are not either explicitly exported publicly by the exports=clause or that are specifically excluded from being exported by a dontexport=clause. If you have set noVirtualExports, then all non-virtual methods will be exported privately that are not either explicitly exported publicly by the exports=clause or that are specifically excluded from being exported by a dontexport=clause. If you have neither flag set, than all methods of the class will be exported privately that are not either explicitly exported publicly by the exports=clause or that are specifically excluded from being exported by a dontexport=clause. It is an error to use this switch if the noExports flag is set.

The FunctionSet Declaration

```
FunctionSet <FunctionSetName>
{
    id = <ClassID>;                          required
    interfaceID = <ClassID>;                 optional
    version = <ClassVersion>;                optional
    exports = <ListOfFunctionNames>;         optional
    dontexport = <ListOfFunctionNames>;      optional
    private = * | <ListOfFunctionNames>;     optional
};
```

Copyright Apple Computer 1991–1993

If a function set does not have an exports=clause and it does not have a dontexport=clause, all global functions (that are not methods of a C++ class) will be exported (subject to any constraints set by the private=clause—see below). If there are multiple function sets in a library, only one of them can be missing both of these clauses. The function set that is missing both clauses will export all of the global functions (that are not methods of a C++ class) that are not exported by any of the other function sets in the library.

Element Descriptions

<FunctionSetName>

This provides a unique name for your function set when linking.

id=

This declaration defines the classID of the function set. A classID is normally in the form "xxxx:yyyy$SomeName". This ID string is as a quoted string, but it may include #defined constants as part of it's definition as long as you #include the files that contain the #define declarations that resolve the constants. If you do not include an "id=" declaration, a #define found in the included files whose name matches k<functionSetName>ID will be assumed to be the classID of the class. An error will occur at build time if the classID of the class cannot be determined.

interfaceID=

This declaration defines an interface ID for the function set. It has the same format as all other ClassIDs. By defining an interface ClassID, you can use the SLM's FunctionSet-Info methods to find all Function Sets which have the same interface ID. Presumably, all function sets with the same interface ID export the same functionality, either by name or by index. This gives you a kind of object-oriented ability for ordinary functions.

version=

This declaration defines the version of the function set. The version number is in the standard Apple version number form: #.#[.#]. The version number may not have the extra release information (like b2) on it. However, the version number may be 2 version numbers separated either by 3 dots (...) or an ellipsis character (option-;). This indicates the minimum version number of the function set that this function set is backwards-compatible with, and the current version number of the function set. Nothing is done with this information in version 1.0 of SLM, but future versions will take advantage of this information. If you do not specify a version number, the version number specified in the "Library" declaration will be assumed. This may be a #defined symbol.

exports=

This declares a comma-separated list of functions that you want to export in this function set. You only need to specify the function name, but if it is a pascal function, you need to put the keyword "pascal" in front of the function name. Like C++, the SLM considers ALL variants of a function as the same function, and will export them all (unless you used the -c switch on the BuildSharedLibrary command line). If you are exporting a C++ class method, you should precede the method name with <ClassName>::. For a C++ class method, the -c switch is ignored and all variants of the method are exported. To export C++ operator overloads, use the C++ syntax (e.g. operator+=). To export constructors, use <ClassName>::<ClassName>, and to export destructors, use <ClassName>::~<ClassName>. Some special keywords are available in this clause. They are:

1) static <ClassName>—all static methods of the specified class will be exported.
2) class <ClassName>—all non-static methods of the specified class will be exported.
3) extern <FunctionName>—the specified function will be exported by name.
4) pascal <FunctionName>—the specified function is a pascal function. The "pascal" keyword can be combined with the "extern" keyword, if necessary.

dontexport=

This declares a comma-separated list of functions that you do not want to export in this function set. It has the same syntax as the "exports=" clause, except that the "static", "class" and "extern" keywords are not valid.

private=

This declares a comma-separated list of methods that you want to export from the function set privately. Any methods specified in this list will be exported, but will go into a separate client object file (defined by the -privateNear and/or -privateFar command-line switches to LibraryBuilder). If you have not defined an exports= or dontExport=clause, then all other functions will be exported publicly.

private=*

This declares that all functions that can be exported should be exported privately. If you have not defined an exports=or dontExport=clause, then all of the functions will be exported privately. If you have an exports=clause, then the functions declared there will be exported publicly, and all others will be exported privately. If you have a dontExport=clause, then the functions declared there will not be exported at all, and all others will be exported privately. If you have both clauses, those in the dontExport=clause will not be exported, those in the exports=claus will be exported publicly, and all others will be exported privately.

Conclusion

Accordingly, the present invention provides a system extension that brings dynamic linking and dynamic loading to a computer system architecture through the use of shared libraries. The shared library manager allows you to turn almost any code into a shared library without modifying your sources and without writing any additional code. You write the code that goes into the shared library in your chosen source language or assembly, call it from any of those languages as well. In addition, the system allows for calling virtual functions in a C++ class in a shared library without additional overhead.

This system is especially effective for C++ classes. Object oriented languages like C++ give programmers the power of modular design with innate code reuse and offer better ways of putting together programs. However, the concept of code reuse and modularity is not fully realized in many implementations today. A general mechanism for runtime sharing of classes allows developers to take more advantage of the object oriented benefits of C++. True code sharing and reuse becomes possible. Improvements in implementations of classes are immediately usable by all applications, without rebuilding the application that uses the class. It is possible to create a class that derives from a base class which is in a shared library leading to yet another term, dynamic inheritance. In fact, the subclass itself can be in a shared library.

Thus, the present invention is particularly appropriate for applications that want to allow modules to be added on at a later time. If the modules are placed in shared libraries, the application can check to see which modules exist, and choose which modules to use.

In addition, tools such as spellcheckers are well suited for shared libraries according to the present invention. If all spellcheckers share a common interface, the application can choose which spellchecker to use. Also, the spellchecker can be used by more than one application at the same time.

In general, any code that you want to share between one or more applications is a candidate for a shared library. This is especially useful for large software companies that sell multiple applications that contain some common code. The shared library manager makes it easy to share this code. For example, a word processor might want to take advantage of some of the graphics capabilities of a graphics program. Such abilities might be placed in shared libraries and dynamically linked according to the present invention.

Some key features of the shared library manager include the following.

Dynamic Linking and Loading

Shared libraries are loaded and linked with clients at run time (and unloaded when no clients are using them). Loading occurs on-demand, not at launch time. But the user may force libraries to load at launch time to be sure of their availability.

Dynamic Installation

Shared library files may be dragged in and out of the Extensions folder without having to reboot to use the shared libraries.

Usage Verification

An application can verify that a set of classes or functions required for proper operation of the application is available. The shared libraries required can then be loaded, or loading can be delayed until the code is needed.

Library Preloading

To guarantee that a library will be available when it is needed, a shared library may be set to preload at boot time, or it may be explicitly loaded by a client after boot time but before any classes or functions are actually used.

Performance

The Shared Library Manager provides high performance dynamic loading and linking of function sets and classes, high performance construction, use, and destruction of objects. In C++, a method or virtual function is called by a single indirection through a table of pointers to the function implementations (called the v-table or virtual function table). A dynamically linked function or procedure is "snap-linked", which means that the binding overhead occurs only once, after which the target address is cached (the link is "snapped") in the client.

This calling mechanism is much more efficient than the Macintosh Device Manager dispatching which is used by device drivers, or the A-trap plus selector code mechanism used by stand-alone code resources on the Macintosh (such as CDEFs, WDEFs, and the Communications Toolbox). Other mechanisms such as IPC messages are also inefficient by comparison and not well suited for time critical use (as required by high performance networking protocols or other high performance device drivers).

Dynamic Inheritance

A class may inherit from a class which is not in the same shared library file. This also means that a developer can create a class that inherits from another developer's class. The new subclass can either be in another shared library or in the application code.

Dynamic Class Creation

When creating an object, you can dynamically create it by name. This allows an application to create objects of classes it has never seen before. Generally, these objects are a subclass of a class the application does know about.

Class Verification

A client can verify at run-time that a given class is derived from a particular base class or that an object is of a particular base class. Dynamic class creation and class verification are used together.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

A computer program listing appendix under 37 C.F.R. §1.96 follows, consisting of 54 pages.

COMPUTER PROGRAM LISTING APPENDIX

37 C.F.R. §1.96

Copyright Apple Computer 1991-1993

```
void* TLibraryManager::InternalCastObject(VTableRec* vtRec, void* theObject,
                    const TClassID& baseClassID,
                    int level, Boolean checkVirtuals) const
{
    //
    // Scan through all of the parent classes of theClass, and see if
    // any of them have baseClassID as a parent. If one does, return
    // kNoError. But... If the object has several parents with that
    // same baseClassID, then we are NOT RELATED, so we have to keep
    // looking after we find one to be sure.
    //
    void*       answer  = NULL;
    VTableRec*  pvtRec  = vtRec - 1;

do
    {
        pvtRec += 1;
        //
        // If this VTable is not a parent vtable, then the parent VTableRec
        // is obtained by GetParentCVR().
        // If this VTable is Castable and it's either not Virtual, or we're
        // supposed to look at virtual parents, then the "castable" parent
        // VTableRec is obtained by GetLocalCVR.
        //
        ClientVTableRec* theParentRec = NULL;
        if (!pvtRec->IsParentVTable())
            theParentRec = pvtRec->GetParentCVR();
        else
        if ((pvtRec->LocalCVRIsParent() &&
            (!pvtRec->ParentIsVirtual() || checkVirtuals)))
            theParentRec = pvtRec->GetLocalCVR();

if (theParentRec)
        {
            TClassID* tempID = (TClassID*)theParentRec->fClassIDStr;

if (*tempID == baseClassID)
            {
                //
                // If this is level 0, or the parent is virtual, then this
                // is the "definitive" cast at this point in time.
                //
                if (level == 0 || pvtRec->ParentIsVirtual())
                {
```

```
                        long offset = pvtRec->GetObjectOffset();
                        return (offset == -1L) ? NULL : (char*)theObject - offset;
                    }
                    long offset = pvtRec->GetObjectOffset();
                    if (answer != NULL || offset == -1L)
                        return NULL;
                    answer = (char*)theObject - offset;
                }
                else
                {
                    TClass* parentClass;

if (!pvtRec->IsParentVTable())
                        parentClass = (TClass*)(theParentRec->fClassLinkPtr->GetValue());
                    else
                        parentClass = fClassCatalog->LookupClass(*tempID);
                    //
                    // Call ourselves with the "real" VTableRec pointer for the parent
                    // class, and theObject properly "offsetted".
                    //
                    long offset = pvtRec->GetObjectOffset();
                    if (offset == -1L)
                        return NULL;
                    void* temp = InternalCastObject(parentClass->GetVTableRecPtrFast(),
                        (char*)theObject - offset, baseClassID,
                        level + 1, false);
                    if (temp)
                    {
                        if (answer)
                            return NULL;
                        answer = temp;
                    }
                }
            }
        } while (!pvtRec->IsSoloVTable() && !pvtRec->IsLastParent());
        return answer;
    } void* TLibraryManager::CastObject(const void* theObject, const TClassID&
                baseClassID, OSErr* errPtr) const
    {
        OSErr    err       = kNoError;
        void*    answer    = NULL;
        void*    newObject;
        if (errPtr)
            *errPtr = kNoError;    // so we can do blind returns if successful if (!IsValidTDynamic((const TDynamic*)theObject))
        {
            if (errPtr)
                *errPtr = kInvalidObject;
            return NULL;
```

```
        }
        if (fClassCatalog->LookupClass(baseClassID) == NULL)
        {
            if (errPtr)
                *errPtr = kNotFound;
            return NULL;
        }
        VTableRec* vtRec = (VTableRec*)CastToPtr(theObject);
        //
        // If it's a parent VTable, then first, let's see if we can
        // cast it without moving back to the base class. This will allow
        // us to cast objects that have duplicated base classes as long
        // as they are not in the same tree.
        //
        if (vtRec->IsParentVTable())
        {
            if (vtRec->GetLocalCVR() != NULL)
            {
                TClass* temp = fClassCatalog->LookupClass(*vtRec->GetLocalClassID());
                if (temp && temp->GetVTableRecPtrFast())
                {
                    answer = InternalCastObject(temp->GetVTableRecPtrFast(),
                        CastToPtr(theObject), baseClassID, 0, false);
                    if (answer)
                        return answer;
                }
            }
            //
            // OK, that didn't work. Now, let's move back to the main object
            // and try the cast that way.
            //
            if (vtRec->GetObjectOffset() == -1)
                return NULL;
            newObject = (char*)CastToPtr(theObject) + vtRec->GetObjectOffset();
            vtRec = (VTableRec*)CastToPtr(newObject);
        }
        else
            newObject = CastToPtr(theObject);
        //
        // If this is the right class id, then return the offsetted object.
        //
        if (*vtRec->GetLocalClassID() == baseClassID)
        {
            return newObject;
        } answer = InternalCastObject(vtRec, newObject, baseClassID, 0, true);
        if (answer == NULL)
            err = kNotRelated;
        if (errPtr)
            *errPtr = err;
```

```
    return answer;
}

TClassInfo* TLibraryManager::GetClassInfo(const TClassID& theClassID, OSErr* errPtr)
        const
{
    TClassInfo* theInfo = NULL;

if (errPtr)
        *errPtr = kNoError;

if (fClassCatalog->LookupClass(theClassID) != NULL)
    {
        TIterator* theIterator = fClassCatalog->fClasses->CreateIterator(fPool);
        if (theIterator)
        {
            theInfo = new (fPool) TClassInfo;
            if (theInfo)
            {
                theInfo->fBaseClassID = theClassID;
                theInfo->fIterator = theIterator;
                theInfo->Reset();
            }
            else
            {
                delete theIterator;
                if (errPtr)
                    *errPtr = kOutOfMemory;
            }
        }
    }
    else if (errPtr)
        *errPtr = kNotFound;

return theInfo;
} void* TLibraryManager::NewObject(const TClassID& classID, OSErr* err,
            TStandardPool* pool) const
{
    Boolean    ndUnload = false;
    #if qDebug
        Trace("TLibraryManager::NewObject - ClassID = %s\n", &classID);
    #endif void*       theObj = NULL;
    VTableRec*  theVTableRec = NULL;
    OSErr       err2 = kNoError;
    TClass*     theClass;

if (pool == = NULL)
        pool = GetObjectPool();
```

```
/* get the VTableRec for the class first */ theClass = fClassCatalog->LookupClass(classID, false);
if (theClass)
{
    if (!theClass->NewObjectSupported())
    {
        err2 = kNotSupported;
    }
    else if (theClass->GetLibrary())
    {
        err2 = theClass->GetLibrary()->Load(false);    // make sure the code is
                                                       loaded first
        if (err2 == kNoError)
        {
            theVTableRec = theClass->GetVTableRecPtrFast();
            ndUnload = true;  // we'll do an unload later
        }
    }
    else   // it's a root class
        theVTableRec = theClass->GetVTableRecPtrFast();
}
else
    err2 = kNotFound;

if (theVTableRec)
{
    if (theVTableRec->CanNewObject())
    {
        theObj = pool->Allocate(theVTableRec->GetSize());

if (theObj)
        {
            ConstructorPtr constructor = (ConstructorPtr)theVTableRec-
                    >fExportTable[1];
            if (constructor)
            {
                TRY      /* constructors code or code it calls may not be loaded */
                    CallConstructor(theObj, constructor);
                CATCH_ALL
                    err2 = ErrorCode();
                ENDTRY
            }
            else
            {
                pool->Free(theObj);
                theObj = NULL;
                err2 = kNotSupported;
            }
        }
        else
```

- 100 -

```
            err2 = pool->IsValid() ? kOutOfMemory : kPoolCorrupted;
         }
      else
         err2 = kNotSupported;
   }
   if (ndUnload)
      theClass->GetLibrary()->Unload();

#if qDebug
      if (err2)
         Trace("NewObject failed: err = %d\n",err2);
   #endif if (err) *err = err2;
   return theObj;
} void* TLibraryManager::NewObject(const TClassID& classID, const TClassID& parentID,
                                 OSErr* err, TStandardPool* pool) const
{
   OSErr verifyErr;
   verifyErr = VerifyClass(classID, parentID);

if (verifyErr == kNoError)
      return NewObject(classID, err, pool);
   else
   {
      if (err) *err = verifyErr;
      return NULL;
   }
} void* TLibraryManager::NewObject(const TFormattedStream&, OSErr*,
                                 TStandardPool*) const
{
   /* %%% needs implentation */
   return NULL;
}
```

```
int TLibraryManager::InternalVerifyClass(TClassID* theID, const TClassID&
baseClassID,
                     int level, Boolean& sawVirtual) const
{
    //
    // If this guy matches, return kNoError
    //
    Boolean isVirtual^l = false;
    int      saw       = 0;
    if (*(char*)theID  == '*')
    {
       isVirtual = true;
       theID = (TClassID*)((char*)theID + 1);
    }
    //
    // If we match the class ID - then
    // if we are at level 0, return a 1.
    // If it's a virtual parent, set sawVIrtual to true.
    // Otherwise, flag that we've seen the class once.
    //
    if (*theID == baseClassID)
       if (level == 0)
          return 1;
       else
          if (isVirtual)
             sawVirtual = true;
          else
             saw = 1;

TClass* theClass = fClassCatalog->LookupClass(*theID);
    if (theClass == NULL)
       return -1;
    //
    // Scan through all of the parent classes of theClass, and see if
    // any of them have baseClassID as a parent. Keep track of how many
    // we saw. We need to continue scanning to the base of the tree since
    // if we ever see the class as a virtual base class, then the answer is
    // YES, we are related - no matter how many times we saw the class
    //
    size_t    idx = 0;
    TClassID* tempID;
    int       retval;
    while (tempID = theClass->GetParentID(idx++))
    {
       switch (retval = InternalVerifyClass(tempID, baseClassID, level + 1,
                   sawVirtual))
       {
          case 0:
             break;

case -1:
             return retval;
```

```
            default:
                saw + = retval;
        }
    }
    return saw;
}

OSErr TLibraryManager::VerifyClass(const TClassID& classID, const TClassID&
baseClassID) const
{
    Boolean     sawVirtual = false;
    TClassID*   theID = (TClassID*)CastToPtr(&classID);
    switch (InternalVerifyClass(theID, baseClassID, 0, sawVirtual))
    {
        case -1:
            return kNotFound;

case 1:
            if (sawVirtual)
                return kNotRelated;
            return kNoError;

case 0:
            return sawVirtual ? kNoError : kNotRelated;

default:
            return kNotRelated;
    }
}
```

```
/*
    File:       ClassCatalog.h

Contains:   Declaration of the TClassCatalog class

To Do:
*/ ifndef __CLASSCATALOG__
define __CLASSCATALOG__ ifndef __LIBRARYMANAGERCLASSES__
include <LibraryManagerClasses.h>
#endif
#ifndef __SLMGLOBAL__
#include <SLMGlobal.h>
#endif
#ifndef __VTABLETOOLS__
#include <VTableTools.h>
endif /****************************************************************
** Forward class declarations
****************************************************************/ class TClassCatalog;
class TLibraryManager;
class TLibraryFileManager;
class TClass;
class TLibraryFile;
class LoadList;

class TInspector;
class TInspectorHelper;
struct AAPBRec;

/****************************************************************
** Some Typedefs
****************************************************************/ typedef void (*RunSystemTasksProcPtr)(unsigned long);

/****************************************************************
** Class TClassCatalog
**
** TClassCatalog's keep track of TClasses, most likely for a TLibraryManager.
** You can register and unregister TClasses and also look them up based on
** their classId. Normally there will only be 1 TClassCatalog running on the
** system unless there is a need to keep a group of classes private.
****************************************************************/ define   kTClassCatalogID    "!$ccat,1.1"
```

```
class TClassCatalog : public TDynamic
{
    friend class TLibraryManager;

public:
                        TClassCatalog();
        virtual         ~TClassCatalog();
        //
        // Keep these at the front. The stub file generator assumes
        // they are here!
        // if COMPAT10
        virtual VirtualFunction     ExecDestructor(ClientVTableRec*) const;
        virtual VirtualFunction     ExecConstructor(ClientVTableRec*, size_t idx) const;
        virtual VirtualFunction     ExecVTableEntry(ClientVTableRec*, size_t idx) const;
        virtual VirtualFunction     ExecExportEntry(ClientVTableRec*, size_t idx) const;
        virtual void                ExecFunction(FunctionStubRec*, TLibraryManager*) const;
        virtual VirtualFunction     ExecRootDestructor(ClientVTableRec*) const;
        virtual VirtualFunction     ExecRootConstructor(ClientVTableRec*, size_t idx)
                        const;
        virtual VirtualFunction     ExecRootVTableEntry(ClientVTableRec*, size_t idx)
                        const;
        virtual VirtualFunction     ExecRootExportEntry(ClientVTableRec*, size_t idx)
                        const;
endif virtual     VirtualFunction LookupFunction(FunctionStubRec* theStubRec,
                        TLibraryManager* theMgr);

virtual VTableRec*      GetVTableRecMemory(size_t num) const;
        virtual VTableRec*      Init1VTableRec(VTableRec* vTableRec, ProcPtr
                                    setupProc, ClientVTableRec* client) const;
        virtual VTableRec*      InitVTableRec(VTableRec* vTableRec, VTable vTable,
                                    VTable exTable, ClientVTableRec* parent, long size,
                                    char*) const;
        virtual VTableRec*      InitVTableRec(VTableRec*, VTable exTable, char*)
                                    const;

#if COMPAT10
        virtual VTableRec*      GetGenVTableRec(ClientVTableRec*) const;
#endif
        //
        // Knowledge of these 3 offsets is in our assembly language code (VTable.a)
        //
        virtual     VTableRec*  LookupVTableRec(ClientVTableRec* theClient) const;
        virtual VTableRec*      GetVTableRec(ClientVTableRec*, Boolean isSub = true)
                                    const;
        virtual VTableRec*      ReleaseVTableRec(ClientVTableRec*) const;
        //
        // Knowledge of these 2 offset is in DeveloperUtilities.cp
        //
```

```
virtual    OSErr          InitLibraryManager(TLibraryManager**, long*, size_t
                             poolsize, ZoneType theZone, MemoryType
                             theMemType);
virtual    Boolean        CleanupLibraryManager(TLibraryManager**);
//
// Knowledge of these 4 offsets is in our assembly language code (VTable.a)
//
virtual VirtualFunction   GetDestructor(StructorStubRec*, TLibraryManager*)
                             const;
virtual VirtualFunction   GetConstructor(StructorStubRec*, TLibraryManager*,
                             Boolean isSub) const;
virtual VirtualFunction   GetVTableEntry(ClassStubRec*, TLibraryManager*)
                             const;
virtual VirtualFunction   GetExportEntry(ClassStubRec*, TLibraryManager*)
                             const;
//
// Knowledge of this offset is in the LibraryBuilder tool
//
virtual VTableRec*        GetParentVTableRec(ClientVTableRec*) const;
//
// Knowledge of these 4 offset is in DeveloperUtilities.cp
//
virtual Boolean           InstallDeathWatcher(TNotifier*);
virtual Boolean           RemoveDeathWatcher(TNotifier*);
virtual void              NotifyDeathWatchClients(TLibraryManager*) const;
virtual    void           LeaveCodeResource(GlobalWorld savedWorld,
                             TLibraryManager* savedClient);

// Inspector dependent on this offset - must be rebuilt if changed
virtual    void           RegisterInspector(TInspector*);

//
// below here you can move stuff around
// if qDebug
virtual    void           Dump() const;
#endif

// New Methods

TCollection*      GetClasses() const;
        TSimpleList*      GetLibraryFiles() const;
        TSimpleList*      GetLibraries() const;
        TSimpleList*      GetLibraryFileManagers() const;
        SLMGlobal*        GetSLMGlobal() const;

virtual    TClass*        LookupClass(const TClassID& theClassID,
                             Boolean isSubClass = true,
                             Version = 0) const;
virtual TClass*           LookupClass(ClientVTableRec*,
```

```
                                    Boolean isSubClass = true,
                                    TLibrary* = NULL) const;

virtual TLibrary*    LookupLibrary(const TLibraryID&) const;

virtual  void        RegisterClass(TClass* theClass);
    virtual  void        UnregisterClass(TClass* theClass);

virtual  void        RegisterLibraryFileManager(TLibraryFileManager*);

virtual  void        RegisterDynamicObject(TDynamic*, Boolean
                                    onlyIfInspecting = false);
    virtual  void        UnregisterDynamicObject(TDynamic*);

virtual RunSystemTasksProcPtr    GetRunSystemTasksProc() const;
    virtual void         ScheduleInitGrafProc() const;

virtual void         InstallVectors();
    virtual  Boolean     ShutDownForInstaller(AAPBRec* pb);
    virtual Boolean      OkToUnloadLibraryManager(Boolean ifDecUseCount);
    virtual TLibraryFileManager*
                         GetApplicationFileManager() const;

virtual TClassID*    CreateClassID(char*);

#ifdef ForROM
    virtual  void        RegisterMacOSLibraryFileMgr();    // only needed for ROM
                                                          Builds
#endif
    virtual  void        InstallPatches();
    virtual  void        RemovePatches();

private:

SLMGlobal*              fGlobals;
        TSimpleList*    fLibraryFileManagers;  // registered TLibraryFileManager's
        TSimpleList*    fLibraryFiles;         // all TLibraryFiles
        TSimpleList*    fLibraries;            // all TLibraries
        THashList*      fClasses;              // all Classes known to the
                                                  TClassCatalog
        THashList*      fClassIDs;             // all ClassIDs known to
                                                  the TClassCatalog TInspector*            fInspector;
        TInspectorHelper*  fInspectorHelper;
        TSimpleList*       fDeathWatchers;
        TMacSemaphore       fSemaphore;
        Boolean                fDontRegisterObjects;
};

/* -----------------------------------------------------------------
    inlines for TClassCatalog
    ----------------------------------------------------------------- */
```

```
inline TCollection* TClassCatalog::GetClasses() const
{
    return fClasses;
} inline TSimpleList*    TClassCatalog::GetLibraryFiles() const
{
    return fLibraryFiles;
} inline TSimpleList*    TClassCatalog::GetLibraries() const
{
    return fLibraries;
} inline TSimpleList*    TClassCatalog::GetLibraryFileManagers() const
{
    return fLibraryFileManagers;
} inline SLMGlobal* TClassCatalog::GetSLMGlobal() const
{
    return fGlobals;
} endif

/******************************************************************
** PUBLIC Load
******************************************************************/

OSErr TLibrary::Load(Boolean forceAll, PreloadList* loadList)
{
    OSErr    result = kNoError;

if (!IsCodeLoaded())
    {
        if ((result = ReallyLoad(forceAll, loadList)) == kNoError)
            IncrementUseCount();
    }
    else
    {
        // if forceAll was specified then we need to make sure all of the code
        // segments are loaded
        if (forceAll)
        {
            LoadedInfo* info = GetLoadedInfo();
            for (short theSegID = kImplementationSegment; theSegID <= info
                                  >fNumCodeSegs; theSegID++)
            {
                if (info->fCodeSegments[theSegID-1] == NULL)
```

```
                {
                    OSErr err = LoadSegment(theSegID);
                    if (err)
                        return err;
                }
            }
        } if (loadList)
            result = GetLibraryFile()->GetLibraryFileManager()->
                        GetLoadList(GetLoadedInfo()->fCodesLibraryManager,loadList);
        if (result == kNoError)
            IncrementUseCount();
    }
    return result;
}

/*****************************************************************
** PUBLIC Unload
*****************************************************************/ void TLibrary::Unload()
{
    Boolean ndRelease = true;
    gSemaphore->Grab();

if (!fUseCount.IsUnused())
    {
        if (fUseCount.Decrement() && IsLibraryLoaded())
        {
            //
            // If we're not on the list, add us on and schedule
            // the unloader, if necessary. We have
            // an fLink field that is not really a TLink, so
            // we cast it as one to make everybody happy.
            //
            if (!fUnloadScheduled)
            {
                //
                // If the useCount reached 0 as a result of another library
                // being unloaded, then unload the library right away. Note
                // that the library will only be partially unloaded and the
                // remainder of the unloading is handle by the UnloadScheduler.
                //
                Boolean unloadNow = gProcessingUnloads && !AtInterruptLevel();
                if (unloadNow)
                    fLibraryLoaded = false; // it's no longer safe to assume we are loaded
                                            after this point gUnloadList->AddLinkFirst((TLink*)&fLink);
                fUnloadScheduled = 1;
```

```
            if (!gOpScheduled)
            {
               gOpScheduled = true;
               gSemaphore->Release();
               ndRelease = false;
               GetSLMGlobal()->fUnloadScheduler->Schedule(gUnloadCodeOp);
            } if (unloadNow)
               ReallyUnload(true);
         }
      }
   }
   else
   {
      DebugBreak("TLibrary::Unload: fUseCount < 0");
   }
   if (ndRelease)
      gSemaphore->Release();
}

/******************************************************************
** PROTECTED ReallyLoad
******************************************************************/

OSErr TLibrary::ReallyLoad(Boolean forceAll, PreloadList* loadList)
{
   OSErr    err;
   void*    savedZone;
   long     savedRefNum;

TLibraryFileManager* fileMgr = GetLibraryFile()->GetLibraryFileManager();

if (AtInterruptLevel())          // fail at interrupt time
      return kCodeNotLoaded;

if (fFlags & kLibraryNoSegUnloadFlag)
      forceAll = true;

savedZone = EnterSystemMode();

if ((err = GetLibraryFile()->OpenLibraryFile()) != kNoError)
   {
      LeaveSystemMode(savedZone);
      return err;
   }
   if ((err = GetLibraryFile()->Preflight(savedRefNum)) != kNoError)
   {
      GetLibraryFile()->CloseLibraryFile();
      LeaveSystemMode(savedZone);
      return err;
   }
```

```
    err = fileMgr->LoadLibrary(this, loadList, forceAll);

if (err != kNoError)
    {
        fCodeLoaded = false;
        fUseCount.Init();
    }

/* If we were able to Preflight the file then PostFlight it. If we can */
    /* PostFlight the file but were unsuccessful in loading the code then  */
    /* close the file. */ if (GetLibraryFile()->Postflight(savedRefNum) == kNoError)
        if (err != kNoError)
            GetLibraryFile()->CloseLibraryFile();

if (err == kNoError)
    {
        GetLibraryFile()->PreloadClasses(this);
        fLibraryLoaded = true;   // the library is done loading now
    }

LeaveSystemMode(savedZone);    // back to state we were in return err;
}

/********************************************************************
** PUBLIC Unload
********************************************************************/ void TLibrary::Unload()
{
    Boolean ndRelease = true;
    gSemaphore->Grab();

if (!fUseCount.IsUnused())
    {
        if (fUseCount.Decrement() && IsLibraryLoaded())
        {
            //
            // If we're not on the list, add us on and schedule
            // the unloader, if necessary.  We have
            // an fLink field that is not really a TLink, so
            // we cast it as one to make everybody happy.
            //
            if (!fUnloadScheduled)
            {
                //
                // If the useCount reached 0 as a result of another library
                // being unloaded, then unload the library right away. Note
```

```
                    // that the library will only be partially unloaded and the
                    // remainder of the unloading is handle by the UnloadScheduler.
                    //
                    Boolean unloadNow = gProcessingUnloads && !AtInterruptLevel();
                    if (unloadNow)
                        fLibraryLoaded = false; // it's no longer safe to assume we are loaded
                                                after this point gUnloadList->AddLinkFirst((TLink*)&fLink);
                    fUnloadScheduled = 1;

if (!gOpScheduled)
                    {
                        gOpScheduled = true;
                        gSemaphore->Release();
                        ndRelease = false;
                        GetSLMGlobal()->fUnloadScheduler->Schedule(gUnloadCodeOp);
                    } if (unloadNow)
                        ReallyUnload(true);
                }
            }
        }
        else
        {
            DebugBreak("TLibrary::Unload: fUseCount < 0");
        }
        if (ndRelease)
            gSemaphore->Release();
    }

/****************************************************************
    ** PUBLIC LookupVTableRec
    ****************************************************************/

VTableRecPtr TLibrary::LookupVTableRec(const TClassID* classID, OSErr* err)
    {
        if (!AreVTablesSafe())
        {
            DebugBreak("TLibrary::LookupVTableRec - attempt to get an unsafe vtable");
            if (err) *err = kCodeNotLoaded;
            return NULL;    // someone tried to get an unsafe vtable at interrupt time
        }
        //
        // find theVTableRec that matches theClient->fClassIDStr
        // However, do not look at "parent" VTableRecs
        //
        size_t idx;
        size_t num = GetLoadedInfo()->fVTableRecArray->fNumVTableRecs;
        VTableRec* vtRec = GetLoadedInfo()->fVTableRecArray->fVTableRec;
        for (idx = 0; idx < num; ++idx, vtRec += 1)
```

```
    {
        if (!vtRec->IsParentVTable())
            if (strcmp((const char*)classID, (char*)vtRec->GetLocalClassID()) == 0)
            {
                break;
            }
    } if (err)
    {
        if (idx >= num)
            *err = kNotFound;
        else
            *err = kNoError;
    } return (idx >= num) ? NULL : GetLoadedInfo()->fVTableRecArray->fVTableRec +
                          idx;
}

VTableRecPtr TLibrary::LookupVTableRec(ClientVTableRecPtr theClient, OSErr* err)
{
    VTableRecPtrtheVTableRec=LookupVTableRec((TClassID*)theClient->fClassIDStr,
                          err);
    if (theVTableRec)
        theClient->fCodeSerialNumber = fCodeSerialNumber;

return theVTableRec;
}

/****************************************************************
** PROTECTED ReallyUnload
****************************************************************/ void TLibrary::ReallyUnload(Boolean delayedUnload)
{
    Boolean  firstPass = !fFirstPassComplete;
    Boolean  lastPass  = fFirstPassComplete || !delayedUnload;

void* savedZone = EnterSystemMode();  /* make sure we do everything in system
                                             mode */ if (firstPass)
    {
        // CYA for when ReallyUnload is called by someone other than ProcessUnload.
        fLibraryLoaded = false;

GetSLMGlobal()->fClassCatalog->NotifyDeathWatchClients(GetLoadedInfo()
                 >fCodesLibraryManager);

//
        // Call the CleanupProc for the library - Make sure the global
```

```
// world and client are set up to the library itself.
//
GlobalWorld savedWorld = ::SetCurrentGlobalWorld(GetLibraryWorld());
TLibraryManager* savedClient = SetCurrentClient(GetCodesLibraryManager());
(*GetLoadedInfo()->fCleanupProc)();

//
// Reset our usecount now
//
fUseCount.SetValue(GetLoadedInfo()->fSavedUseCount);

//
// Call any cleanup routines that were specified
//
TLibraryManager* myMgr = GetCodesLibraryManager();
ProcPtr*    procs = (ProcPtr*)myMgr->GetClientInfo(0);
if (procs)
{
    size_t num = (size_t)CastToLong(procs[0]);
    for (size_t idx = 1; idx <= num; ++idx)
    {
        if (procs[idx])
        {
            //
            // Just in case we can't load the segment. It was preloaded, if possible,
            // but for ThinkC that's not possible.
            //
            TRY
                (procs[idx])();
            ENDTRY
        }
    }
    myMgr->SetClientInfo(0, NULL);
    delete (void*)procs;
}

SetCurrentClient(savedClient);
::SetCurrentGlobalWorld(savedWorld);
} if (lastPass)
{
    TSimpleList* clientList = GetLoadedInfo()->fClients;
    GetLoadedInfo()->fClients = NULL;
    if (clientList)
    {
        TLibraryManager* lmgr;
        while (lmgr = (TLibraryManager*)clientList->RemoveFirst())
        {
            //
            // If the client record is a ClientData record, then deal with
            // it appropriately.
```

```
        //
        if (CastToLong(lmgr) & 1)
        {
            TClientData* data = (TClientData*)((char*)lmgr - 1);
            data->GetClient()->DetachLibrary(this);
        }
        else
            lmgr->DetachLibrary(this);
    }
    delete clientList;
}

GetLibraryFile()->GetLibraryFileManager()->UnloadLibrary(this);
} if (delayedUnload && firstPass)
{
    CodeUnloaded(true);
    fFirstPassComplete = true;
} if (lastPass)
{
    fLibraryFile->CloseLibraryFile();
    fFirstPassComplete = false;
}

LeaveSystemMode(savedZone);      // back to state we were in
} class LoadedInfo
{
    public:
        //
        // All "Loaded" Info Structure must start off with these
        // first 6 fields.
        //
        TLibraryManager*    fCodesLibraryManager;    // Library's TLibraryManager
        VTableRecArray*     fVTableRecArray;         // the list of vtable records
        ProcPtr             fCleanupProc;            // pointer to the library
                                                     // cleanup proc
        long                fSavedUseCount;          // fUseCount after Load() is
                                                     // called for first time
        GlobalWorld         fLibraryWorld;           // the Library's shared A5 world
        TSimpleList*        fClients;                // Current client library managers
        Ptr*                fCodeSegments;           // pointers to the loaded code
                                                     // segments
        short               fNumCodeSegs;            // number of loaded code
                                                     // segments short               fFiller;
        TLibraryManager*    fLastClient;
        void*               fLastClientData;
```

```
};

class TLibrary : public TDynamic
{
    public:
                                    TLibrary(TClassID* theID, ResType theType,
                                        short resID,
                                        Version theVersion,
                                        unsigned short clientDataSize,
                                        size_t codeZoneSize,
                                        long theFlags,
                                        unsigned char compilerType,
                                        TLibraryFilePriv* theLibraryFile);
        virtual                     ~TLibrary();

// TDynamic Overrides virtual     char*           GetVerboseName(char*) const;

// New methods

// These are methods that might get exposed to the user someday so keep them
    // up front. They are already exposed through glue code so don't change
    // their order after 1.1 goes GM.

virtual     OSErr           LoadSegment(long theSegId);     // this guy will
                                                                    // return an error
        virtual     OSErr           LoadSegment(ProcPtr theRoutine); // this guy will
                                                                    return an error
        virtual     OSErr           UnloadSegment(long theSegId);
        virtual     OSErr           UnloadSegment(ProcPtr theRoutine);
        virtual     void*           GetClientData(TLibraryManager*);
        virtual     void            DetachClient(TLibraryManager*);
        virtual     void            AddClient(TLibraryManager*);

OSErr           Load(Boolean forceAll, PreloadList* = NULL);
                    void            Unload();

void            IncrementUseCount();
                    Boolean         DecrementUseCount();
                    TLibraryFilePriv* GetLibraryFile() const;
                    TLibraryManager* GetCodesLibraryManager() const;
                    ResType         GetCodeType() const;
                    long            GetSerialNumber() const;
                    long            GetFlags() const;
                    Boolean         OkToUnload() const;         /* can we unload
                                                                    the code */
                    int             IsLibraryLoaded() const;
                    int             IsCodeLoaded() const;
                    Boolean         AreVTablesSafe() const;
                    int             AreVTablesInitialized() const;
                    GlobalWorld     GetLibraryWorld() const;
```

```
short              GetLibraryLibrID() const;
void               SetPreloadFlag();
int                IsDuplicate() const;
void               SetIsDuplicate(int);

VTableRec*         LookupVTableRec(const TClassID* classID,
                       OSErr* = NULL);
VTableRec*         LookupVTableRec(ClientVTableRec*,OSErr*
                       = NULL);
Version            GetVersion() const;
TClassID*          GetID() const;

LoadedInfo*        GetLoadedInfo() const;
void               SetLoadedInfo(LoadedInfo*);
size_t             GetCodeZoneSize() const;

void*              PrivateLoadSegment(long theSegId);   // this
                                                        // guy
                                                        // can
                                                        / tow
                                                        // an
                                                        // exception
virtual void       InformDebuggerAboutLoadedSegments();
//
// Don't mess with these 3
//
void               InformDebuggerOfSegmentStatus(long id,
                       void* theCode,
Boolean ifLoad);
void           CodeLoaded(ProcPtr codeEntry, Ptr);
void           CodeUnloaded(Boolean delayedUnload = false);
void           InitializeCode(ProcPtr codeEntry, PreloadList*);

OSErr          ReallyLoad(Boolean forceAll, PreloadList* = NULL);
void           ReallyUnload(Boolean delayedUnload = false);
Boolean        LoadLibraries(PreloadList*);
CompilerType GetCompilerType() const;

protected:
    static void        ProcessUnload(TOperation *);

static TOperation*     gUnloadCodeOp;
    static TSimpleList*    gUnloadList;
    static TMacSemaphore*  gSemaphore;
    static Boolean         gOpScheduled;
    static Boolean         gProcessingUnloads;

private:
    //
    // LoadCodeSegment.a depends on this first field
    // and the Stubs generated by 1.1 depend on the 2nd field.
    //
```

```
        LoadedInfo*        fLoadedInfo;
        TUseCount          fUseCount;
        //
        void*              fLink;
        TClassID*          fLibraryID;        // id of this library
        TLibraryFilePriv*  fLibraryFile;      // TLibraryFile in charge of this instance
        long               fCodeSerialNumber; // changes when the code is
                                              // unloaded
        long               fFlags;            // code resource flags
        ResType            fCodeType;         // code resource type
        short              fResID;            // Resource ID
        Version            fVersion;          // packed version =
                                              // major+minor bytes
        unsigned short     fClientDataSize;   // Size of Client Data
        size_t             fCodeZoneSize;     // 0 if not specified
        CompilerType       fCompilerType;
        unsigned           fLibraryLoaded:1;  // true only if we are completely done
                                              // loading the library
        unsigned   fCodeLoaded:1;     // true if code is loaded, but vtables may
                                      // not
                                      // have been initialized yet
        unsigned   fVTablesInitialized:1;  // true if vtables have been initialized
        unsigned   fFirstPassComplete:1;   // true if first unload pass has been made
        unsigned   fUnloadScheduled:1;
        unsigned   fIsDuplicate:1;
        unsigned   fFiller:2;
};

/* ----------------------------------------------------------------
   inline methods
   ---------------------------------------------------------------- */ inline long TLibrary::GetFlags() const
{
    return fFlags;
} inline TLibraryFilePriv* TLibrary::GetLibraryFile() const
{
    return fLibraryFile;
} inline LoadedInfo* TLibrary::GetLoadedInfo() const
{
    return fLoadedInfo;
} inline void TLibrary::SetLoadedInfo(LoadedInfo* info)
{
    fLoadedInfo = info;
}
```

```
inline TLibraryManager* TLibrary::GetCodesLibraryManager() const
{
    return GetLoadedInfo() ? GetLoadedInfo()->fCodesLibraryManager : NULL;
} inline ResType TLibrary::GetCodeType() const
{
    return fCodeType;
} inline long TLibrary::GetSerialNumber() const
{
    return fCodeSerialNumber;
} inline GlobalWorld TLibrary::GetLibraryWorld() const
{
    return GetLoadedInfo()->fLibraryWorld;
} inline short TLibrary::GetLibraryLibrID() const
{
    return fResID;
} inline Boolean TLibrary::OkToUnload() const
{
    return fUseCount.IsUnused();
} inline int TLibrary::IsLibraryLoaded() const
{
    return fLibraryLoaded;
}
inline int TLibrary::IsCodeLoaded() const
{
    return fCodeLoaded;
} inline int TLibrary::AreVTablesInitialized() const
{
    return fVTablesInitialized;
} inline Boolean TLibrary::AreVTablesSafe() const
{
    /*
        It's safe to use the vtables if they have been initialized or if they
        haven't been initialized but the code is loaded and we aren't at
        interrupt time.
    */
    return fVTablesInitialized || (!AtInterruptLevel() && fCodeLoaded);
```

```
} inline Version TLibrary::GetVersion() const
{
    return fVersion;
} inline TClassID* TLibrary::GetID() const
{
    return fLibraryID;
} inline size_t TLibrary::GetCodeZoneSize() const
{
    return fCodeZoneSize;
} inline void TLibrary::SetPreloadFlag()
{
    fFlags |= kLibraryPreloadFlag;
} inline int TLibrary::IsDuplicate() const
{
    return fIsDuplicate;
} inline void TLibrary::SetIsDuplicate(int flag)
{
    fIsDuplicate = flag;
} inline void TLibrary::IncrementUseCount()
{
    fUseCount.Increment();
} inline Boolean TLibrary::DecrementUseCount()
{
    return fUseCount.Decrement();
} inline CompilerType TLibrary::GetCompilerType() const
{
    return fCompilerType;
}

/***************************************************************
** Class TClass
**
** There is one TClass for every exported class in a library except for
** classes in the root library. When the implementation of the class is
```

```
**      loaded the fVTableRec field will contain information about the loaded
**      code (such as vtables and use counts).
*********************************************************************/ define    kTClassID              "!$clss,1.1"

class TClass : public TDynamic
{
        friend class  TClassCatalog;
    public:
                                TClass(TClassID* theID, void* theParentID, long theFlags,
                                    TLibrary*, Version version,
                                    Version minVersion);
        virtual              ~TClass();

// TDynamic Overrides virtual    char*       GetVerboseName(char*) const;
    #if qDebug
        virtual    void        Dump() const;
    #endif // New Methods long              GetFlags() const;
                TLibraryFilePriv* GetLibraryFile() const;
                long              NewObjectSupported() const;
                long              IsPreload() const;
                long              IsFunctionSet() const;
                long              IsRootClass() const;

void              SetVTableRecPtrFast(VTableRec*);
                VTableRec*        GetVTableRecPtrFast() const;

OSErr             Load(Boolean forceAll, PreloadList* = NULL);
                void              Unload();

TClassID*         GetID() const;
        virtual TClassID*         GetParentID(size_t idx = 0) const;
                ClientVTableRec*  GetParentCVR(size_t idx = 0) const;

virtual ProcPtr           GetFunctionPointer(const char* name) const;
        virtual ProcPtr           GetFunctionPointer(unsigned short index) const;
        virtual TClassID*         GetClassID();
        virtual void*             GetParentClassIDPointer();
        virtual void              SetClassID(TClassID*);
        virtual void              SetParentClassID(TClassID*);
        virtual void              SetParentClassIDList(void*);
        virtual void              SetVTableRecPtr(VTableRec*);
        virtual VTableRec*        GetVTableRecPtr() const;

void              SetClassLinkPtr(TLink* theLink);
```

```
            TLink*              GetClassLinkPtr() const;
            long                GetClassSerialNumber() const;
            TLibrary*           GetLibrary() const;
            size_t              GetClassSize() const;
            Version             GetVersion() const;
            Version             GetMinVersion() const;
            void                CacheClassInformation(ClientVTableRec*);

private:
            VTableRec*          GetVTableRec(ClientVTableRec*);

//
    // This first field is known to the stub generation
    //
    TLibrary*       fLibrary;               // TLibrary in charge of class's code
    //
    long            fClassSerialNumber;     // unique for each class
    VTableRec*      fVTableRecPtr;          // v-table record for this class
    //
    // Creole "knows" about the fields above
    //
    TClassID*       fClassID;               // classID for this TClass
    void*           fParentClassID;         // classID for the parent of this TClass
    long            fFlags;
    TLink*          fClassLinkPtr;          // Library link
    Version         fVersion;               // Class version
    Version         fMinVersion;            // minimum supported version
};

/* ---------------------------------------------------------------
Inline methods
--------------------------------------------------------------- */ inline long TClass::NewObjectSupported() const
{
    return fFlags & kClassNewObjectFlag;
} inline long TClass::IsPreload() const
{
    return fFlags & kClassPreloadFlag;
} inline long TClass::IsFunctionSet() const
{
    return fFlags & kClassIsFunctionSet;
} inline long TClass::IsRootClass() const
{
    return fFlags & kClassIsRoot;
```

```cpp
} inline long TClass::GetFlags() const
{
    return fFlags;
} inline OSErr TClass::Load(Boolean forceAll, PreloadList* list)
{
    return fLibrary ? fLibrary->Load(forceAll, list) : kInvalidObject;
} inline void TClass::Unload()
{
    if (fLibrary)
        fLibrary->Unload();
} inline TClassID* TClass::GetID() const
{
    return fClassID;
} inline void TClass::SetVTableRecPtrFast(VTableRec* theVTableRec)
{
    fVTableRecPtr = theVTableRec;
} inline VTableRec* TClass::GetVTableRecPtrFast() const
{
    return fVTableRecPtr;
} inline void TClass::SetClassLinkPtr(TLink* theLink)
{
    fClassLinkPtr = theLink;
} inline TLink* TClass::GetClassLinkPtr() const
{
    return fClassLinkPtr;
} inline long TClass::GetClassSerialNumber() const
{
    return fClassSerialNumber;
} inline TLibrary* TClass::GetLibrary() const
{
    return fLibrary;
}
```

```
inline size_t TClass::GetClassSize() const
{
    return (GetVTableRecPtr() = = NULL) ? 0 : GetVTableRecPtr()->GetSize();
} inline Version TClass::GetVersion() const
{
    return fVersion;
} inline Version TClass::GetMinVersion() const
{
    return fMinVersion;
} inline void TClass::CacheClassInformation(ClientVTableRec* cvr)
{
    cvr->fClassLinkPtr      = fClassLinkPtr;
    cvr->fClassSerialNumber = fClassSerialNumber;
    if (fLibrary)
        cvr->fCodeSerialNumber   = fLibrary->GetSerialNumber();
}

/* ----------------------------------------------------------------
   Some private TLibraryManager inline methods
   ---------------------------------------------------------------- */ inline void TLibraryManager::SetException(TException* theException)
{
    fException = theException;
} inline TException* TLibraryManager::GetException() const
{
    return fException;
} inline TLibrary* TLibraryManager::FastGetLibrary() const
{
    return fLibrary;
} inline void TLibraryManager::SetGlobalWorld(GlobalWorld world)
{
    fGlobalWorld = world;
} if COMPAT10
inline void TLibraryManager::SetLibraryFile(TLibraryFile* file)
{
    fLibraryFile = file;
```

```
    }
endif inline void TLibraryManager::SetClassCatalog(TClassCatalog* cat)
    {
        fClassCatalog = cat;
    } inline void TLibraryManager::SetLibrary(TLibrary* lib)
    {
        fLibrary = lib;
    }

/*
    File:     SLMGlobal.h
*/ ifndef __SLMGLOBAL__
define __SLMGLOBAL__ ifndef __LIBRARYMANAGERUTILITIES__
include <LibraryManagerUtilities.h>
#endif

/*******************************************************************
** Forward class declarations
*******************************************************************/ ifdef __cplusplus class TLibraryManager;
class TClassCatalog;
class TLibraryFileManager;
class TTraceLog;
class TTaskScheduler;
class TSerialScheduler;
class TArbitrator;
class TCollection;
class TStandardPool;
class TMemoryPool;
class TArbitrator;
class TDebuggerHelper;
struct VTableRecArray;

else define TLibraryManager      void*
define TClassCatalog        void*
#define TLibraryFileManager  void*
#define TTraceLog            void*
#define TTaskScheduler       void*
```

```
#define TSerialScheduler    void*
#define TArbitrator    void*
#define TCollection    void*
#define TStandardPool    void*
#define TMemoryPool    void*
#define TArbitrator    void*
#define TDebuggerHelper    void*
define VTableRecArray    void* endif typedef struct   VTableRec*   VTableRecPtr;
typedef ProcPtr    (*DispatchFunc)(void*, size_t);

/******************************************************************
** LibraryRec is a record used by LibraryManagerEntry and LibraryManagerUnloader
** to keep information about a root library.
******************************************************************/ const long      kMaxRootSegments    = 2;

struct LibraryRec
{
    Ptr                   fWorldPtr;
    Ptr                   fWorld;
    VTableRecArray*       fVTableRecArray;
    Ptr                   fCodePtr;
    Ptr*                  fCodeSeg[kMaxRootSegments];        // Handle to all the
                                                             // segments
    short                 fNumCodeSegs;
};

#ifndef __cplusplus
typedef struct LibraryRec    LibraryRec;
#endif

/******************************************************************
** Equates for "fSystemType"
******************************************************************/ define kIsSystem7       ((unsigned short)0x01)
define kIsSystem6       ((unsigned short)0x02)
#define kVMOn            ((unsigned short)0x04)
#define kVMOff           ((unsigned short)0x08)
#define kHasFPU          ((unsigned short)0x10)
#define kHasNoFPU        ((unsigned short)0x20)
#define k68000           ((unsigned short)0x40)
#define k68020           ((unsigned short)0x80)
#define k68030           ((unsigned short)0x100)
#define k68040           ((unsigned short)0x200)

/******************************************************************
```

```
**  the SLMGlobal
*****************************************************************/ struct SLMGlobal
{
        unsigned long      fVersion;          // keep this puppy here - SLM version
        ProcPtr            fShutDownProc;     // keep this puppy here
        void*              fClosePatch;       // keep this puppy here
        TLibraryManager*   fCurrentClient;    // keep this puppy here
        TClassCatalog*     fClassCatalog;     // keep this puppy here
        long               fNoSystemTask;
        void*              fHFSPatch;
        void*              fDeletePatch;
        void*              fRenamePatch;
        TLibraryManager*   fLibraryManager;
        TTraceLog*         fTraceLog;
        TStandardPool*     fClassCatalogPool;
        TMemoryPool*       fClassLinkPool;
        TTaskScheduler*    fTaskScheduler;
        TArbitrator*       fArbitrator;
        long               fExecLevel;
        long               fSequenceNumber;        // current sequence number
        long               fStartSequenceNumber;   // sequence number when we
                                                   // loaded OM
        ProcPtr*           fDebugVTable;
        LibraryRec*        fRootLibrary;      // pointer to the root library
        TLibraryFileManager* fLibraryFileManager;
        TDebuggerHelper*   fDebuggerHelper;
        ProcPtr            fLoadSegCallback;   // debugger callback
        ProcPtr            fUnloadSegCallback; // debugger callback
        GlobalWorld        fDebuggerGlobalWorld;
        ProcPtr            fLoadVector;
        long               fParIDExtFolder;    // %%% Temporary hack for Jasik
        short              fVRefNumExtFolder;
        unsigned short     fSystemType;
        void*              fA5Stack;
        size_t             fA5StackIndex;
        ProcPtr            fStubHelp[5];
        void*              fClassIndexTable;
        long               fSystemModeCount;
        void*              fTimeVector;
        size_t             fInitCount;
        TSerialScheduler*  fUnloadScheduler;
        void*              fWaitNextEventPatch;
        void*              fGetNextEventPatch;
        void*              fEventEvailPatch;
        DispatchFunc*      fDispatchers;
        long               fMinStackSpaceForLoadLibrary;
//
// DON'T CHANGE THE ORDER OF ANYTHING ABOVE HERE!!!!
// Better yet, just always add fields to then end of the structure.
// Don't forget to change the record in LibraryManager.a
```

```
//
    unsigned        fSystem7:1;         // true if running system 7.0
    unsigned        fUseTicksForTime:1;
    unsigned        fShutDown:1;        // true if shutting down for installer
    unsigned        fInitTime:1;        // true until Finder is launched
    unsigned        fBootTime:1;        // true while Loading SLM at boot time
                                        // #if qUseFileIDs
    unsigned        fUseFSSpecs:1;      // true if we track files using fsspec
                                        // records
#else
    unsigned        fCauseCompilerError:1; // make sure we get error if
                                           // fUseFSpecs is used
#endif
    unsigned        fRunningSystemTask:1;
    unsigned        fRunningInterruptScheduler:1;
    unsigned        fAutoUnload:1;      // true if we auto unload slm.
    unsigned        fFiller2:23;
};

#ifndef __cplusplus
typedef struct SLMGlobal    SLMGlobal;
endif ifdef __cplusplus
extern "C"
{
#endif
    void*           PatchTrap(short, ProcPtr, void* prevPatch);
    void            DisablePatch(short, void*);
    Boolean         RemovePatch(short, void*);
    long            NewSerialNumber();
    Boolean         SetSLMGlobal(SLMGlobal*);
    Boolean         GrowExpandMemRec();
#if MACOS
    #pragma parameter __A0 GetSLMGlobal
    SLMGlobal*      GetSLMGlobal() =
    {
        0x2078, 0x02b6,     /* move.l    ExpandMem,A0                         */
        0x2068, 0x010c      /* move.l    ExpandMemRec.emELAPGlobals(A0),A0*/
    };
#else
    SLMGlobal*      GetSLMGlobal();
#endif
ifdef __cplusplus
};
endif ifdef __cplusplus inline TClassCatalog* GetGlobalClassCatalog()
{
    return GetSLMGlobal()->fClassCatalog;
```

```
} inline TDebuggerHelper* GetDebuggerHelper()
{
    return GetSLMGlobal()->fDebuggerHelper;
} inline void SetDebuggerHelper(TDebuggerHelper* helper)
{
    GetSLMGlobal()->fDebuggerHelper = helper;
} endif endif

/*******************************************************************
** PUBLIC GetVTableRec
*******************************************************************/

VTableRec* TClass::GetVTableRec(ClientVTableRec* theClient)
{
    if (fLibrary != NULL)
    {
        OSErr err = fLibrary->Load(false);  // loads codes if not loaded and increments
                                            // use count
        if (err != kNoError)
            DebugFail(err, "TClass::GetVTable could not load code");

if (fVTableRecPtr == NULL || theClient->fCodeSerialNumber != fLibrary
                    >GetSerialNumber())
        {
            if (fVTableRecPtr = fLibrary->LookupVTableRec(theClient))
                CacheClassInformation(theClient);
        }
        //
        // Make sure the local client has the cached information
        //
        if (fVTableRecPtr)
            CacheClassInformation(fVTableRecPtr->GetLocalCVR());
    }
    return fVTableRecPtr;
}
```

```
/**************************************************************
** PUBLIC GetVTableRec
**************************************************************/

VTableRec* TClassCatalog::GetVTableRec(register ClientVTableRec* theClient,
                                       Boolean isSub) const
{
    register TLibrary*   theLibrary;
    register TClass*     theClass     = NULL;
    VTableRec*           theVTableRec = NULL;

if ((theClient->fClassSerialNumber > fGlobals->fStartSequenceNumber) &&
        theClient->fClassLinkPtr &&
        (theClass = (TClass*) theClient->fClassLinkPtr->GetValue()))
    {
        if (theClient->fClassSerialNumber == theClass->GetClassSerialNumber())
        {
            if ((theLibrary = theClass->GetLibrary()) == NULL)
                return theClass->GetVTableRecPtrFast();

if (theLibrary->AreVTablesInitialized() &&
                theClient->fCodeSerialNumber == theLibrary->GetSerialNumber())
            {
                theVTableRec = theClass->GetVTableRecPtrFast();
                if (theVTableRec->IncrementUseCount())
                    theLibrary->IncrementUseCount();    // we do this instead of calling Load()
                                                        // because we know the code is loaded return theVTableRec;
            } if (theLibrary->AreVTablesSafe() &&
                theClient->fCodeSerialNumber == theLibrary->GetSerialNumber())
            {
                theVTableRec = theClass->GetVTableRecPtrFast();
            }
        }
        else
            theClass = NULL;        // we need this so code below will work
    }
    if (theVTableRec == NULL)
    {
        //
        // If the class is NULL, look up the class
        //
        if (theClass == NULL)
        {
            theClient->fClassLinkPtr = NULL;
            theClass = LookupClass(theClient, isSub);
        }
        //
        // Now, get the VTableRec. The class will load the code, if necessary.
        //
        if (theClass == NULL ||
            (theVTableRec = theClass->GetVTableRec(theClient)) == NULL)
            DebugFail(kNotFound, "GetVTableRec failed");
        //
        // We incremented the "theLibrary"s use count by calling GetVTableRec.
        // If our VTableRec use count is not 0, we need to undo the "load"
        // done above.
        //
        if ((!theVTableRec->IncrementUseCount() && (theLibrary = theClass->GetLibrary())))
            theLibrary->DecrementUseCount();
    }
    else
        if (theVTableRec->IncrementUseCount() && (theLibrary = theClass->GetLibrary()))
```

```
            theLibrary->IncrementUseCount();

if (theVTableRec->fExportTable == NULL)
    {
        theVTableRec->fSetup(theVTableRec, sizeof(VTableRec));
        theVTableRec->fRegisteredObjects = NULL;
    }
    return theVTableRec;
}

/******************************************************************
** PUBLIC ReleaseVTableRec
******************************************************************/

VTableRec* TClassCatalog::ReleaseVTableRec(ClientVTableRec* theClient) const
{
    register TClass*    theClass;
    register TLibrary*  theLibrary;

//
    // This loop is so that the "normal" case has no branches in it
    //
    do
    {
        if (theClient->fClassLinkPtr &&
            (theClass = (TClass*)(theClient->fClassLinkPtr->GetValue())) &&
            theClient->fClassSerialNumber == theClass->GetClassSerialNumber())
        {
            if ((theLibrary = theClass->GetLibrary()) &&
                theClient->fCodeSerialNumber == theLibrary->GetSerialNumber())
            {
                if (theClass->GetVTableRecPtrFast() == NULL)
                    DebugFail(kUnconstructedObject, "TClassCatalog::ReleaseVTableRec - destructor called fo
                /*
                    The following is a hack so we don't have to call Unload() unless
                    the usecount is 0, since all Unload does is decrement the usecount
                    unless the usecount goes to zero. It's ok if we decrement the usecount
                    and then someone else interrupts us and decrements it again. The worse
                    that will happen is we will go through the code that calls unload even
                    though the code that interrupted us may have done this for use already.
                    Unload will handle this.
                */
                if (!theClass->GetVTableRecPtrFast()->DecrementUseCount() ||
                    !theLibrary->DecrementUseCount())
                    return theClass->GetVTableRecPtrFast();

theLibrary->IncrementUseCount();    // Unload() will decrement it again
                theLibrary->Unload();

return theClass->GetVTableRecPtrFast();
            }
            else
                if (theLibrary == NULL)
                    return theClass->GetVTableRecPtrFast();

}
        theClass = LookupClass(theClient);
        if (theClass == NULL)
        {
            DebugFail(kNotFound, "TClassCatalog::ReleaseVTableRec failed");
            return NULL;
        }
        theLibrary = theClass->GetLibrary();
        if (theLibrary && !theLibrary->AreVTablesInitialized())
        {
            DebugFail(kUnconstructedObject, "TClassCatalog::ReleaseVTableRec - code not loaded");
```

```
        return NULL;
    }
} while (1);
}
```

```
;
;   SetupPatches
;
;   void SetupPatches(Boolean (TMacOSLibraryFileManager::*)(short),       /* CheckClose */
;                     void (TMacOSLibraryFileManager::*)(CMovePBPtr),      /* CheckMove */
;                     void (TMacOSLibraryFileManager::*)(ParmBlkPtr),      /* CheckDelete */
;                     void (TMacOSLibraryFileManager::*)(ParmBlkPtr),      /* CheckRename */
;                     TMacOSLibraryFileManager*);
            _PROC       SetupPatches
            Export      libFileMgr, closePatch, checkMove, checkDelete, checkRename
            lea         closePatch, A0
            move.l      8(A7),(A0)+          ; save ClosePatch method
            move.l      16(A7),(A0)+         ; save CheckMove method
            move.l      24(A7),(A0)+         ; save CheckDelete method
            move.l      32(A7),(A0)+         ; save CheckRename method
            move.l      36(A7),(A0)+         ; save libFileMgr instance
            rts
closePatch   DC.L       0
checkMove    DC.L       0
checkDelete  DC.L       0
checkRename  DC.L       0
libFileMgr   DC.L       0
            _ENDPROC
;
;   ClosePatch
;
            _PROC       ClosePatch
            Import      libFileMgr, closePatch
            MOVEM.L     A0/D1/D2,-(A7)
            moveq       #0,D1
            move.w      24(A0),D1            ; Get the Refnum of the file
            ble.s       earlyexit            ; The Refnum must be negative
            btst        #0,D1
            beq.s       Check
earlyexit   movem.l     (A7)+,A0/D1/D2       ; restore our registers
            rts                              ; Let patch go to real close!
Check       MOVE.W      D1,-(A7)             ; put the refnum on the stack
            SUBQ.W      #2,A7                ; because C uses longs for shorts
            MOVE.L      libFileMgr,-(A7)     ; put the libFileMgr pointer on stack
            MOVE.L      closePatch, A0
            JSR         (A0)                 ; libFileMgr->CheckClose(thePB)
            ADDQ.W      #8,A7                ; cleanup the stack
            MOVEM.L     (A7)+,A0/D1/D2       ; restore our registers
            TST.B       D0                   ; is it ok to close the file?
            BEQ.S       newClose             ; nope, call our modified close
RealClose   RTS                              ; Let patch go to real close!

newClose    CLR.W       16(A0)               ; ioresult = noErr
            CLR.W       D0                   ; result = noErr
            addq.l      #4,A7                ; Drop return address
            rts
            _ENDPROC _PROC       HFSPatch
            Import      libFileMgr, checkMove
            movem.l     A0/D0/D1/D2,-(A7)
; if (D0!=5) do real trap
            cmp.w       #5,D0                ; if not CatMove selector
            bne.s       realHFS              ; go to real thing ; call libFileMgr->CheckMove(thePB) where thePB is in A0
            move.l      A0,-(A7)             ; put the parameter block on the stack
            move.l      libFileMgr,-(A7)     ; and the libFileMgr instance
            move.l      checkMove,A0         ; libFileMgr->CheckMove(thePB)
            jsr         (A0)
```

```
realHFS     addq.w      #8,A7
            movem.l     (A7)+,A0/D0/D1/D2
            rts
            _ENDPROC _PROC       DeletePatch
            Import      libFileMgr,checkDelete
            movem.l     A0/D1/D2,-(A7)
            move.l      A0,-(A7)                ; put the parameter block on the stack
            move.l      libFileMgr,-(A7)        ; and the libFileMgr instance
            move.l      checkDelete,A0          ; libFileMgr->CheckDelete(thePB)
            jsr         (A0)
            addq.w      #8,A7
            movem.l     (A7)+,A0/D1/D2
            rts
            _ENDPROC _PROC       RenamePatch
            Import      libFileMgr,checkRename
            movem.l     A0/D1/D2,-(A7)
            move.l      A0,-(A7)                ; put the parameter block on the stack
            move.l      libFileMgr,-(A7)        ; and the libFileMgr instance
            move.l      checkRename,A0          ; libFileMgr->CheckRename(thePB)
            jsr         (A0)
            addq.w      #8,A7
            movem.l     (A7)+,A0/D1/D2
            rts
            _ENDPROC
```

```
/***********************************************************************
** PROTECTED SchedulePatchOperation
**
** Utility routine used by the Close, CatMove, and Delete patches below
***********************************************************************/ void TMacOSLibraryFileManager::SchedulePatchOperation(
        StringPtr filename,
        StringPtr oldfilename,    // only use by CheckRename
        long dirID,
        long oldDirID,            // only used by CheckMove
        short vRefNum,
        ProcessProc processProc)
{
    EnterInterrupt();    // we need to assume we are at interrtup level so
                         // the pool won't try to grow.

TStandardPool* pool = GetLocalPool();

FileInfoRec* info = new (pool) FileInfoRec();                       // create a record for saving info about
    TOperation* op = new (pool) TOperation(processProc,info);           // create the operation that will process
    StringPtr name = (StringPtr)pool->Allocate(filename[0]+1);          // get memory for the name
    StringPtr oldname = NULL;
    if (oldfilename)
        oldname = (StringPtr)pool->Allocate(oldfilename[0]+1);          // get memory for the name if (info == NULL || op == NULL || name == NULL ||
        (oldname == NULL && oldfilename != NULL))
    {
        delete info;
        delete op;
        delete name;
        delete oldname;
        LeaveInterrupt();
        return; // *** we need to schedule some sort of re-sync operation if this happens
    } info->ioNamePtr = name;
    info->ioOldNamePtr = oldname;
    info->mgr = this;
    memcpy(info->ioNamePtr, filename, filename[0]+1);    // copy the name
    if (oldfilename)
        memcpy(info->ioOldNamePtr, oldfilename, oldfilename[0]+1);    // copy the old name
    else
        info->ioOldDirID = oldDirID;                 // copy the oldDirID
    info->ioVRefNum = vRefNum;                       // copy the VRefNum
    info->ioDirID = dirID;                           // copy the DirID
    op->SetSavedGlobalWorld(GetGlobalWorld());
    GetGlobalTaskScheduler()->Schedule(op);          // schedule the operation LeaveInterrupt();
}

/***********************************************************************
** PROTECTED IsThisAFileWeCareAbout
**
** Utility routine used by the ProcessCheckMove and ProcessCheckClose.
***********************************************************************/

Boolean TMacOSLibraryFileManager::IsThisAFileWeCareAbout(FileInfoRec* theFile)
{
    HParamBlockRec pb2;
    OSErr          err;

pb2.fileParam.ioCompletion = NULL;
```

```
    pb2.fileParam.ioNamePtr    = theFile->ioNamePtr;
    pb2.fileParam.ioVRefNum    = theFile->ioVRefNum;
    pb2.fileParam.ioFDirIndex  = 0;
    pb2.fileParam.ioDirID      = theFile->ioDirID;
    //
    // prevents recursive calls to close patch caused by PBHGetFInfo
    // call when Stuffit SpaceSaver is installed
    //
    gCurrentFile = theFile;

err = PBHGetFInfo(&pb2,false);

gCurrentFile = NULL;

if (err != kNoError)    // maybe the file got moved again or deleted before we could process it
        return false;

if ((pb2.fileParam.ioFlFndrInfo.fdFlags & kIsAlias) != 0)
        return false;       // ignore alias files if (((pb2.fileParam.ioFlFndrInfo.fdType != kMacOSLibraryType) &&
        (pb2.fileParam.ioFlFndrInfo.fdType != kLibraryManagerType)) ||
        pb2.fileParam.ioFlFndrInfo.fdCreator != kLibraryManagerCreator))
        return false;       // it's not a file we care about return true;
}

/************************************************************
** PROTECTED CheckClose
**
** Called by our _Close trap. We need to return true if it's ok for the
** file to be called and false otherwise. If it is ok to close the file
** and the file is in the extensions folder, we need to scheduler a
** TTaskScheduler operation to see if the file that got closed is a
** library file that we don't know about yet (ie., one that was just copied).
************************************************************/

/*
    Some info about the FCB that we need to know about.
*/ struct FCB
{
    long    fcbFlNum;
    short   fill2[2];
    long    fill4[3];
    VCB*    fcbVPtr;
    long    fill5;
    short   fill6;
    long    fill7[7];
    long    fcbDirID;
    Str31   fcbCName;
};

Boolean TMacOSLibraryFileManager::CheckClose(short refNum)
{
    TMacOSLibraryFile* theLibraryFile;

/*
        Get the FCB pointer
    */ define FCBSPTR    0x034e
    #define FSFCBLen   0x03F6
    #define MAXREFNUM  (short)FCBSPTR - *(short*)FSFCBLen
```

```
        FCB*    fcb = (FCB*)(*(Ptr*)FCBSPTR+refNum);    // fcb for this refnum
        /*
            Make sure the refnum is valid
        */
        if (refNum > MAXREFNUM || (refNum-sizeof(short)) & *(short*)FSFCBLen != 0)
        {
            DebugBreak("CheckClose - this refnum is invalid!");
            return true;
        }

/*
            Bail if we're being called because of Stuffit SpaceSaver calling close
            during our call to PBHGetFInfo done in ProcessCheckClose.
        */
        if (gCurrentFile != NULL)
        {
            if (gCurrentFile->ioVRefNum == fcb->fcbVPtr->vcbVRefNum &&
                gCurrentFile->ioDirID == fcb->fcbDirID &&
                memcmp(gCurrentFile->ioNamePtr,fcb->fcbCName,fcb->fcbCName[0]+1) == 0)
            {
                return true;
            }
        }

/*
            see if the file is a library file we know about
        */
#if qUseFileIDs
        if (GetSLMGlobal()->fUseFSSpecs)
        {
#endif
            TMacFileSpec    fileSpec(fcb->fcbVPtr->vcbVRefNum, fcb->fcbDirID, fcb->fcbCName);
            theLibraryFile = (TMacOSLibraryFile*)LookupLibraryFile(fileSpec);
#if qUseFileIDs
        }
        else
        {
            TFileIDFileSpec fileSpec(fcb->fcbVPtr->vcbVRefNum, fcb->fcbFlNum);
            theLibraryFile = (TMacOSLibraryFile*)LookupLibraryFile(fileSpec);
        }
endif if (theLibraryFile == NULL)
        {
            // Bail if the file isn't in a registered folder
            if (FindRegisteredFolder(fcb->fcbDirID, fcb->fcbVPtr->vcbVRefNum) == 0)
                return true;
        }

/*
            Bail if it's one of our library file refnums and we don't want it closed.
            Note, we never want to bail if we are on the delete list because this
            might actually be a new file to replace the deleted one.
        */
        if (theLibraryFile != NULL)
        {
            // check the system client first
            TMacOSLibraryFileClient* client = (TMacOSLibraryFileClient*)theLibraryFile->GetSystemClient();
            if (client != NULL && (client->fRefNum == refNum) && (!client->fOkToCloseFile))
            {
                //DebugBreak("Can't close file.");
```

137

```
            return false;   // don't allow file to be closed
    }

// check all the other clients
    TListIterator clientIter(theLibraryFile->GetClients());
    while (client = (TMacOSLibraryFileClient*) clientIter.Next())
    {
        if ((client->fRefNum == refNum) && (!client->fOkToCloseFile))
        {
            //DebugBreak("Can't close file.");
            return false;   // don't allow file to be closed
        }
    }
} if (theLibraryFile)
{
    // We need to let ProcessDelete know if this library file might be
    // a new one so ProcessDelete doesn't see this file and think that
    // the delete may have failed.
    theLibraryFile->SetOnCloseList(true);
}

/*
    Schedule an operation to see if this is a new file in the extensions folder.
*/

SchedulePatchOperation(fcb->fcbCName, NULL, fcb->fcbDirID, 0,
    fcb->fcbVPtr->vcbVRefNum, ProcessCheckClose);

return true;   // ok, close it
}

/******************************************************************************
** PROTECTED ProcessCheckClose
**
** Setup by CheckClose. The operation is in charge of seeing if the
** file closed is a new library file in the extensions folder. We need to defer
** this until SystemTask time so we can safely make sync HFS calls.
******************************************************************************/ void TMacOSLibraryFileManager::ProcessCheckClose(TOperation* op)
{
    FileInfoRec*              pb = (FileInfoRec*)op->GetCreatorPtr();
    TMacOSLibraryFileManager* mgr = pb->mgr;

if (!GetSLMGlobal()->fShutDown)
    {
        if (*FSBusy)
        {
            DebugBreak("ProcessCheckClose: async HFS calls are still queued");
            GetGlobalTaskScheduler()->Schedule(op);   // reschedule the operation
            return;
        }

OSErr err = kNoError;

//
        // Make sure we care about this file and it's in a registered folder
        //
        if (IsThisAFileWeCareAbout(pb) &&
            mgr->FindRegisteredFolder(pb->ioDirID, pb->ioVRefNum) != 0)
        {
            //
            // Register this library file if we haven't already
            //
```

```
            return false;   // don't allow file to be closed
        }

// check all the other clients
        TListIterator clientIter(theLibraryFile->GetClients());
        while (client = (TMacOSLibraryFileClient*) clientIter.Next())
        {
            if ((client->fRefNum == refNum) && (!client->fOkToCloseFile))
            {
                //DebugBreak("Can't close file.");
                return false;   // don't allow file to be closed
            }
        }
    } if (theLibraryFile)
    {
        // We need to let ProcessDelete know if this library file might be
        // a new one so ProcessDelete doesn't see this file and think that
        // the delete may have failed.
        theLibraryFile->SetOnCloseList(true);
    }

/*
        Schedule an operation to see if this is a new file in the extensions folder.
    */

SchedulePatchOperation(fcb->fcbCName, NULL, fcb->fcbDirID, 0,
        fcb->fcbVPtr->vcbVRefNum, ProcessCheckClose);

return true;    // ok, close it
}

/*************************************************************************
** PROTECTED ProcessCheckClose
**
** Setup by CheckClose. The operation is in charge of seeing if the
** file closed is a new library file in the extensions folder. We need to defer
** this until SystemTask time so we can safely make sync HFS calls.
*************************************************************************/ void TMacOSLibraryFileManager::ProcessCheckClose(TOperation* op)
{
    FileInfoRec*            pb = (FileInfoRec*)op->GetCreatorPtr();
    TMacOSLibraryFileManager*  mgr = pb->mgr;

if (!GetSLMGlobal()->fShutDown)
    {
        if (*FSBusy)
        {
            DebugBreak("ProcessCheckClose: async HFS calls are still queued");
            GetGlobalTaskScheduler()->Schedule(op);    // reschedule the operation
            return;
        }

OSErr err = kNoError;

//
        // Make sure we care about this file and it's in a registered folder
        //
        if (IsThisAFileWeCareAbout(pb) &&
            mgr->FindRegisteredFolder(pb->ioDirID, pb->ioVRefNum) != 0)
        {
            //
            // Register this library file if we haven't already
            //
```

```
                TFileSpec*      fileSpecPtr;
                TMacFileSpec    fileSpec1(pb->ioVRefNum, pb->ioDirID, pb->ioNamePtr);
#if qUseFileIDs
                TFileIDFileSpec fileSpec2(pb->ioVRefNum,0);
                if (GetSLMGlobal()->fUseFSSpecs)
                {
#endif
                    fileSpecPtr = &fileSpec1;
#if qUseFileIDs
                }
                else
                {
                    OSErr   err = ::GetFileID((const FSSpec&)fileSpec1.fVRefNum,fileSpec2.fFileID);
                    if (err != kNoError)
                    {
                        DebugBreak("TMacOSLibraryFileManager::CheckClose - GetFileID failed");
                    }
                    else
                        fileSpecPtr = &fileSpec2;
                }
endif
                if (err == kNoError)
                {
                    TMacOSLibraryFile* theLibraryFile = (TMacOSLibraryFile*)mgr->LookupLibraryFile(*fileSpecPtr
                    if (theLibraryFile == NULL)
                        mgr->RegisterLibraryFile(*fileSpecPtr);
                    else
                        theLibraryFile->SetOnCloseList(false);
                }
            }
        }
        delete op;
        delete pb->ioNamePtr;
        delete pb;
}

/****************************************************************************
** PROTECTED CheckMove
**
** Called by our _CatMove patch. If a file is being moved into or out of
** the extensions folder, we need to schedule a TTaskScheduler operation
** to check if the file was a library file, and either add or remove the library
** depending on whether the file was dragged into or out of the extensions
** folder.
****************************************************************************/ void TMacOSLibraryFileManager::CheckMove(CMovePBPtr pb)
{
    /*
        see if the file is a library file we know about
    */

TMacOSLibraryFile* theLibraryFile = NULL;
#if qUseFileIDs
    if (GetSLMGlobal()->fUseFSSpecs)
    {
#endif
        if (pb->ioNamePtr[0] <= 32)
        {
            TMacFileSpec    fileSpec(pb->ioVRefNum, pb->ioDirID, pb->ioNamePtr);
            theLibraryFile = (TMacOSLibraryFile*)LookupLibraryFile(fileSpec);

/*
                Bail if we don't know about this file and it's not being moved into
                a registered folder.
            */
```

```
            if (theLibraryFile == NULL &&
                FindRegisteredFolder(pb->ioNewDirID, pb->ioVRefNum) == 0)
            {
                return;
            }
            else
            {
                //
                // If we already know about a file in the location this one is being moved
                // to, then the existing file was probably already deleted, but
                // ProcessCheckDelete has not been called yet. We need to let it know about
                // the pending move. Saying that the file is on the close list does
                // the job.
                //
                fileSpec.fParID = pb->ioNewDirID;
                theLibraryFile = (TMacOSLibraryFile*)LookupLibraryFile(fileSpec);
                if (theLibraryFile)
                    theLibraryFile->SetOnCloseList(true);
            }
        }
        else
            return;
#if qUseFileIDs
    }
endif /*
        Schedule an operation to see if this is a library file being dragged into
        or out of the extensions folder.
    */

SchedulePatchOperation(pb->ioNamePtr, NULL, pb->ioNewDirID, pb->ioDirID,
        pb->ioVRefNum, ProcessCheckMove);
}

/****************************************************************************
** PROTECTED ProcessCheckMove
**
** Setup by CheckMove. The operation is in charge of seeing if the
** file being moved is a new library file in the extensions folder or an existing
** library file being moved out of the extensions folder.
****************************************************************************/ void TMacOSLibraryFileManager::ProcessCheckMove(TOperation* op)
{
    FileInfoRec*              pb = (FileInfoRec*)op->GetCreatorPtr();
    TMacOSLibraryFileManager* mgr = pb->mgr;

do
    {
        if (GetSLMGlobal()->fShutDown)
            break;

if (*FSBusy)
        {
            DebugBreak("ProcessCheckMove: async HFS calls are still queued");
            GetGlobalTaskScheduler()->Schedule(op);    // reschedule the operation
            return;
        }

TMacOSLibraryFile*  theLibraryFile;
        Boolean             movingOut, movingIn;
        TFileSpec*          fileSpecPtr = NULL;
        TMacFileSpec        fileSpec1(pb->ioVRefNum, pb->ioDirID, pb->ioNamePtr);
#if qUseFileIDs
        TFileIDFileSpec     fileSpec2(pb->ioVRefNum,0);
```

```
#endif
        /*
            Got some info we'll need later
        */
#if qUseFileIDs
        if (GetSLMGlobal()->fUseFSSpecs)
        {
#endif
            // make sure the file was really moved FInfo   fndrInfo;
            if (HGetFInfo(pb->ioVRefNum, pb->ioDirID, pb->ioNamePtr, &fndrInfo) != noErr)
            {
                break;      // either CatMove failed or a folder was moved
            } fileSpecPtr = &fileSpec1;
            fileSpec1.fParID = pb->ioOldDirID;   // so LookupLibraryFile will work since we still
                                                 // remember the TLibraryFile by it's old DirID.
            theLibraryFile = (TMacOSLibraryFile*)mgr->LookupLibraryFile(fileSpec1);

/*
                Some INIT's cause 2 calls to CatMove to be made, but only one call actually
                ends up moving the file. We need to check if the first call was already made
                and now the TLibraryFile is already known to be in the extensions folder.
            */
            if (theLibraryFile == NULL)
            {
                fileSpec1.fParID = pb->ioDirID;
                if (mgr->LookupLibraryFile(fileSpec1))
                    break;
            }
if qUseFileIDs
        }
        else
        {
            // make sure the file was really moved fileSpec1.fParID = pb->ioDirID;
            OSErr err = ::GetFileID((const FSSpec&)fileSpec1.fVRefNum, fileSpec2.fFileID);
            if (err != kNoError)    // looks like the CatMove must have failed
            {
                DebugBreak("CheckMove - looks like the CatMove must have failed");
                break;
            }
            fileSpecPtr = &fileSpec2;
            theLibraryFile = (TMacOSLibraryFile*)mgr->LookupLibraryFile(fileSpec2);
        }
endif // make sure this flag gets cleared here
        if (theLibraryFile != NULL)
            theLibraryFile->SetOnCloseList(false);

/*
            Bail if the file isn't a library file we already know about and its type
            isn't 'libr' and it's not the Shared Library Manager file.
        */ if (theLibraryFile == NULL && !IsThisAFileWeCareAbout(pb))
            break;      // it's not a file we care about /*
            See if we are moving into or out of a registered folder.
```

142

```
            Note: it's possible that we are doing both
    */

// if we have a registered file then just say that both are true
    if (theLibraryFile && theLibraryFile->RegisteredFile())
        movingOut = movingIn = true;
    else
    {
        // if we know about the file then we must be moving out
        movingOut = (theLibraryFile != NULL);
        movingIn = false;
        for (short idx = 0; idx < mgr->fNumRegisteredFolders; idx++)
        {
            if (pb->ioVRefNum == mgr->fRegisteredFolders[idx].fVRefNum)
            {
                // are we moving out of this folder?
                if (pb->ioOldDirID == mgr->fRegisteredFolders[idx].fDirID)
                {
                    movingOut = true;
                    if (movingIn)
                        break;
                }
                // are we moving into this folder?
                else if (pb->ioDirID == mgr->fRegisteredFolders[idx].fDirID)
                {
                    movingIn = true;
                    if (movingOut)
                        break;
                }
            }
        }
    }

/*
        Are we moving out of one registered folder and into another?
    */ if (movingIn && movingOut)
    {
#if qUseFileIDs
        if (GetSLMGlobal()->fUseFSSpecs)
        {
#endif
            // We need ot update the dirID for the library file. Since the file
            // no longer will hash to the same value, we also need to remove
            // and then re-add it to the hash list so it will be in the right
            // hash bucket for it's TFileSpec.
            mgr->GetLibraryFiles()->Remove(theLibraryFile);
            theLibraryFile->GetMacFileSpec()->fParID = pb->ioDirID; // fixup the dirID
            mgr->GetLibraryFiles()->Add(theLibraryFile);
#if qUseFileIDs
        }
endif // make the inspector update itself
        UnregisterDynamicObject(theLibraryFile);
        GetGlobalClassCatalog()->RegisterDynamicObject(theLibraryFile, true);

break;
    }

/*
        Are we moving out of a registered folder?
    */
```

```
            if (movingOut)
            {
                /* It's ok if theLibraryFile == NULL. This happens when CatMove gets patched and for */
                /* some reason it ends up being called more than once (it actually gets              */
                /* moved only one of the times).                                                    */ if (theLibraryFile == NULL)
                    ;

/* If the library file is no longer in the extensions folder and none */
                /* of its TClasses are in use then unregister the TClasses and        */
                /* Dispose the library file.                                          */ else if (theLibraryFile->GetOpenCount() == 0)
                {
                    delete theLibraryFile;
                }

/* If the library file is no longer in the extensions folder and one or more */
                /* TClasses are in use than mark the class as being moved.                   */ else
                {
#if qUseFileIDs
                    if (GetSLMGlobal()->fUseFSSpecs)     // the ParID has changed so change it to the new one
                    {
#endif
                        // We need ot update the dirID for the library file. Since the file
                        // no longer will hash to the same value, we also need to remove
                        // and then re-add it to the hash list so it will be in the right
                        // hash bucket for it's TFileSpec.
                        mgr->GetLibraryFiles()->Remove(theLibraryFile);
                        theLibraryFile->GetMacFileSpec()->fParID = pb->ioDirID; // fixup the dirID
                        mgr->GetLibraryFiles()->Add(theLibraryFile);
#if qUseFileIDs
                    }
endif
                    theLibraryFile->MarkMoved();

// make the inspector update itself
                    UnregisterDynamicObject(theLibraryFile);
                    GetGlobalClassCatalog()->RegisterDynamicObject(theLibraryFile, true);
                }
            }

/*
                Are we moving into a registered folder?
            */
            else if (movingIn)
            {
                if (theLibraryFile == NULL)     // we are a new library file
                    mgr->RegisterLibraryFile(*fileSpecPtr);
                else                            // we are an old library file just being dragged back in
                {
#if qUseFileIDs
                    if (GetSLMGlobal()->fUseFSSpecs)
#endif
                        theLibraryFile->GetMacFileSpec()->fParID = pb->ioDirID; // fixup the dirID
                    theLibraryFile->UnMarkMoved();
                }
            }
    } while (false);

delete op;
    delete pb->ioNamePtr;
```

```
    delete pb;
}

/*******************************************************************
** PROTECTED CheckDelete
**
** Called by our _Delete patch. Schedules an operation that checks to
** see if any library files were deleted.
*******************************************************************/ void TMacOSLibraryFileManager::CheckDelete(ParmBlkPtr pb)
{
    /*
        Bail if this is a folder and not a file
    */ if (pb->fileParam.ioNamePtr == NULL)
        return;

/*
        see if the file is a library file we know about
    */

TMacOSLibraryFile* theLibraryFile = NULL;
#if qUseFileIDs
    if (GetSLMGlobal()->fUseFSSpecs)
    {
#endif
        if (pb->fileParam.ioNamePtr[0] <= 32)
        {
            TMacFileSpec fileSpec(pb->fileParam.ioVRefNum, pb->fileParam.ioFlNum,
                                  pb->fileParam.ioNamePtr);
            theLibraryFile = (TMacOSLibraryFile*)LookupLibraryFile(fileSpec);
            if (theLibraryFile == NULL)
                return;
        }
        else
            return;
#if qUseFileIDs
    }
    else
    {
        // We never need to have more than one delete operation scheduled
        if (!fProcessCheckDeleteScheduled)
            fProcessCheckDeleteScheduled = true;
        else
            return; // ignore if file name includes path
    }
endif /*
        Schedule an operation deal with library file being deleted.
    */

SchedulePatchOperation(pb->fileParam.ioNamePtr, NULL, pb->fileParam.ioFlNum, 0,
        pb->fileParam.ioVRefNum, ProcessCheckDelete);
}

/*******************************************************************
** PROTECTED ProcessCheckDelete
**
** Check to see if any library files were deleted.
*******************************************************************/ void TMacOSLibraryFileManager::ProcessCheckDelete(TOperation* op)
```

```
{
    /*
        Delete the library file that has gone away
    */

FileInfoRec*              pb = (FileInfoRec*)op->GetCreatorPtr();
    TMacOSLibraryFileManager* mgr = pb->mgr;

do
    {
        if (GetSLMGlobal()->fShutDown)
            break;

if (*FSBusy)
        {
            DebugBreak("ProcessCheckMove: async HFS calls are still queued");
            GetGlobalTaskScheduler()->Schedule(op);    // reschedule the operation
            return;
        } if qUseFileIDs
        if (GetSLMGlobal()->fUseFSSpecs)
        {
#endif
            TMacFileSpec    fileSpec(pb->ioVRefNum, pb->ioDirID, pb->ioNamePtr);

// make sure its one of our library files

TMacOSLibraryFile* theLibraryFile = (TMacOSLibraryFile*)mgr->LookupLibraryFile(fileSpec);
            if (theLibraryFile == NULL)
                break;      // looks like it wasn't a library file // make sure the file no longer exists FInfo   fndrInfo;
            if (HGetFInfo(pb->ioVRefNum, pb->ioDirID, pb->ioNamePtr, &fndrInfo) == noErr)
            {
                //
                // The file is still around, we need to figure out if it might actually
                // be a new file that was created before we were called.
                //
                // If the file is still open, then we know that the delete must have
                // failed so we abort. If the file is not open and it is on the close
                // list, then even if the delete didn't fail, it would be safe to delete
                // the TLibraryFile because it will be recreated when
                // ProcessCheckClose is called, whether or not the file is new.
                //
                if (theLibraryFile->GetOpenCount() > 0 ||
                    !theLibraryFile->IsOnCloseList())
                {
                    DebugBreak("ProcessCheckDelete - the delete must have failed");
                    break;  // looks like the delete must have failed
                }
            }

// ok, it's history delete theLibraryFile;
if qUseFileIDs
        }

/*
            Delete all library files that have gone away
        */ else            // we're using fileID's
```

```
        {
            THashListIterator   iter(mgr->GetLibraryFiles());
            TLibraryFilePriv*   theLibraryFile;
            mgr->fProcessCheckDeleteScheduled = false;
            while (theLibraryFile = (TLibraryFilePriv*)(iter)->Next())
            {
                FSSpec theFSSpec;
                OSErr err = ::GetFSSpec(*theLibraryFile->FastGetFileSpec(), theFSSpec);
                if (err != noErr)
                {
                    iter.RemoveCurrentObject(); // usually ~TLibraryFilePriv takes care of this but
                    delete theLibraryFile;  // we don't want our iterator to become invalid
                }
            }
        }
endif
    } while (false);

delete op;
    delete pb->ioNamePtr;
    delete pb;
}

/************************************************************
** PROTECTED CheckRename
**
** Called by our _Rename patch. Schedules an operation that checks to
** see if any library files were renamed.
************************************************************/ void TMacOSLibraryFileManager::CheckRename(ParmBlkPtr pb)
{
    /*
        see if the file is a library file we know about
    */

TLibraryFilePriv* theLibraryFile = NULL;
#if qUseFileIDs
    if (GetSLMGlobal()->fUseFSSpecs)
    {
#endif
        if (pb->fileParam.ioNamePtr[0] <= 32)
        {
            TMacFileSpec fileSpec(pb->fileParam.ioVRefNum, pb->fileParam.ioFlNum,
                                  pb->fileParam.ioNamePtr);
            theLibraryFile = LookupLibraryFile(fileSpec);
            if (theLibraryFile == NULL)
                return;
        }
        else
            return; // ignore if file name includes path
#if qUseFileIDs
    }
    else
        return;     // no need to do anything when using fileID's
endif SchedulePatchOperation(StringPtr(pb->ioParam.ioMisc), pb->fileParam.ioNamePtr, pb->fileParam.ioFlNum, (
        pb->fileParam.ioVRefNum, ProcessCheckRename);
}

/************************************************************
** PROTECTED ProcessCheckRename
**
** Check to see if any library files were renamed.
```

```
/*******************************************************************/
void TMacOSLibraryFileManager::ProcessCheckRename(TOperation* op)
{
    /*
        Rename the library file
    */

FileInfoRec*            pb  = (FileInfoRec*)op->GetCreatorPtr();
    TMacOSLibraryFileManager*  mgr = pb->mgr;

do
    {
        if (*FSBusy)
        {
            DebugBreak("ProcessCheckDelete: async HFS calls are still queued");
            GetGlobalTaskScheduler()->Schedule(op);     // reschedule the operation
            return;
        } if (GetSIMGlobal()->fShutDown)
            break;

// First lookup the file with its old name to make sure it's a library file

TMacFileSpec        fileSpec(pb->ioVRefNum, pb->ioDirID, pb->ioOldNamePtr);
        TLibraryFilePriv*   theLibraryFile = mgr->LookupLibraryFile(fileSpec);

/*
            If our lookup failed it's probably because some init patched rename so it's
            called twice. It's only renamed once, but if our first operation already
            fired then we already renamed our copy so we don't need to do anything.
        */
        if (theLibraryFile == NULL)
            break;

// make sure the old file name no longer exists

FInfo   fndrInfo;
        if (HGetFInfo(pb->ioVRefNum, pb->ioDirID, pb->ioOldNamePtr, &fndrInfo) == noErr)
            break;      // looks like the file never moved // make sure the new file name does exist - it's really bad news if it doesn't!!

if (HGetFInfo(pb->ioVRefNum, pb->ioDirID, pb->ioNamePtr, &fndrInfo) != noErr)
        {
            DebugBreak("ProcessCheckRename - HGetFInfo failed on new file name");
            if (theLibraryFile->GetOpenCount() == 0)
                delete (TLibraryFilePriv*)theLibraryFile;   // if not deleted it will fail to open next tim
            break;      // looks like we lost track of the sucker somehow
        }

// Give the file its new name by creating a new file spec. We need a new
        // one because the old one may not be big enough. Since the file
        // no longer will hash to the same value, we also need to remove
        // and then re-add it to the hash list so it will be in the right
        // hash bucket for it's TFileSpec.
        mgr->GetLibraryFiles()->Remove(theLibraryFile);
        TFileSpec* fileSpec2 = theLibraryFile->FastGetFileSpec();
        delete fileSpec2;
        fileSpec2 = new (pb->ioNamePtr[0], GetLocalPool())
            TMacFileSpec(pb->ioVRefNum, pb->ioDirID, pb->ioNamePtr);
        if (!fileSpec2)
        {
            DebugBreak("ProcessCheckRename - could not create a new file spec");
            if (theLibraryFile->GetOpenCount() == 0)
```

```
        {
            delete theLibraryFile;
            theLibraryFile->SetFileSpec(NULL);
        }
        break;      // if not deleted it will fail to open next time
    }
    theLibraryFile->SetFileSpec(fileSpec2);
    mgr->GetLibraryFiles()->Add(theLibraryFile);

// make the inspector update itself
    UnregisterDynamicObject(theLibraryFile);
    GetGlobalClassCatalog()->RegisterDynamicObject(theLibraryFile, true);
} while (false);

delete op;
delete pb->ioNamePtr;
delete pb->ioOldNamePtr;
delete pb;
}
```

What is claimed is:

1. A computer, comprising a central processing unit;

non-volatile memory;

high-speed memory;

a library of function sets, each function set including at least one member function, embodied in the high-speed memory;

computer readable program code comprising one or more client applications embodied in the non-volatile memory and capable of utilizing and residing in the high-speed memory; and computer readable program code means, embodied in the non-volatile memory, for managing use of functions by said one or more client applications, the computer readable program code means comprising:

computer readable program code means for causing the computer to store a dispatch record for said one or more client applications, each said dispatch record for said one or more client applications including a function set ID for each of said plurality of function sets used by said client application;

computer readable program dispatch code means responsive to a call by the client application of a particular member function and to the dispatch record for causing the computer to supply a request for a link to a function set having the particular member function; and computer readable program link code means, responsive to the request for the link to the function set and to the function set ID in the dispatch record, for causing the computer to link the particular member function to the client application wherein the link code means includes computer readable program code means for causing said computer to create a resource set catalog, the resource set catalog identifying function sets in the library by respective function set IDs, and storing a plurality of set records which characterize member functions within respective sets;

computer readable program lookup code means for causing the computer to look up a set record for the function set in the resource set catalog based on the corresponding function set ID; and programmable code means, responsive to the set record, for causing the computer to return the particular member function to the client application.

2. The computer of claim 1, wherein the library of function sets includes at least one function set which characterizes a class.

3. The apparatus of claim 2, wherein the at least one function set which characterizes a class includes a constructor function and a destructor function.

4. The apparatus of claim 2, wherein the at least one function set which characterizes a class includes a virtual function.

5. The apparatus of claim 2, wherein the at least one function set which characterizes a class includes at least the following functions: a constructor function, a destructor function, a virtual function and a non-virtual function.

6. The computer of claim 1, wherein the computer readable dispatch code means includes:

a first level dispatch code segment linked to the client application and to a global variable in the high speed memory; and a second level dispatch code segment linked to the global variable and the link code means.

7. The computer of claim 1, wherein the code means directing the computer to create a dispatch record includes code means causing the computer to create a function link cache with said dispatch record to store the function link to the particular member function;

the link code means further includes code means for causing the computer to supply the function link to the function link cache in response to the return of the particular member function to the client application; and the dispatch code means further includes code means for causing the computer to query the function link cache for a cached link to the particular member function, and to jump to the particular member function in response to the cached link.

8. The computer of claim 1, wherein the dispatch record includes code means directing a set link cache to store a set link to the function set including the particular member function;

the link code means includes code means for causing the computer to supply the set link to the set link cache in response to the return of the particular member function to the client application; and the dispatch code means includes a code means for causing the computer to query the set link cache for a cached link to the function set, and return the cached link to the link code means upon a call to a member function in the function set of the particular member function.

9. The computer of claim 8, wherein the function sets are assigned version numbers according to a standard protocol, and the dispatch record further includes version information linked with one of the client applications indicating a minimum version number supported by said one of the client applications for the function set of the particular member function;

the library includes a version number for the corresponding function sets; and the link code means further includes code means, responsive to the version information in the dispatch record and the version number in the library, for ensuring that the client application supports a version of the function set of the particular member function.

10. The computer of claim 8, further including computer readable code means for causing the computer to load the function sets into high speed memory, to assign the function sets in the library serial numbers when the function sets are loaded in high speed memory, and to assign a serial number in the dispatch record, indicating the serial number corresponding to each function set when the set link cache is filled with set links, the set link cache stores a pointer to a link structure in high speed memory, and the link structure includes a pointer for linking to the function set, and the link code means further includes code means, responsive to the serial number in the library of the function set and the serial number in the dispatch record, for ensuring validity of the set link cache entry, and code means for clearing the link structure when the corresponding function set is unloaded from internal memory.

11. The computer of claim 8, wherein the library of function sets further includes use count records for function sets in the library and the link code means further includes code means for causing the computer to increment the use count record when the function set is returned to the client application, and to decrement the use count when the client application frees the function set.

12. The computer of claim 2, wherein the at least one function set which characterizes a class includes a constructor function and a destructor function and the library further includes use count records for function sets in the library;

the link code means further includes code means for directing the computer to increment the use count record for a particular function set when a client application calls a constructor function for a class characterized by the function set, and to decrement the use count record when a client application calls a destructor function for the class; and further including programmable code means, responsive to the use count records in the library, for causing the computer to free corresponding function sets from internal memory when the use count record goes to zero.

13. The computer of claim 1, including programmable code means embodied in the non-volatile memory for causing the computer to create a plurality of link structures in high-speed memory, and wherein a subset of the function sets are stored in non-volatile memory and may be loaded into high-speed memory by the link code means, the link code means causing the computer to assign serial numbers to the function sets when loaded in high-speed memory;

the dispatch record further includes a set link cache to store a pointer to one of the plurality of link structures and to store a serial number indicating a serial number of the corresponding function set when the set link cache is filled;

the link structure includes a pointer for linking to the function set;

the link code means further includes code means for causing the computer to supply the link to the function set, to return a particular member function to the client application, and to supply the serial number to the set link cache in response to the return of the particular member function to the client application; and the dispatch code means further includes programmable code means for causing the computer to query the set link cache for a cached link, and if the serial number in the set link cache matches the serial number in the library, to return the cached link to the link code means upon a call to a member function in the function set of the particular member function.

14. The computer of claim 1, wherein the link code means includes:

means for causing the computer to create a catalog in the internal memory which lists function sets available for linking; and programmable registration code means, in the high-speed memory, for causing the computer to insert function sets in the library in the catalog in response to a request by an operating system to make the library available for linking, and to remove the function sets in the library from the catalog in response to a request by the operating system to make the library unavailable for linking.

15. The computer of claim 1, wherein the link code means includes:

means for causing the computer to create a catalog in the internal memory which lists function sets available for linking; and programmable registration code means, executable during runtime of the client application and in the high-speed memory, for causing the computer to insert function sets in the library in the catalog in response to a request by an operating system to make the library available for linking, and removes the function sets in the library from the catalog in response to a request by the operating system to make the library unavailable for linking.

16. A computer, comprising:

an input;

a central processing unit;

non-volatile memory;

internal memory;

at least one client application embodied in internal memory; and programmable code means for managing code resources for use by client applications in the computer, the programmable code means, comprising:

a resource set catalog stored in the internal memory, the resource set catalog identifying a plurality of function sets of member functions by respective function set IDs, and storing a plurality of set records which characterize member functions within respective sets;

dispatch code means, in the internal memory linked with a client application, for causing the computer to supply a particular function set ID in response to a call by a client application of a particular member function which is a member of the a function set identified by the particular function set ID in the resource set catalog;

lookup code means, in the internal memory, for causing the computer to identify, based upon the resource set catalog and responsive to the dispatch code means, one of said plurality of set records for the corresponding function set in the resource set catalog; and link code means, in the internal memory and responsive to the dispatch code means, for causing the computer to return the particular member function to the client application in response to the set record.

17. The computer of claim 16, wherein the dispatch code means comprises:

a dispatch record, linked with the client application, which stores the particular function set ID; and dispatch linked to the dispatch record and the lookup engine, responsive to the call to supply the particular function set ID to the lookup engine.

18. The computer of claim 17, wherein the dispatch record includes a set link cache to store a link to the set record for the set of functions including the particular member function;

the link code means further includes code means for causing the computer to supply the link to the set link cache in response to the return of the particular member function to the client; and the dispatch code means further includes code means for causing the computer to query the set link cache for a stored link to the set record, and to return the set record to the link engine in response to the cached link upon a call to a member function in the function set of the particular member function.

19. The computer of claim 18, wherein the set records for function sets are assigned serial numbers when the function sets are loaded in internal memory, and the dispatch record further includes a serial number, linked with the client, indicating a serial number of the corresponding function set when the set link cache is filled;

wherein the set link cache stores a pointer to a link structure in internal memory, and the link structure includes a pointer to the set record having the particular function set ID of the set record, and wherein the link code means further includes code means, responsive to the serial number in the set record and the serial number in the dispatch record, for causing the computer to insure validity of the set link cache entry, and to clear the link structure when the corresponding function set is unloaded.

20. The computer of claim 17, wherein the set record further includes a use count record and the link code means further includes code means for causing the computer to increment the use count when a client application binds with the function set corresponding to the set record, and to decrement the use count when a client application frees the function set corresponding to the set record.

21. The computer of claim 18, wherein the at least one function set which characterizes a class includes a constructor function and a destructor function, and the set record further includes a use count field;

wherein the link code means further includes code means for causing the computer to increment the use count when a client application calls a constructor function for a class corresponding to the set record, and to decrement the use count when a client application calls a destructor function for a class corresponding to the set record; and further including code means, responsive to the use counts in the set records, for causing the computer to free corresponding function sets from internal memory when the use count goes to zero.

22. The computer of claim 20, including a plurality of link structures in internal memory, and wherein the function sets are loaded into internal memory and are assigned serial numbers when loaded in internal memory;

the dispatch record includes a set link cache to store a pointer to one of the plurality of link structures and to store a serial number indicating a serial number of a corresponding function set when the set link cache is filled;

the link structure includes a pointer to the set record; and the link code means further includes code means for causing to computer to supply the link and the serial number to the set link cache in response to the return of the particular function to the client;

the dispatch code means further includes code means for causing the computer to query the set link cache for a stored link to the set record, and, if the serial number in the set link cache matches the serial number in the set record, to return the set record to the link engine in response to the cached link upon a call to a member function in the function set of the particular member function.

23. The computer of claim 16, further including:

registration code means in the internal memory for causing the computer to insert a library of function sets in the resource set catalog in response to a request to make the library available for linking, and to remove the function sets in the library from the resource catalog in response to a request to make the library unavailable for linking.

24. The computer of claim 16, further including:

registration code means, executable during runtime of the client application and in the internal memory, for causing the computer to insert a library of function sets in the resource set catalog in response to a request to make the library available for linking, and to remove the function sets in the library from the resource set catalog in response to a request to make the library unavailable for linking.

25. An article of manufacture, comprising:

a computer usable medium having computer readable program code means embodied therein for managing code resources used by client applications in a computer, said program code means comprising:

code resources comprising a library of function sets stored on the computer usable medium, the function sets in the library having function set IDs, and the function sets including member functions;

program code means for causing the computer to create a resource set catalog, the resource set catalog identifying function sets in the library by respective function set IDs, and to store a plurality of set records which characterize member functions within respective sets;

dispatch code means, linked with a client application, for causing the computer to supply a particular function set ID in response to a call by the client application of a particular member function which is a member of a corresponding function set identified by the particular function set ID;

program lookup code means, responsive to the particular function set ID, for causing the computer to query the resource set catalog to look up a set record for the corresponding function set in the resource set catalog; and program link code means, for causing the computer to return the particular member function from the library to the client application in response to the set record, and to write valid links in the function link cache and the set link cache, wherein the dispatch code means includes:
  a dispatch record linked with the client application which stores the particular function set ID,
  a function link cache, linked with the client application, to store a link to the particular member function,
  a set link cache, linked with the client application to store a link to the set record for the set of functions including the particular member function,
  a dispatch code means linked to the dispatch record, the function link cache, the set link cache and the lookup engine, responsive to the call to supply the particular member function if the function link cache is valid, for causing the computer to supply the set record if the set link cache is valid and to supply the particular function set ID if neither the function link cache nor set link cache is valid.

26. The article of manufacture of claim 25, wherein the library comprises at least one function set which characterizes a class.

27. The article of manufacture of claim 26, wherein the at least one function set which characterizes a class includes a constructor function and a destructor function.

28. The article of manufacture of claim 26, wherein the at least one function set which characterizes a class includes a virtual function in the class.

29. The article of manufacture of claim 26, wherein the at least one function set which characterizes a class includes a constructor function, a destructor function, a virtual function and a non-virtual function.

30. The article of manufacture of claim 25, wherein the function sets in the library are assigned version numbers according to a standard protocol, and dispatch record further includes version information linked with the client indicating a minimum version number supported by the client for the function set of which the particular function is a member, the set record includes a version number for the corresponding function set, and the link code means includes means, responsive to the version information in the dispatch record and the version number in the set record, for causing the computer to insure that the client supports a version of the particular function in the function set.

31. The article of manufacture of claim 25, wherein the set records for function sets are assigned serial numbers when the function sets are loaded in internal memory, and the dispatch record further includes a serial number linked with the client indicating a serial number of the corresponding function set when the set link cache is filled, the set link cache stores a pointer to a link structure in internal memory, and the link structure includes a pointer to the set record having the particular function set ID of the set record, and the link code means further includes means, responsive to the serial number in the set record and the serial number in the dispatch record, for causing the computer to insure validity of the set link cache entry, and means for clearing the link structure when the corresponding function set is unloaded.

32. The article of manufacture of claim 25, wherein the set record includes a use count record and the link means includes means for causing the computer to increment the use count when a client application binds with the function set corresponding to the set record, and to decrement the use count when a client application frees the function set corresponding to the set record.

33. The article of manufacture of claim 26, wherein the at least one function set which characterizes a class includes a constructor function and a destructor function and the set record further includes a use count field;

the link means includes means for causing the computer to increment the use count when a client application calls a constructor function for a class corresponding to the set record, and to decrement the use count when a client application calls a destructor function for a class corresponding to the set record; and further including means, responsive to the use counts in the set records, to free corresponding function sets from internal memory when the use count goes to zero.

34. The article of manufacture of claim 25, including a plurality of link structures in internal memory, and wherein the function sets are assigned serial numbers when loaded in internal memory;

the set link cache stores a pointer to one of the plurality of link structures and a serial number indicating a serial number of the corresponding function set when the set link cache is filled;

the link structure includes a pointer to the set record; and the link means includes means causing the computer to supply the link and the serial number to the set link cache in response to the return of the particular member function to the client;

the dispatch means includes means to insure the validity of a cached link to the set record in response to the serial number in the set link cache and the serial number in the set record.

35. The article of manufacture of claim 25, further including:

a registration routine in the memory which inserts a library of function sets in the resource set catalog in response to a request to make the library available for linking, and removes the function sets in the library from the resource catalog in response to a request to make the library unavailable for linking.

36. The article of manufacture of claim 25, further including:

a registration routine executable during runtime of the client application and in the memory, which inserts a library of function sets in the resource set catalog in response to a request to make the library available for linking, and removes the function sets in the library from the resource set catalog in response to a request to make the library unavailable for linking.

37. In a computer, a computer readable memory having code means for managing functions for use by client applications in the computer, the computer having internal memory storing at least one client application and non-volatile memory, the code means comprising:

a resource catalog stored in the internal memory, the resource catalog including records identifying a plurality of functions available for dynamic linking with the client application;

dispatch code, in the internal memory linked with a client application, causing the computer to supply a request to link with a particular function in response to a call by the client application of the particular function;

lookup code in the internal memory, coupled with the resource catalog and the dispatch engine, causing the computer to look up a record for the particular function in the resource catalog in response to the request;

link code, in the internal memory and coupled with the dispatch engine, causing the computer to return the particular function to the client application in response to the record; and registration code in the internal memory executable during runtime of the client application, which the inserts records for a library of functions in the resource catalog in response to a request to make the library available for linking, and removes the records for the library from the resource catalog in response to a request to make the library unavailable for linking.

38. A computer, including at least one central processing unit, non-volatile memory, high-speed memory, code means for managing code resources for use by client applications, the volatile memory storing at least one client application, the code means comprising:

a class catalog stored in the internal memory, the class catalog identifying a plurality of classes by respective class IDs, and storing class records which characterize derived classes, each derived class having at least one corresponding class in the plurality of classes from which the derived class is derived;

dispatch code in the internal memory linked with a client application, to supply a particular class ID in response to a call by the client application of a function of a particular class identified by the particular class ID;

lookup code in the internal memory, coupled with the class catalog and the dispatch engine, responsive to the particular class ID, causing the computer to look up a class record for the corresponding class in the class catalog;

link code in the internal memory and coupled with the dispatch engine, causing the computer to return the function of the particular class to the client application in response to the class record; and library management code, coupled with the class catalog, causing the computer to provide information about a class in the class catalog to the client application in response to the class ID.

39. The computer of claim 38, wherein the class records identify classes from which the corresponding class is derived, and the library manager includes a verify class routine to verify that a particular class is derived from another class.

40. The computer of claim 38, wherein the class records identify parent classes of the corresponding class, and the library manager includes a cast object routine to return offsets within an object of a particular class to elements within the object of a parent class of the particular class.

41. The computer of claim 38, wherein the library manager includes a new object routine to provide parameters to the client application for calling a function of a class in response to the class ID.

42. The computer of claim 38, wherein the library manager includes a get class information routine to provide information to the client application about classes derived from a particular class in response to the class ID of the particular class.

43. A process for managing code resources used by a client application in a computer and dynamically installing client applications, the computer having internal memory storing at least one said client application, comprising:

providing a class identifier and link pointer in the client application;

providing a class catalog in the internal memory, the class catalog identifying a plurality of classes by respective class identifiers;

providing class records which contain information regarding each class and table records which characterize corresponding classes; and updating the class catalog by generating a new object for inclusion in the class catalog, wherein said generating comprises means for:

querying the class identifier;

querying a memory pool;

determining, based on the class identified and memory allocation data, whether the memory pool allocation has been allocated to an object;

if the memory location has not been allocated, allocating the memory pool location to the new object;

determining the class record by querying one of the plurality of classes to determine whether the new object is supported by the class;

if the class is associated with a library other than a root library, then loading the library and incrementing a use counter in the table record;

retrieving the table record using the class record;

determining whether the new object is supported by the class based on the table record;

determining the size of the new object based on the object record;

placing the object in the allocated memory pool; and incrementing the use counter.

44. A process executable in a computer, the computer including client applications in the computer, comprising the steps of:

providing a class identifier and link pointer in the client application;

providing a class catalog, the catalog stored in the internal memory, the class catalog identifying a plurality of classes by respective class identifiers, and storing class records which characterize corresponding classes, including at least one parent class having at least one class, each class comprising at least one object;

providing at least one operating system designated folder holding a register library;

determining whether new files are copied to or removed from the folder by the client application; and updating the class catalog to include new library resources copied into the folder and deleting library resources which have been moved from the folder subsequent to use.

45. The process of claim 44 wherein the step of providing further includes the step of providing at least one client application designated folder.

46. The process of claim 45 wherein the step of determining further includes intercepting operating system calls indicating whether a file has been copied or moved, and means for determining whether the file is located in the operating system designated folder or the client application designated folder.

47. The process of claim 45 further including the step of determining whether the new file is a shared library resource prior to the step of updating the class catalog.

48. A computer readable memory for managing code resources for use by client applications in a computer, the computer having internal memory storing at least one client application, comprising:

a class catalog stored in the internal memory, the class catalog identifying a plurality of classes by respective class identifiers, and storing class records which characterize corresponding classes;

link code means, in the internal memory, for causing the computer to return the particular function to the client application in response to the class record;

library management code means, coupled with the class catalog, causing the computer to provide information about a class in the class catalog to the client application in response to a request to make the library unavailable for linking; and a registration code means causing the computer to insert a library of function sets in the class catalog in response to a request to make the library available for linking, and to remove the function sets in the library from the class catalog in response to a request to make the library unavailable for linking.

49. The system of claim 48 further including:

cast object code means coupled to the client applications, allowing the client to cast an object of as a parent class, the cast object routine comprising:

code means for determining the location of the object and an identifier of the parent class;

code means for determining the class of the object based on a required structure for the object;

code means for verifying the class of the object using the class identification of the object and the parent class identifier;

code means for determining whether a single or multiple inheritance of the class is found; and code means for determining offsets necessary for multiply inherent objects based on a hierarchy of parent classes.

50. The system of claim 48, wherein the catalogs are assigned version numbers according to a standard protocol, and including version information linked with the client application indicating a minimum version number supported by the client application for the function set of the particular member function, the library includes a version number for the corresponding function sets, and the link code further includes code, responsive to the version information in the dispatch record and the version number in the library, for causing the computer to insure that the client application supports a version of the function set of the particular member function.

51. A computer including internal memory storing at least one client application and non-volatile memory storing programmable code, the code comprising:

a class identifier and link pointer in the client application, upon compiling the client application;

a class catalog, the catalog stored in the internal memory, the class catalog identifying a plurality of classes by respective class identifiers, and storing class records which characterize corresponding classes, including at least one parent class including at least one class, each class comprising at least one object;

at least one operating system designated folder holding a register library;

means for determining whether new files are copied to or removed from the folder by the client application; and update code means for including new library resources copied into the folder in the class catalog and deleting library resources which have been moved from the folder subsequent to use from the class catalog.

52. A computer including a central processing unit, volatile internal memory and non-volatile memory means for managing code resources for use by client applications in the computer, the computer having internal memory storing at least one client application, said means for managing code comprising:

means for providing a class identifier and link pointer in the client application;

means for providing a class catalog stored in the internal memory, the class catalog identifying a plurality of classes by respective class identifiers, and storing class records which characterize corresponding classes, including at least one parent class having at least one class, each class comprising at least one object;

means for providing at least one operating system designated folder and at least one client application designated folder, each holding at least one register library;

means for determining whether new files are copied to or removed from the folder by the client application;

means for determining whether the new file is a shared library resource; and means for updating the class catalog to include new library resources copied into the folder and deleting library resources which have been moved from the folder subsequent to use.

* * * * *

UNITED STATES PATENT AND TRADEMARK OFFICE
CERTIFICATE OF CORRECTION

PATENT NO. : 5,615,400

DATED : Mar. 25, 1997

INVENTOR(S) : Cowsar, et al.

It is certified that error appears in the above-identified patent and that said Letters Patent is hereby corrected as shown below:

Column 176, line 27: after "member of", delete "the".

Column 177, line 9: delete "claim 17" and insert therefor --claim 16--.

Column 177, line 16: delete "claim 18" and insert therefor --claim 16--.

Column 177, line 42: after "causing" delete "to" and insert therefor --the--.

Column 180, line 37: after "which" delete "the".

Column 182, line 48: after "object" delete "of".

Signed and Sealed this

Seventh Day of December, 1999

Attest:

Q. TODD DICKINSON

*Attesting Officer*    *Acting Commissioner of Patents and Trademarks*